United States Patent
Rashid et al.

(10) Patent No.: US 10,922,659 B2
(45) Date of Patent: Feb. 16, 2021

(54) MOBILE WORKFORCE MANAGEMENT

(71) Applicant: KELLERMEYER BERGENSONS SERVICES, LLC, Maumee, OH (US)

(72) Inventors: Zulfiqar Rashid, Poway, CA (US); Aki Atoji, San Diego, CA (US); Marco Roman, La Mesa, CA (US); Irfan Siddiqui, Poway, CA (US); James Dullaghan, Denver, CO (US)

(73) Assignee: Kellermeyer Bergensons Services, LLC, Maumee, OH (US)

( * ) Notice: Subject to any disclaimer, the term of this patent is extended or adjusted under 35 U.S.C. 154(b) by 695 days.

(21) Appl. No.: 15/441,019

(22) Filed: Feb. 23, 2017

(65) Prior Publication Data

US 2017/0243170 A1     Aug. 24, 2017

Related U.S. Application Data

(60) Provisional application No. 62/299,440, filed on Feb. 24, 2016.

(51) Int. Cl.
| | |
|---|---|
| *H04N 5/781* | (2006.01) |
| *G07C 1/10* | (2006.01) |
| *G06Q 10/10* | (2012.01) |
| *H04W 4/021* | (2018.01) |

(52) U.S. Cl.
CPC ........ *G06Q 10/1091* (2013.01); *H04W 4/021* (2013.01)

(58) Field of Classification Search
CPC ... G07C 1/10; G06Q 10/063114; G06Q 40/00
See application file for complete search history.

(56) References Cited

U.S. PATENT DOCUMENTS

| | | | | |
|---|---|---|---|---|
| 2013/0290154 | A1* | 10/2013 | Cherry | G07C 1/10 705/32 |
| 2013/0293709 | A1* | 11/2013 | Cha | H04N 5/781 348/143 |
| 2015/0302362 | A1* | 10/2015 | Cherry | G07C 1/10 705/32 |
| 2016/0042308 | A1* | 2/2016 | Aptakin | G06Q 10/063114 705/7.15 |
| 2017/0091712 | A1* | 3/2017 | Alper | H04L 67/18 |

* cited by examiner

*Primary Examiner* — Talia F Crawley

(74) *Attorney, Agent, or Firm* — Procopio, Cory, Hargreaves & Savitch

(57) ABSTRACT

Mobile workforce management. In an embodiment, punch-in data and punch-out data are collected. Hours data is computed for each of a plurality of employees at each of a plurality of sites from the collected punch-in and punch-out data. This hours data is provided at multiple levels, including at least one summary level and a detailed level. At the summary level, summarized data is calculated for each site from the hours data, and presented as a visual representation with input(s) for selecting each site. In response to selection of a site, a visual representation of hours data for the selected site is presented at a detailed level.

19 Claims, 28 Drawing Sheets

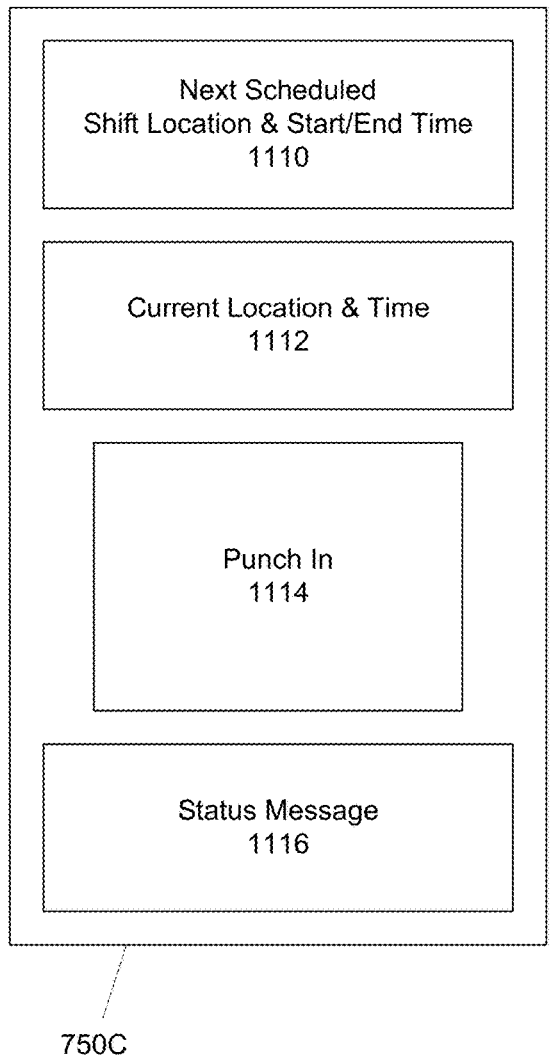
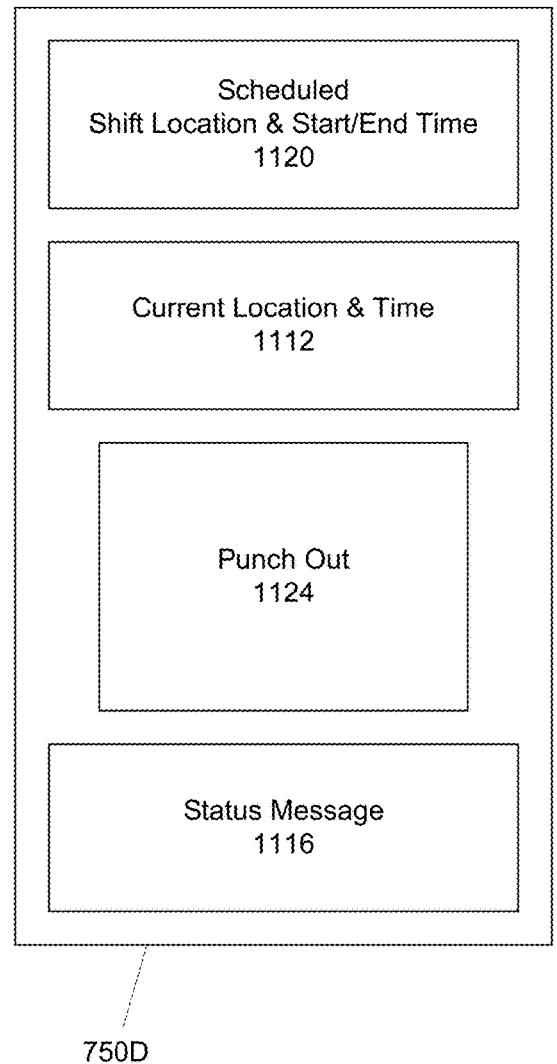
FIG. 11A            FIG. 11B

1200

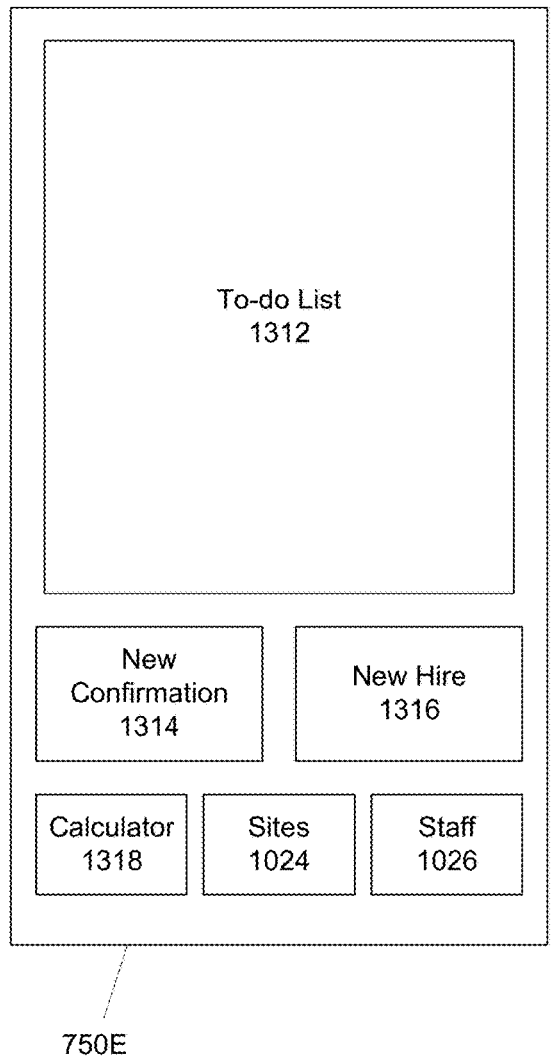
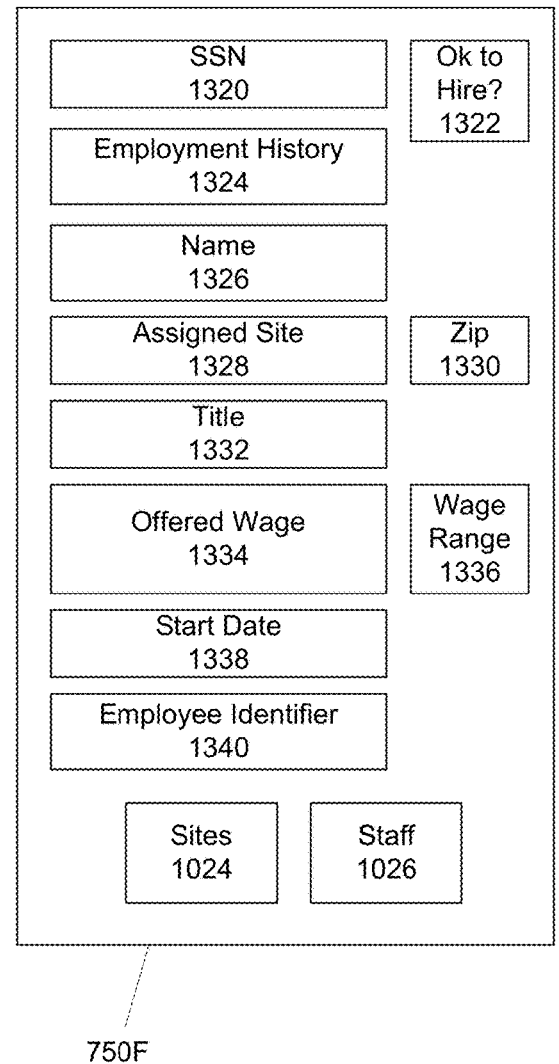
FIG. 13A  FIG. 13B

| | Budget | Scheduled | Actual | Overtime ≫ |
|---|---|---|---|---|
| ˅ Sun. mm/dd | | | | |
| ˅ Mon. mm/dd | | | | |
| ˅ Tue. mm/dd | | | | |
| ˅ Wed. mm/dd | | | | |
| ˅ Thu. mm/dd | | | | |
| ˅ Fri. mm/dd | | | | |
| ˅ Sat. mm/dd | | | | |

Site Information 1710

Week 1760

Edit Schedule 1762

Weekly Actual 1766

Weekly Overtime 1768

Weekly Budget 1764

| | Budget | Scheduled | Actual | Overtime | ≫ |
|---|---|---|---|---|---|
| v Sun. mm/dd | | | | | |
| Scheduled Employee | Actual Start & End Times | | Actual Hours | | |
| Employee1 | | | | | |
| Employee2 | | | | | |
| Employee3 | | | | | |
| > Mon. mm/dd | | | | | |

Site Information 1710
Week 1760
Edit Schedule 1762
Weekly Actual 1766
Weekly Budget 1764
Weekly Overtime 1768
1780A
1700C

| Week 1860 |
|---|

| Site Roll-Up 1872 | Overtime 1874 | Employees 1876 | Porter 1878 |
|---|---|---|---|

✓ By Customers — 1890

1880B

| Customer | Week-to-Date | | | | | | Sunday | | | | | | Monday | | | | | |
|---|---|---|---|---|---|---|---|---|---|---|---|---|---|---|---|---|---|---|
| | BUD | ACT | VAR | PRJ | OT | OT% | BUD | ACT | VAR | PRJ | OT | OT% | BUD | ACT | VAR | PRJ | OT | OT% |
| > Customer1 | | | | | | | | | | | | | | | | | | |
| > Customer2 | | | | | | | | | | | | | | | | | | |
| > Customer3 | | | | | | | | | | | | | | | | | | |
| > Customer4 | | | | | | | | | | | | | | | | | | |
| > Customer5 | | | | | | | | | | | | | | | | | | |
| > Customer6 | | | | | | | | | | | | | | | | | | |
| > Customer7 | | | | | | | | | | | | | | | | | | |

1800B

| Employee | Home Site | RVP | RZM | ZL | Sunday mm/dd/yyyy | Monday mm/dd/yyyy | Tuesday mm/dd/yyyy | Wed... mm/dd... |
|---|---|---|---|---|---|---|---|---|
| Employee1 | | | | | | | | |
| Employee2 | | | | | | | | |
| Employee3 | | | | | | | | |
| Employee4 | | | | | | | | |
| Employee5 | | | | | | | | |
| Employee6 | | | | | | | | |
| Employee7 | | | | | | | | |

Week 1860

Site Roll-Up 1872

Overtime 1874

Employees 1876

Porter 1878

| Week 1860 | | | | | | | | | | | | | |
|---|---|---|---|---|---|---|---|---|---|---|---|---|---|
| Site Roll-Up 1872 | Overtime 1874 | Employees 1876 | Porter 1878 | | | | | | | | | | |

○ Only Employees with Overtime — 1892

1880D

| Employee | Sunday mm/dd/yyyy | | Monday mm/dd/yyyy | | Tuesday mm/dd/yyyy | | Wednesday mm/dd/yyyy | | Thursday mm/dd/y... | |
|---|---|---|---|---|---|---|---|---|---|---|
| | REG | PRJ | REG | PRJ | REG | PRJ | REG | PRJ | REG | PRJ |
| | OT | | OT | | OT | | OT | | | |
| Employee2 | | | | | | | | | | |
| Employee3 | | | | | | | | | | |
| Employee4 | | | | | | | | | | |
| Employee5 | | | | | | | | | | |
| Employee6 | | | | | | | | | | |
| Employee7 | | | | | | | | | | |

MOBILE WORKFORCE MANAGEMENT

CROSS-REFERENCE TO RELATED APPLICATIONS

This application claims priority to U.S. Provisional Patent App. No. 62/299,440, filed on Feb. 24, 2016, the entirety of which is hereby incorporated herein by reference.

BACKGROUND

Field of the Invention

The embodiments described herein are generally directed to mobile workforce management, and, more particularly, to management of a workforce via a platform-based software application.

Description of the Related Art

There is currently no centralized solution that is specifically designed to hire, manage, and provide real-time operational oversight into a highly-distributed, geographically-dispersed, low-hourly-wage workforce. What is needed is a solution that has one or more (including all) of the following capabilities:

(a) On-boarding (i.e., hiring). For example, there is no adequate conventional solution that fully integrates I-9 processing for hiring hourly workers through a mobile device (e.g., the transfer of data from the I-9 form into a company's on-boarding application).

(b) Confirmation. For example, there is no adequate conventional solution that provides a hiring manager for hourly workers with immediate real-time feedback on a mobile device (e.g., regarding an employee's eligibility for hiring or re-hiring based on the potential employee's background, the wage range available for the potential employee based on the potential employee's title, Zip code of the site to which the potential employee will be assigned, minimum and market wage for that Zip code, etc.).

(c) Real-time Operational Data. For example, there is no adequate conventional solution that provides real-time usage, overtime, and attendance information to field managers, for employees within their span of control (e.g., based on field organization structure, customers, projects, porter hours, etc.). This prevents field managers to react to operational issues in real time (e.g., within minutes).

(d) Sites. For example, there is no adequate conventional solution that allows field managers to know which of their highly-distributed hourly employees are currently punched in to a shift and/or working at a particular location within the field managers' span of control.

(e) Alerts. For example, there is no adequate conventional solution that visually alerts field managers of operational issues that need immediate attention (e.g., an on-boarding application for a potential employee remaining open for more than 24 hours, an escalation from a customer, an audit that has not been completed, etc.).

SUMMARY

Accordingly, systems and methods are disclosed to improve the management of a workforce.

In an embodiment, a method is disclosed. The method comprises using at least one hardware processor to execute a server application to: collect a plurality of punch-in data and a plurality of punch-out data from a plurality of client applications over at least one network, wherein each of the plurality of punch-in data comprises an identifier of a site, an identifier of an employee, and a timestamp representing a time at which that identified employee punched in to a shift at that identified site, and wherein each of the plurality of punch-out data comprises an identifier of a site, an identifier of an employee, and a timestamp representing a time at which that identified employee punched out of a shift at that identified site; compute hours data for each of a plurality of employees at one or more of a plurality of sites from the collected plurality of punch-in data and plurality of punch-out data; and provide the hours data at one or more summary levels and a detailed level by calculating summarized data for each of the plurality of sites from the hours data, presenting a visual representation of the summarized data for each of the plurality of sites as a first summary level with one or more inputs for selecting each of the plurality of sites, and, in response to a selection, at the first summary level, of at least one of the plurality of sites, presenting a visual representation of the hours data for the selected at least one site as the detailed level.

In another embodiment, a system is disclosed. The system comprises: at least one hardware processor; and one or more software modules that, when executed by the at least one hardware processor, collect a plurality of punch-in data and a plurality of punch-out data from a plurality of client applications over at least one network, wherein each of the plurality of punch-in data comprises an identifier of a site, an identifier of an employee, and a timestamp representing a time at which that identified employee punched in to a shift at that identified site, and wherein each of the plurality of punch-out data comprises an identifier of a site, an identifier of an employee, and a timestamp representing a time at which that identified employee punched out of a shift at that identified site, compute hours data for each of a plurality of employees at one or more of a plurality of sites from the collected plurality of punch-in data and plurality of punch-out data, and provide the hours data at one or more summary levels and a detailed level by calculating summarized data for each of the plurality of sites from the hours data, presenting a visual representation of the summarized data for each of the plurality of sites as a first summary level with one or more inputs for selecting each of the plurality of sites, and, in response to a selection, at the first summary level, of at least one of the plurality of sites, presenting a visual representation of the hours data for the selected at least one site as the detailed level.

In a further embodiment, a non-transitory computer-readable medium is disclosed. The non-transitory computer-readable medium has instructions stored therein, wherein the instructions, when executed by a processor, cause the processor to: collect a plurality of punch-in data and a plurality of punch-out data from a plurality of client applications over at least one network, wherein each of the plurality of punch-in data comprises an identifier of a site, an identifier of an employee, and a timestamp representing a time at which that identified employee punched in to a shift at that identified site, and wherein each of the plurality of punch-out data comprises an identifier of a site, an identifier of an employee, and a timestamp representing a time at which that identified employee punched out of a shift at that identified site; compute hours data for each of a plurality of employees at one or more of a plurality of sites from the collected plurality of punch-in data and plurality of punch-out data; and provide the hours data at one or more summary levels and a detailed level by calculating summarized data for each of the plurality of sites from the hours data, presenting a visual representation of the summarized data for each of the plurality of sites as a first summary level with one or more inputs for selecting each of the plurality of sites, and, in response to a selection, at the first summary level, of at least one of the plurality of sites, presenting a visual representation of the hours data for the selected at least one site as the detailed level.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 11A illustrates an example of a punch-in user interface, according to an embodiment;

FIG. 11B illustrates an example of a punch-out user interface, according to an embodiment;

FIG. 13A illustrates an example of a new employee user interface, according to an embodiment;

FIG. 13B illustrates a confirmation user interface, according to an embodiment;

FIGS. 17A-17E illustrate user interfaces for displaying detail schedule management information for a week, according to embodiments;

FIGS. 18A-18F illustrate user interfaces of a tactical command center, according to embodiments.

DETAILED DESCRIPTION

In an embodiment, systems, methods, and non-transitory computer-readable media are disclosed for mobile workforce management. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
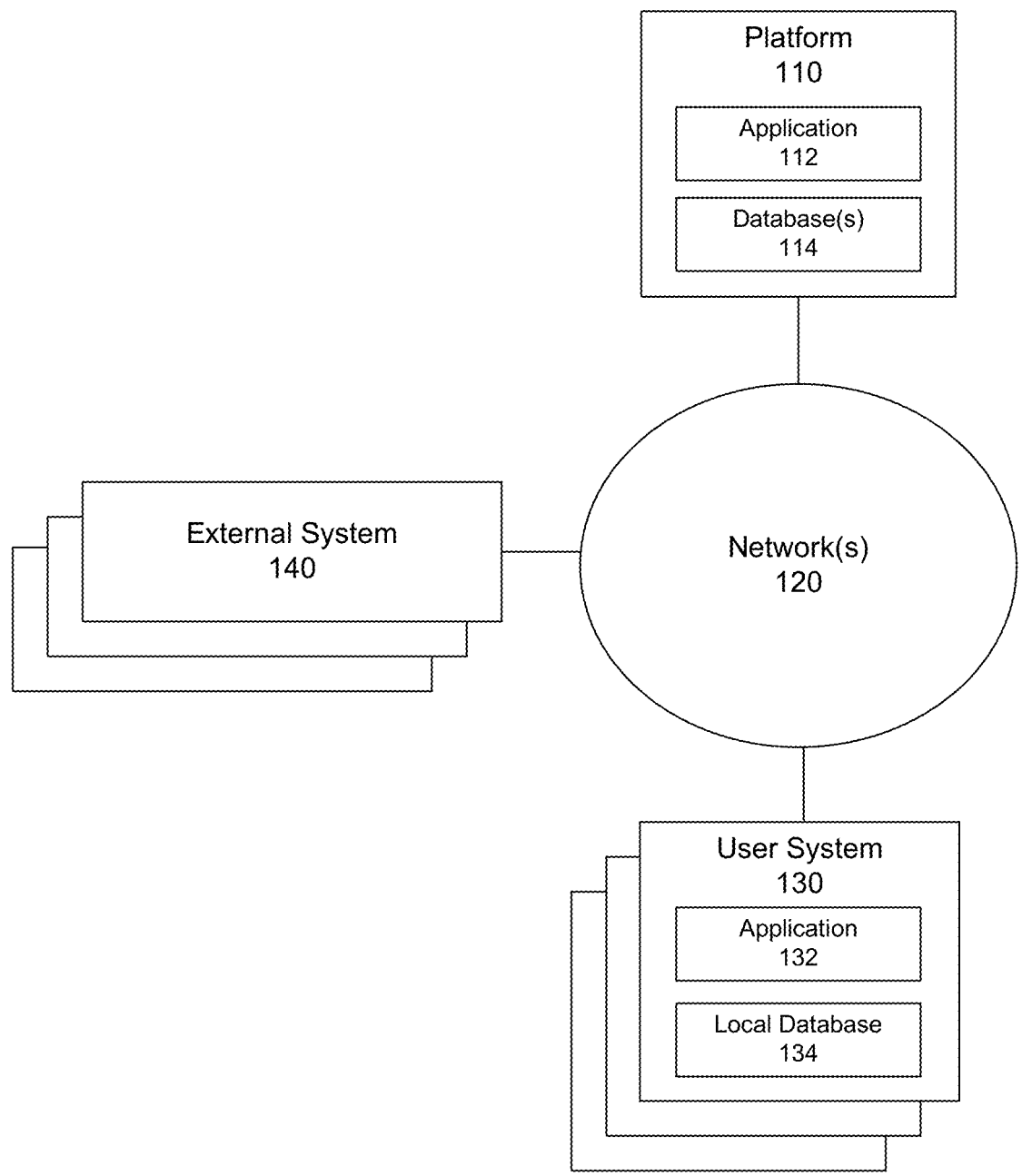
FIG. 1 illustrates an example infrastructure, in which one or more of the processed described herein, may be implemented, according to an embodiment.

FIG. 1 illustrates an example system for mobile workforce management, according to an embodiment. The infrastructure may comprise a platform 110 (e.g., one or more servers) which hosts and/or executes one or more of the various functions, processes, methods, and/or software modules (e.g., of the application) described herein. Platform 110 may comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., websites, apps, other platforms, etc.) via one or more networks 120. Network(s) 120 may comprise the Internet, and platform 110 may communicate with user system(s) 130 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. In an embodiment, platform 110 may not comprise dedicated servers, but may instead comprise cloud instances, which utilize shared resources of one or more servers. It should also be understood that platform 110 may comprise, but is not required to comprise, collocated servers or cloud instances. Furthermore, while platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. It should also be understood that user system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and the like. In addition, while only a few user systems 130 and external systems 140, one server application 112, and one set of database(s) 114 are illustrated, it should be understood that the infrastructure may comprise any number of user systems, server applications, and databases.

Platform 110 may comprise web servers which host one or more websites or web services. In embodiments in which a website is provided, the website may comprise one or more user interfaces, including, for example, webpages generated in HyperText Markup Language (HTML) or other language. Platform 110 transmits or serves these user interfaces in response to requests from user system(s) 130. In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to platform 110 and the responses from platform 110, including the user interfaces, may both be communicated through network(s) 120, which may include the Internet, using standard communication protocols (e.g., HTTP, HTTPS). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database 114) that are locally and/or remotely accessible to platform 110. Platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Sybase™, Access™, and the like, including cloud-based database instances and proprietary databases. Data may be sent to platform 110, for instance, using the well-known POST request supported by HTTP, via FTP, etc. This data, as well as other requests, may be handled, for example, by server-side web technology, such as a servlet or other software module (e.g., application 112), executed by platform 110.

In embodiments in which a web service is provided, platform 110 may receive requests from external system(s) 140, and provide responses in eXtensible Markup Language (XML) and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, etc., described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case application 112 performs all processing) or user system(s) 130 (e.g., in which case application 132 performs all processing) or be distributed between platform 110 and user system(s) 130 (e.g., in which case server application 112 and client application 132 both perform processing), can comprise one or more executable software modules that implement one or more of the processes, methods, or functions of the application described herein.

1.2. Example Processing Device

Figure 2:
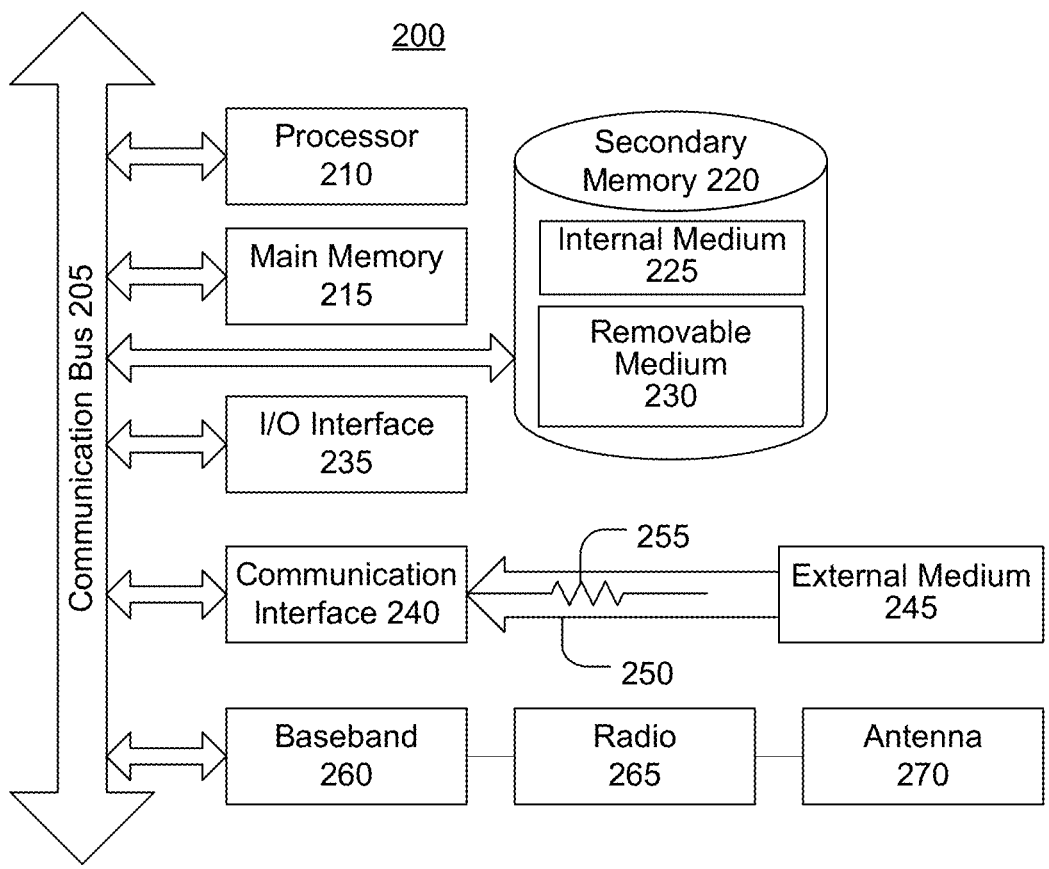
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example, system 200 may be used as or in conjunction with one or more of the mechanisms, processes, methods, or functions (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed above. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, etc.

Removable storage medium 230 is a non-transitory computer-readable medium having stored thereon computer-executable code (e.g., disclosed software modules) and/or data. The computer software or data stored on removable storage medium 230 is read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, etc. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also codes the digital signals for transmission and generates a baseband transmit audio signal that is routed to the modulator portion of radio system 265. The modulator mixes the baseband transmit audio signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

1.3. Example Platform

Figure 3:
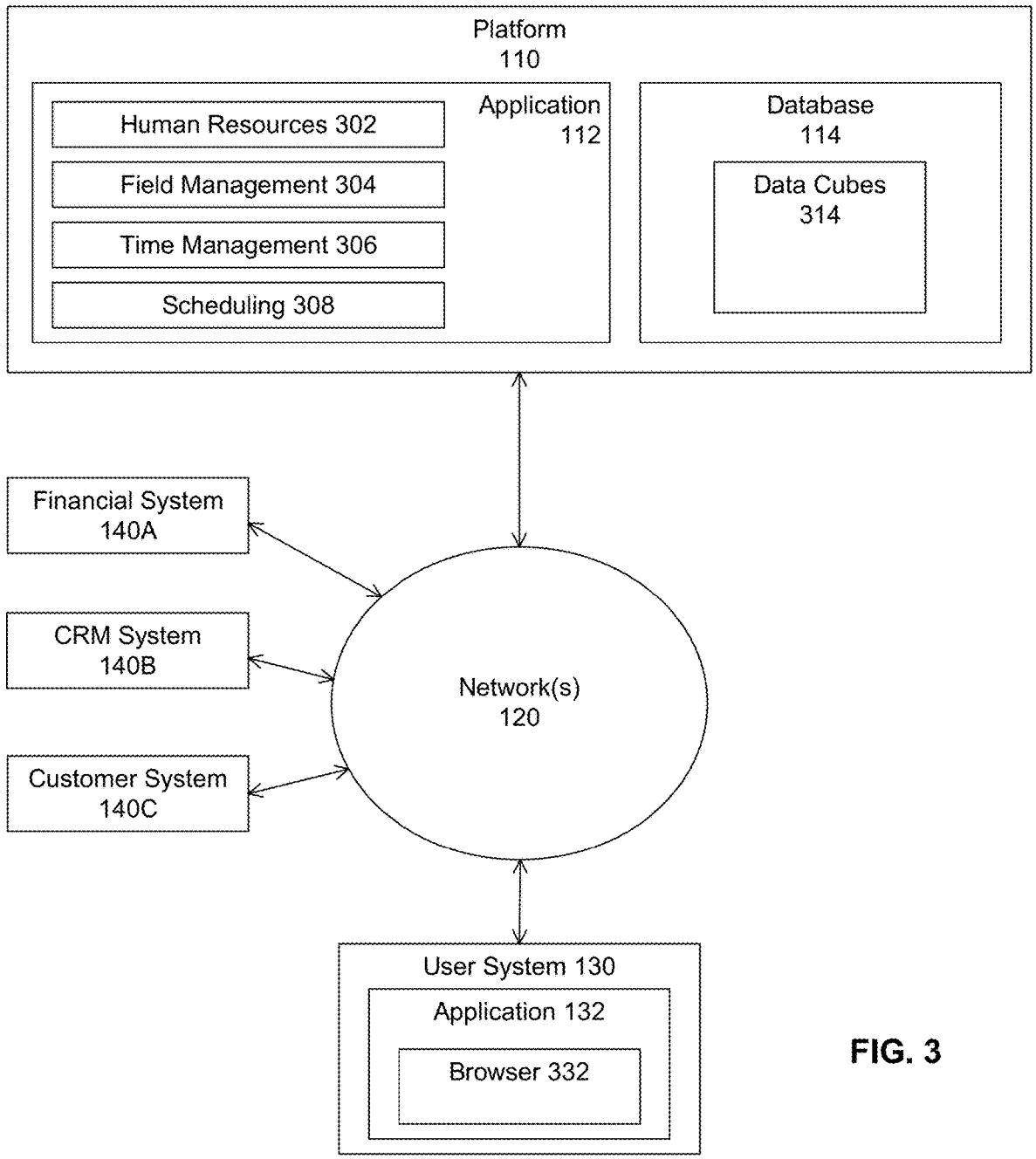
FIG. 3 illustrates an example platform, according to an embodiment.

FIG. 3 illustrates an example of platform 110 in FIG. 1, according to an embodiment. In the illustrated example, server application 112 on platform 110 comprises a human resources module 302, field management module 304, time management module 306, and scheduling module 308. Each of these modules may be implemented as supported, open source systems with well-defined integration points. Platform 110 may also provide software-as-a-service (SaaS) enterprise financial and customer relationship management systems (e.g., via communication with external systems 140A and 140B, respectively). Platform 110 may be licensable, such that customers can build their own front-end systems, while allowing server application 112 to perform much, if not all, of the processing for the licensed services in the background (e.g., as a web service). In such an embodiment, common databases, business logic, and components can be used to deliver the licensed services to various stakeholders via the defined integration points. These stakeholders may include both internal stakeholders (e.g., corporations, finance departments, sales departments, human resources departments, field management, customer service, etc.) and external stakeholders (e.g., customers, vendors, etc.).

In addition, client application 132 of each user system 132 may comprise or consist of a browser 332 (e.g., an Internet browser, such as Internet Explorer™, Chrome™, Safari™, Firefox™, Opera™, and the like). As mentioned above, an Internet browser is a form of thin client, such that most or all of the processing is performed server-side by server application 112, which may be configured to provide user interfaces (e.g., web pages) that are compatible with any browser 332.

In an embodiment, platform 110 is communicatively connected, via network(s) 120, to one or more financial systems 140A (e.g., Netsuite™), one or more customer relationship management (CRM) systems 140B (e.g, Netsuite™), one or more customer systems 140C, and/or other external systems.

In an embodiment, users can access the various modules available to them (e.g., based on their roles) from server application 112 via any browser 332 executing on any user system 130. These users may comprise those with financial roles, customer service roles, human resource roles, field roles, corporate roles, as well as customers, etc.

As illustrated, database 114 on platform 110 stores data cubes 314. The term "data cube," as used herein, refers to any multi-dimensional array of data. Although the term "cube" is used, the term "data cube" may refer to a dataset of any arbitrary dimension, including one-dimensional, two-dimensional, three-dimensional, four-dimensional, and so on. Database 114 may represent a single master source for each data entity managed by platform 110. Access to this multi-tenant data store is ensured by secure, role-based controls via well-defined interfaces and technologies.

Figure 4:
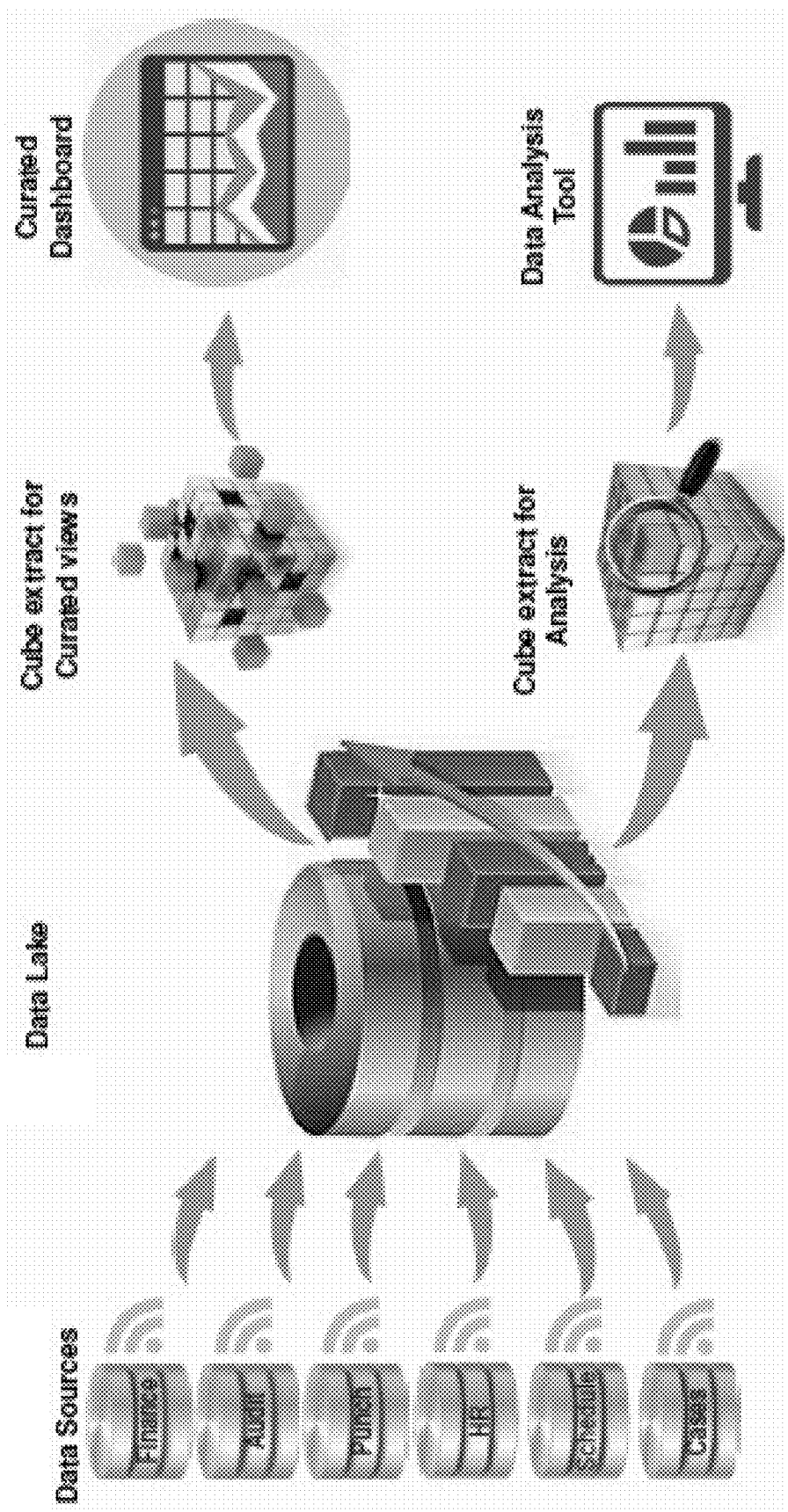
FIG. 4 illustrates data access, according to an embodiment.

FIG. 4 illustrates data access in database 114, according to an embodiment. As illustrated, data may be collected from a number of different sources into a data lake, comprising data cubes 314. This data may include, for example, financial, auditing, punch card, human resource, scheduling, and case data. Relevant data cubes may be extracted from data cubes 314 for curated views in a dashboard user interface (e.g., web pages) provided by server application 114 and/or analysis for a data analysis tool provided by server application 114 (and/or a connected external system 140).

1.4. Example Architecture

Figure 5:
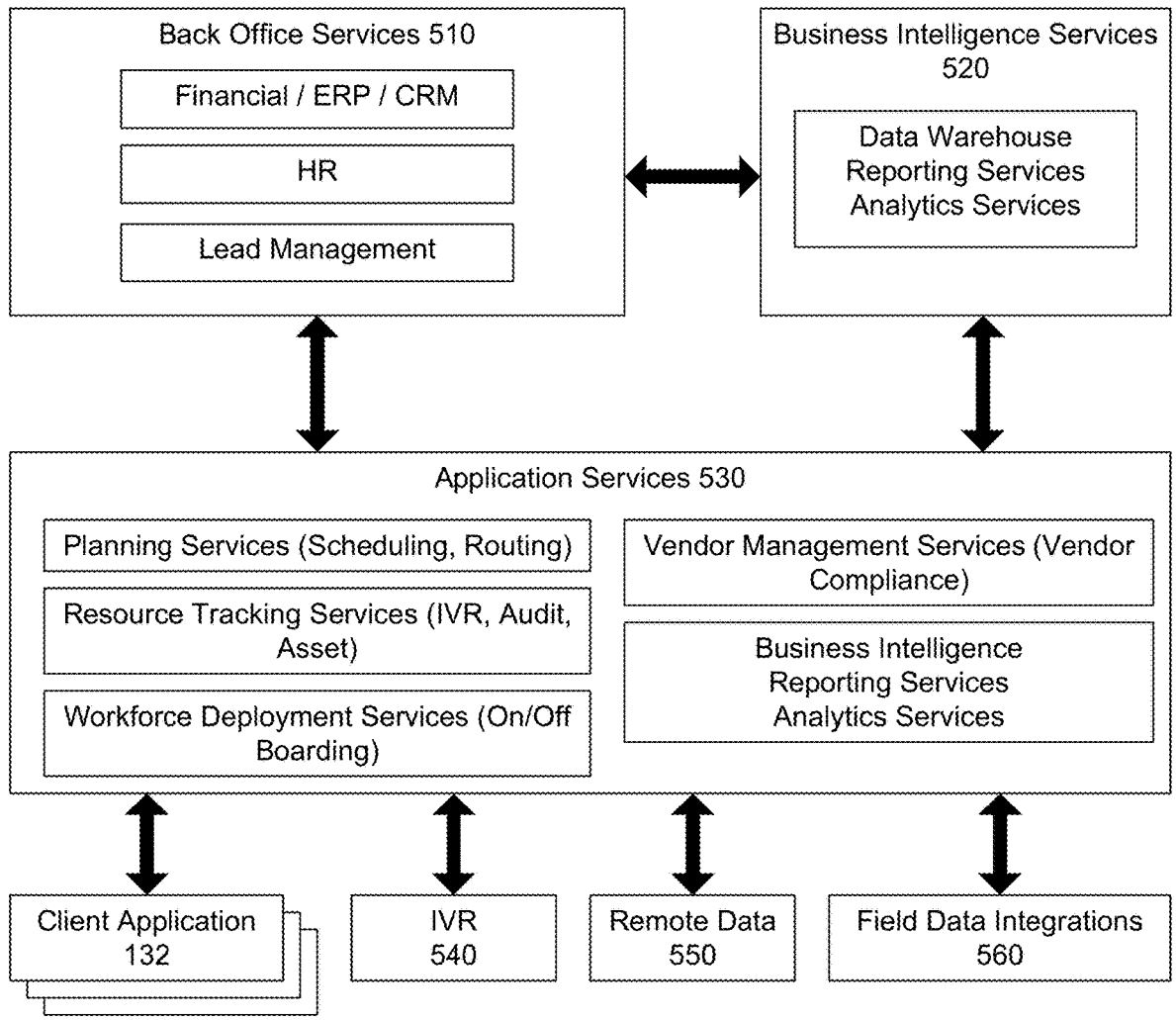
FIG. 5 illustrates an overview of a platform architecture, according to an embodiment.

FIG. 5 illustrates an overview of an architecture of platform 110, according to an embodiment. Platform 110 may provide back office services 510, business intelligence services 520, and applications services 530.

Back office services 510 may include financial services (e.g., NetSuite™), enterprise resource planning services (e.g., NetSuite™), customer relationship management services (e.g., NetSuite™), human resources services, lead management services (e.g., SalesForce™), and/or the like.

Business intelligence services 520 may include data warehousing, reporting services, analytics services, and/or the like.

Application services 530 may include planning services (e.g., scheduling, routing, etc.), resource tracking services (e.g., interactive voice response (IVR), audit, asset, etc.), workforce deployment services (e.g., on-boarding, off-boarding, etc.), vendor management services (e.g., vendor compliance), business intelligence, reporting services, analytics services, and/or the like. In addition, application services 530 communicate with client applications 132, IVR 540, remote data services 550, field data integrations 560, and/or the like.

1.5. Example Technology Stack

Figure 6:
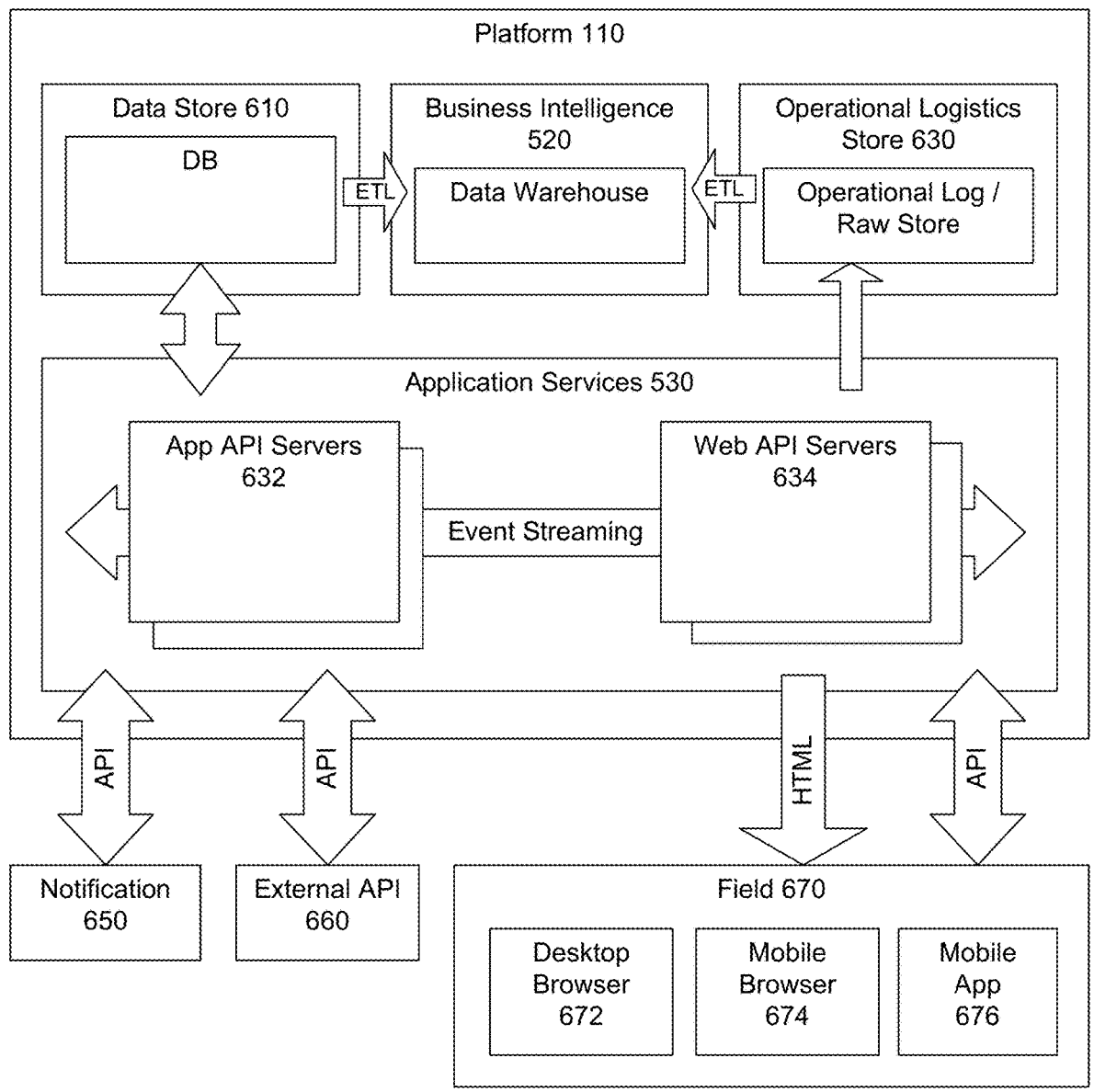
FIG. 6 illustrates an overview of a technology stack for a platform, according to an embodiment.

FIG. 6 illustrates an overview of a technology stack of platform 110, according to an embodiment. Platform 110 may provide a data store 610, business intelligence services 520, operational logistics store 630, and application services 530. In an embodiment, platform 110 may be implemented in the cloud (e.g., Amazon™ Web Services (AWS) Virtual Private Cloud (VPC)).

In an embodiment, data store 610 comprises a database (e.g., implemented as AWS Relational Database Service (RDS), Cassandra™, etc.) and provides data from the database to business intelligence services 520 (e.g., via an extract, transform, load (ETL) process). Data store 610 also transmits data to and receives data from application services 530.

In an embodiment, operational logistics store 630 comprises an operational logistics and raw data store (e.g., implemented as Hadoop Distributed File System (HDFS), AWS S3, etc.) and provides data from this store to business intelligence services 520 (e.g., via an ETL process). Operational logistics store 630 receives and stores data from application services 530.

In an embodiment, business intelligence services 520 provide a data warehouse (e.g., implemented as AWS Redshift™, PostgreSQL, MySQL, Tableau, Julia, R, etc.).

In an embodiment, application services 530 comprise event-driven App API server(s) 632 (e.g., implemented in a Java Virtual Machine (JVM), .NET™, C#, Java™, Scala™ JRuby™, etc.) and/or web API server(s) 634 (e.g., implemented in Ruby on Rails™, Node.js, Nginx™, etc.) which implement an API to application services 530. The API enables notification services 650 (e.g., AWS Simple Notification Service (SNS)), interactions with an external API 660 (e.g., via representational state transfer (REST)), and interactions with devices in the field 670, for example, via a desktop browser 672 (e.g., via HTML/AJAX), mobile browser 674 (e.g., via HTML/AJAX), and/or mobile app 676 (e.g., Android™, iOS™, etc.).

2. Process Overview

Embodiments of processes for mobile workforce management will now be described in detail. It should be understood that the described processes may be embodied in one or more software modules that are executed by one or more hardware processors, e.g., as the application discussed above (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130 such that some portions or modules of the application are executed by platform 110 and other portions or modules of the application are executed by user system(s) 130. The described processes may implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

2.1. User Roles

In an embodiment, users may be grouped into one of a plurality of user groups at a particular user level within that user group. A user's role may be defined by the user's particular user level within a particular user group. Each user role may then be associated with certain permissions within the application (e.g., available functions, modules, data access, user interfaces, etc.). In addition, the permissions for each user role may be different depending on a line-of-business setting, which, in an embodiment, may be either "vendor-managed" or "self-performed." Self-performed services refer to services that are provided using employees of a company, whereas vendor-managed services refer to services that are provided using vendors or contractors (i.e., not employees of the company).

As an example, the user groups may comprise, without limitation, a management group, field management group, customer service group, human resources group, finance group, and vendor group. Each of these groups may comprise one or more user levels. For example, the management group may comprise the user levels of chief-level, vice-president level, director level, manager level, and staff level. The field management group may comprise the user levels of line-of-business head level, regional vice president level, regional zone manager level, zone lead level, crew lead level, crew level, and project level. The finance group may comprise the user levels of accounts payable level, accounts receivable level, and payroll level. The vendor group may comprise the user levels of manager level, crew lead level, and crew level.

In an embodiment, the user levels may be hierarchically arranged. For example, in the field management group, the line-of-business head level may be the highest management level, and may be responsible for one or more regional vice presidents and their respective regions. The regional vice president level is the second highest level, and may be responsible for one or more regional zone managers and their respective regions. The regional zone manager level is the third highest level, and may be responsible for one or more zone leads and their respective zones. The zone lead level is the fourth highest level, and may be responsible for one or more crew leads and their respective sites. The crew lead level may be the fifth highest level, and may be responsible for one or more crew members at a site. The zones may be defined to include a set of sites (e.g., stores within a certain geographical region), the regional zones may be defined to include a set of zones, and the regions may be defined to include a set of regional zones.

2.2. User Interface

In an embodiment, when using client application 132, the initial user interface or landing page may depend on whether or not a context is set, the user's level, and/or the line of business. For example, for the field management group, the initial user interface or landing page may be set as shown in Table 1 below:

TABLE 1

| Line-of-Business | User Level | If Context Set | If Context Not Set |
|---|---|---|---|
| Vendor-Managed | Line-of-Business | Tact'l Command Center | Context Setting Page |
| Vendor-Managed | Regional Vice Pres. | Tact'l Command Center | Context Setting Page |
| Vendor-Managed | Regional Zone Mgr. | RZM Landing Page | RZM Landing Page |
| Vendor-Managed | Vendor | Vendor Landing Page | N/A |
| Self-Performed | Line-of-Business | Tact'l Command Center | Context Setting Page |
| Self-Performed | Regional Vice Pres. | Tact'l Command Center | Context Setting Page |
| Self-Performed | Regional Zone Mgr. | Tact'l Command Center | Context Setting Page |
| Self-Performed | Zone Lead | Zone Lead Landing Page | N/A |
| Self-Performed | Crew | Crew Landing Page | N/A |

Figure 7:
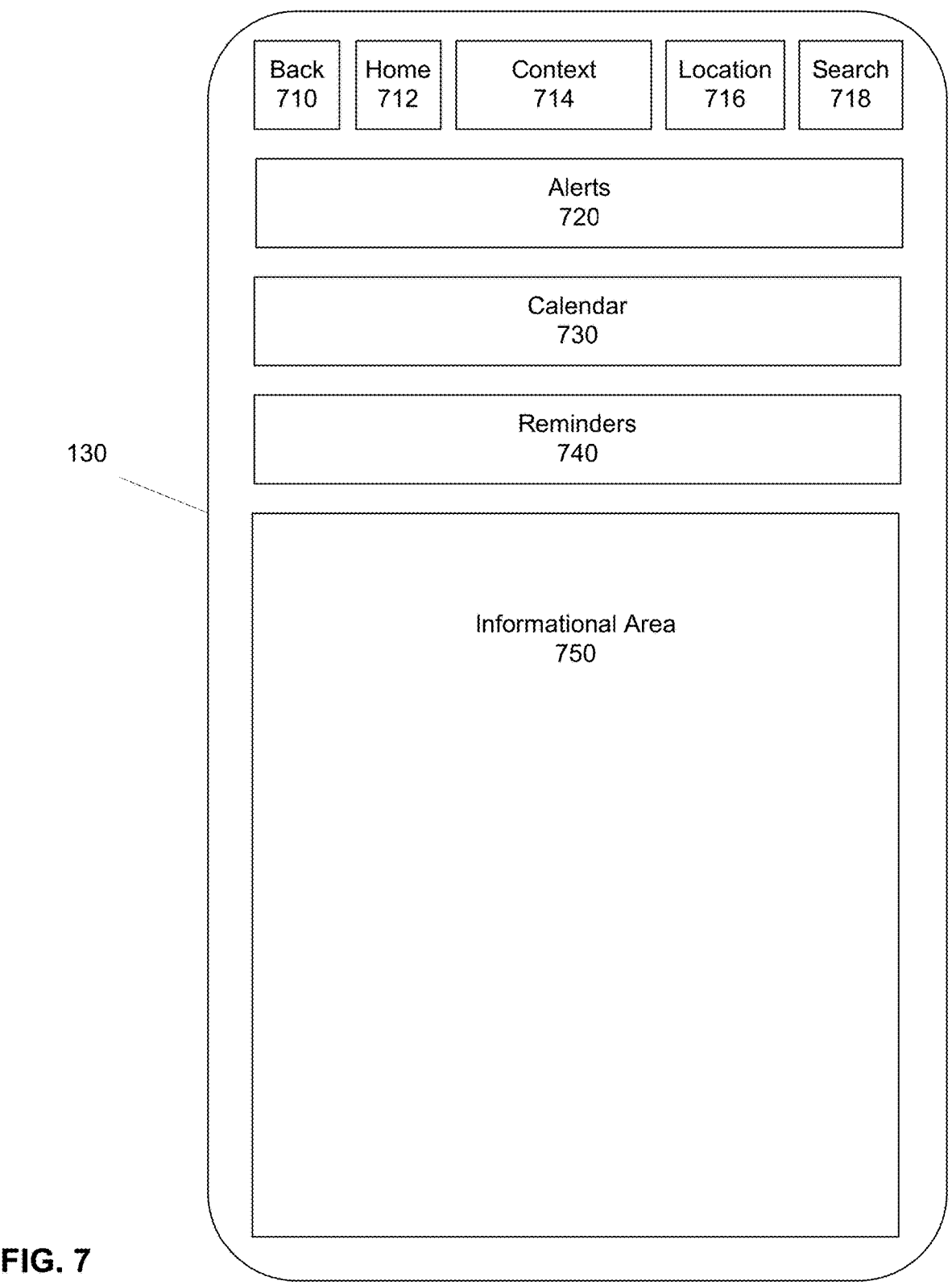
FIG. 7 illustrates an arrangement of a user interface of an application, according to an embodiment.

FIG. 7 illustrates an arrangement of a user interface of the application, according to an embodiment. As discussed elsewhere herein, the user interface may be implemented as a webpage provided by server application 112 and displayed in a browser of user system 130 and/or a user interface of a client application 132 executing on user system 130. While certain inputs and other components of the user interface are illustrated, it should be understood that other embodiments and may comprise a subset of the illustrated components and/or additional or different components than those illustrated, as well as a different arrangement of components. It should also be understood that a user may interact with the user interface using any one or more standard input techniques, such as touching a touch panel with a finger or stylus, inputting information into or selecting components of the user interface using a keyboard and/or mouse, etc.

In the illustrated embodiment, the user interface comprises a back input 710, a home input 712, a context area 714, a location area 716, a search input 718, an alerts area 720, a calendar area 730, a reminders area 740, and an informational area 750. Components 710-740 may be common across two or more user interfaces of the application, such that only the content of informational area 750 changes across the user interfaces. However, in an alternative embodiment, when the user navigates away from the main or home screen, informational area 750 may be expanded so as to exclude calendar area 730 and reminders area 740 from the user interface, such that in the dedicated user interfaces, discussed elsewhere herein, the user interface comprises only back input 710, home input 712, context area 714, location area 716, search input 718, alerts area 720, and informational area 750. In another embodiment, one or more of the user interfaces may take up more of the display area, including potentially the entire display area.

Back input 710, when selected by the user, returns the displayed user interface to a user interface that was displayed immediately before the currently displayed user interface. In other words, back input 710 takes the user one step back in the navigational history of the user interfaces. If the current user interface has received unsaved data prior to the user's selection of back input 710, the user may be prompted, via the current user interface, whether or not to save the unsaved data prior to returning to the prior user interface and provided with inputs to either save the unsaved data, return without saving the unsaved data, and/or cancel the selection of back input 710.

Home input 712, when selected by the user, changes the displayed user interface to a main or home screen. Embodiments of the main screen are described elsewhere herein. If the current user interface has received unsaved data prior to the user's selection of home input 712, the user may be prompted, via the current user interface, whether or not to save the unsaved data prior to changing to the main screen and provided with inputs to either save the unsaved data, change to the main screen without saving the unsaved data, and/or cancel the selection of home input 712.

Context area 714 may indicate the current context setting (e.g., via displayed text describing the current context setting) and/or comprise an input for displaying the context setting user interface, which is described elsewhere herein.

Location area 716 may indicate the current location of the user, for example, as determined from Global Positioning System (GPS) data obtained from a GPS receiver in user system 130 being used by the user. Location area 716 may display the location as an address, site name (e.g., store name), site identifier, and/or the like.

Search input 718 enables a user to perform a global search within the application. When selected by a user, search input 718 may provide inputs for setting a search context and/or entering one or more search terms. The available search contexts may depend on a user's role. For example, the search contexts for the field management group may include employees, sites (e.g., stores), cases, and/or audits. Based on the search context, one or more data entry fields may be displayed for entering search terms relevant to that search context (e.g., first name and last name for the employees context, city and state for the sites context, etc.).

In an embodiment, alerts area 720 provides any relevant alerts, or one or more of the most recent alerts. For example, alerts for a user in the field management group may include a notification of a new case (e.g., entered by a customer service representative), a notification that hiring paperwork has not been started within a predetermined time period (e.g., 24 hours, 48 hours, etc.) from confirmation, a notification that hiring paperwork has remained incomplete for a predetermined time period (e.g., 24 hours), a notification that an audit is overdue (e.g., for a scheduled audit, with store info and number of days/weeks overdue), a notification that a manager is seeking authorization (e.g., for hiring outside of the wage cap, allowing overtime for an employee, etc.). Each alert may indicate a date (e.g., the date or time the alert was posted), an alert type (e.g., hire, fire, case, audit, overtime authorization, wage authorization, etc.), and/or an alert message. Furthermore, when a user selects an alert in alert area 720, further details for the alert may be displayed (e.g., in an overlay or new user interface) and/or the user interface may be changed to a user interface for addressing the alert (e.g., with inputs for closing a case, starting or completing hiring paperwork, completing an audit, providing approval of hiring outside the wage cap or overtime for an employee, etc.). Once the alert has been appropriately addressed, it may be removed from alerts area 720.

In an embodiment, alerts area 720 may also provide punch-in and punch-out alerts for users in the field management group. A punch-in alert may occur in one or more of the following circumstances:

(1) When a location at which an employee is scheduled to work does not match a location at which the employee punched in to work (i.e., indicated his or her arrival at the work site), an alert may be sent to the employee's manager;

(2) When a time at which the employee punched in to work is more than a predetermined amount of time (e.g., 10 minutes) after the time at which the employee was scheduled to start working, an alert may be sent to the employee's manager; and/or (3) When the current time is a predetermined amount of time (e.g., 1 minute) after the time at which the employee was scheduled to stop working and the employee has not yet punched out of work (i.e., indicated that he or she has ended his or her work), an alert may be sent to the employee's manager.

A punch-out alert to a manager may occur in one or more of the following circumstances:

(1) When the current time is a predetermined amount of time (e.g., 15 minutes) before the time at which the employee is scheduled to stop working, an alert may be sent to the employee;

(2) When the current time is a predetermined amount of time (e.g., 1 minute) after the time at which the employee is scheduled to stop working and the employee has not yet punched out of work, an alert may be sent to the employee (e.g., informing the employee that he or she has exceeded his or her scheduled shift and/or that his or her manager will be alerted) and/or the employee's manager;

(3) When the current time is a predetermined amount of time (e.g., 15 minutes) after the time at which the employee is scheduled to stop working, an alert may be sent to the employee (e.g., informing the employee that he or she has exceeded his or her scheduled shift, that his or her manager will be alerted, and/or that the employee will be automatically punched out) and/or the employee's manager, and the employee may be punched out by the application (e.g., automatically or after the manager's confirmation); and/or (4) At any time during the employee's shift, if the current location of the employee (e.g., as determined by a GPS receiver in the user system 130 of the employee) is not within a predetermined radius (e.g., 1 mile) of a location at which an employee is scheduled to be currently working and/or does not represent a location of another valid work site, an alert may be sent to the employee (e.g., informing the employee that his or her current location is outside the predetermined radius from the scheduled location and/or that his or her manager will be alerted) and/or to the employee's manager.

The term "employee," as used herein, may refer to any type of worker, including staff, independent contractors, interns, and other individuals utilized and managed by a company, third party, or other entity.

In an embodiment, calendar area 730 provides a view of actions for a set time period (e.g., the current day, the current week, the current month, a rolling 30 days, etc.). The list of actions may be arranged in the form of a calendar grid, a scrollable list of actions, or the like. For a user in the field management group, example actions include, without limitation, audits (e.g., displaying site identifier, customer identifier, location, due date, etc.), open cases (e.g., displaying site identifier, customer identifier, location, date the case was opened, etc.), customer visits (e.g., displaying site identifier, customer identifier, location, due date, reason, such as escalation, store opening, customer request, etc.), on-boarding to be finished (e.g., based on a due date of 24 hours or other predetermined time period since initiation), and/or the like. The actions may be presented in the form of a to-do list, and may include an identifier of the user or system which generated the action, a type of action (e.g., hire, audit, visit), a date and/or time the action was created, a status of the action (e.g., overdue, completed, etc.), and/or the like. Furthermore, when a user selects an action in calendar area 730, further details (e.g., comments, time stamp, etc.) for the action may be displayed (e.g., in an overlay or new user interface) and/or the user interface may be changed to a user interface for completing the action. Once the action has been completed, an indication that the action has been completed may be displayed and/or the action may be removed from calendar area 730.

In an embodiment, reminders area 740 provides reminders to the user. These reminders may comprise or consist of system-generated actions or to-do items, such as a number of audits to complete over a predetermined time period (e.g., week, month, etc.), actions to be performed daily (e.g., check overtime hours, check attendance, check supplies and/or repair coverage, etc.), on-boarding forms to be completed, and/or the like.

2.3. Context Setting

In an embodiment, a user's data view within the application may depend on a data context setting. If no context is set, by default, a user may have a data view commensurate with the full span of the user's role.

Figure 8:
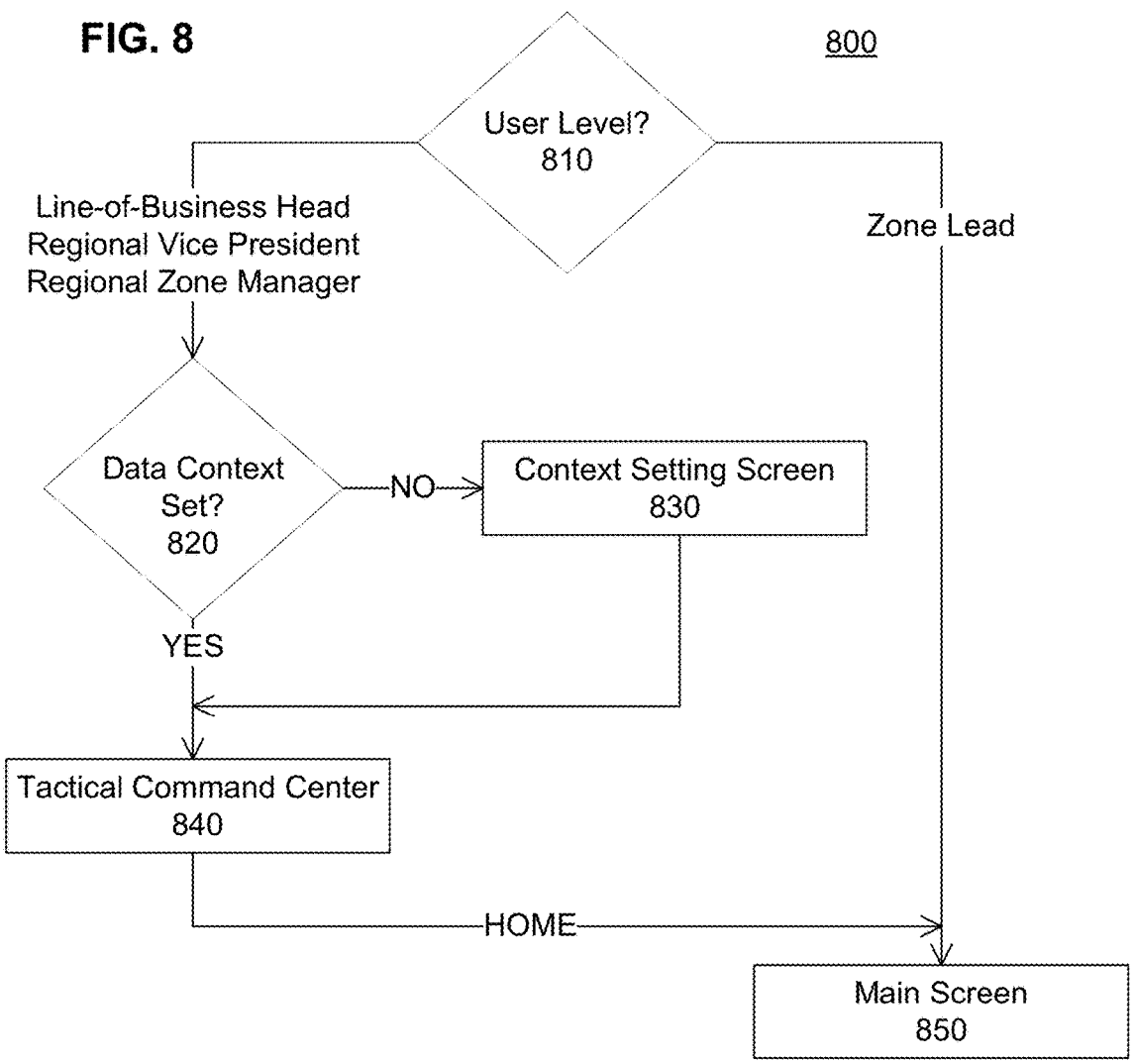
FIG. 8 illustrates an example of a context setting process, according to an embodiment.

FIG. 8 illustrates an example of the context setting process 800 for a user in the field management group, according to an embodiment. In step 810, the user's user level is determined, for example, at the time at which the application is started by a particular user (e.g., by selecting an icon for a client application 132 on user system 130, or logging into a webpage provided by server application 112). If the user level is the zone lead, in step 850, the user is directed to the main or home screen of the application. Otherwise, if the user level is the line-of-business head, regional vice president, or regional zone manager, in step 820, it is determined whether or not the data context is set. If the context is not set, in step 830, the user is directed to the context setting user interface to set the context.

After setting the context in step 830 or if the context is determined to have already been set in step 820, in step 840, the user is directed to the tactical command center. From the tactical command center, a user may select the main screen, in which case the user will be directed to the main screen in step 850.

The context setting user interface may comprise one or more inputs for setting the user's desired context. As illustrated by steps 820 and 830 of process 800, the context setting user interface may be the first screen displayed by the application for certain user roles when the user has not yet setting a context. Furthermore, in an embodiment, the context setting user interface may be accessible from all other user interfaces within the application (e.g., via context area 714).

Figure 9:
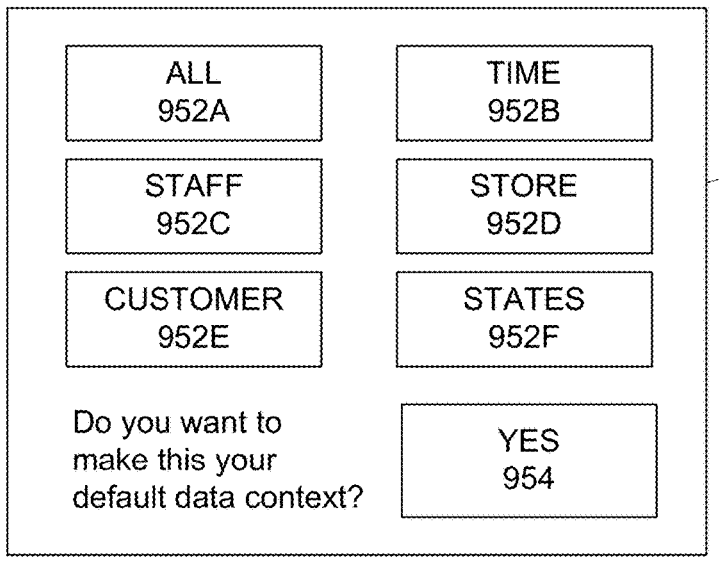
FIG. 9 illustrates an example of a context setting user interface, according to an embodiment.

FIG. 9 illustrates an example of a context setting user interface, according to an embodiment. Specifically, in step 830 of process 800, informational area 750A may be displayed so as to include inputs 952 for selecting a particular context, such as input 952A for setting the context to all data within the span of the user's role, input 952B for setting the context to include a specific time period (e.g., today, week-to-date, month-to-date, year-to-date, etc.), input 952C for setting the context to include one or more specific employees (e.g., selected via lists of employees within the user's role and/or current context), input 952D for setting the context to include one or more specific sites (e.g., selected via a list comprising all stores within the span of the user's role and/or current context), input 952E for setting the context to include one or more specific customers (e.g., selected via a list comprising all customers within the span of the user's role and/or current context), input 952F for setting the context to include one or more specific states (e.g., selected via a list comprising all states within the span of the user's role and/or current context). Once a particular context is selected, a user may select input 954 to save the selected context as the current context to be used for data retrieval within the application. In an embodiment, informational area 750A may allow a user to select a combination of contexts (e.g., by selecting a combination of a particular time period, one or more employees, one or more sites, one or more customers, and/or one or more states).

In an embodiment, the context, set by the user, affects what sites and employees a user is able to view, for example, in the various site and employee lists described herein. For example, setting the context to a specific state may result in only those sites and employees that are located within that state being shown in the various lists of sites and employees throughout the application.

2.4. Main Screen

Figure 10:
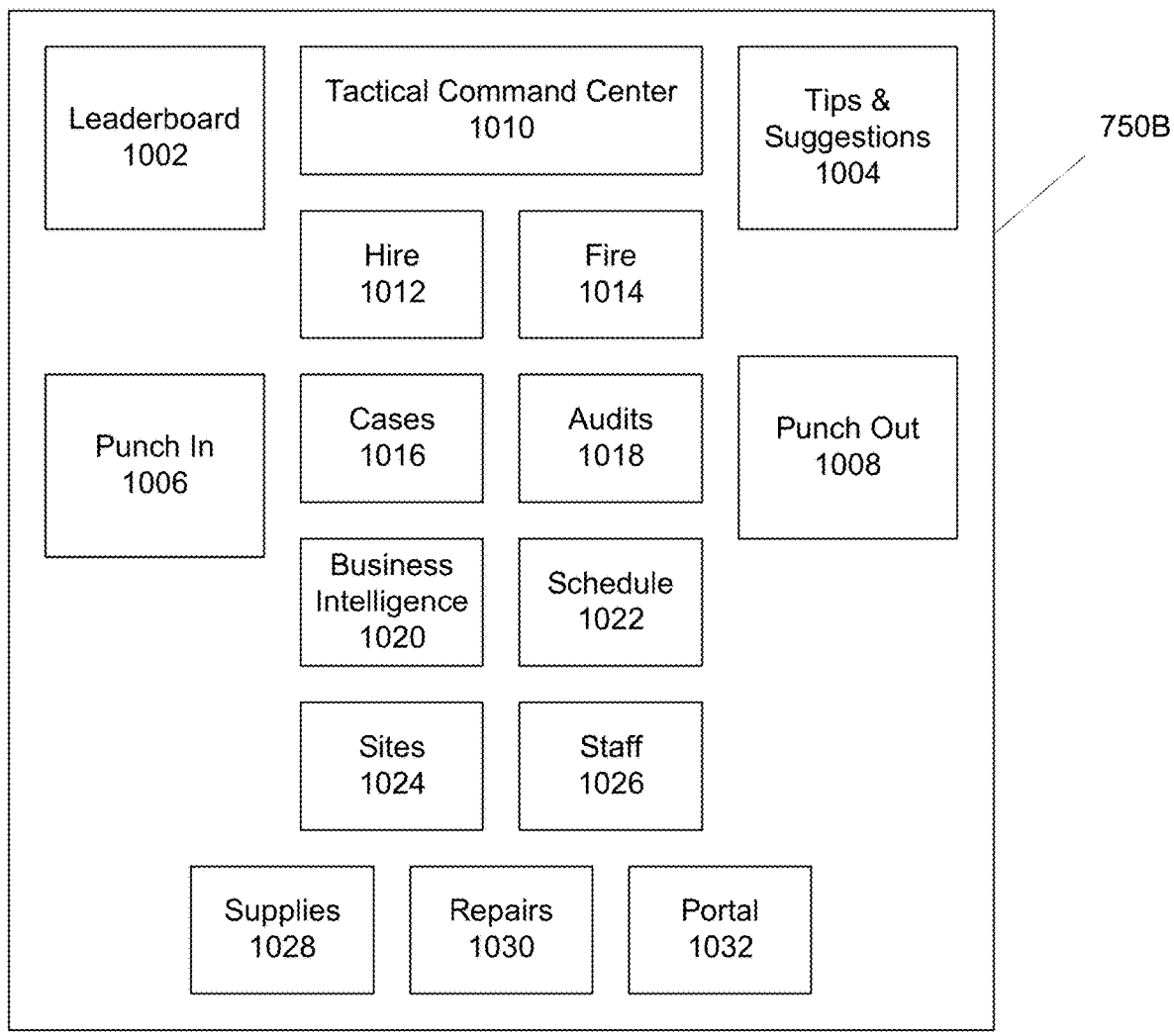
FIG. 10 illustrates an example of a main or home screen, according to an embodiment.

FIG. 10 illustrates an example of the content of informational area 750B on the main or home screen for a user in the field management group, in the self-performed line of business, according to an embodiment. In the illustrated example, there is a leaderboard area 1002, a tips and suggestions area 1004, a punch-in area 1006, a punch-out area 1008, a tactical command center area 1010, a hire area 1012, a fire area 1014, a cases area 1016, an audits area 1018, a business intelligence area 1020, a schedule area 1022, a sites area 1024, a staff area 1026, a supplies area 1028, a repairs area 1030, and a portal area 1032. Each area may comprise information and/or an input (e.g., icon) for displaying a user interface related to the particular area. For example, selection of tactical command center area 1010 may change the user interface to one dedicated to the tactical command center, selection of hire area 1012 may change the user interface to one dedicated to a hiring process, selection of fire area 1014 may change the user interface to one dedicated to a firing process, selection of cases area 1016 may change the user interface to one dedicated to case management, and so on. In addition, supplies area 1028 and repairs area 1030 may change the user interface or direct the user to a user interface dedicated to managing or ordering supplies and repairs, respectively.

In an embodiment, any issue with any of these particular areas may be indicated within the area. For example, tactical command center area 1010 may be highlighted if there are any items in need of attention in the tactical command center, hire area 1012 may be highlighted if there is an incomplete hiring of an employee in progress, fire area 1014 may be highlighted if there is an incomplete firing of an employee in progress, cases area 1016 may be highlighted if there are any open cases, audits area 1018 may be highlighted if there are any open audits, and so on. The highlighting may comprise a colored background (e.g., red) within the respective area, bold borders for the respective area, text indications, and/or the like.

In an embodiment, a user may only be able to see a subset of one or more of the areas 1002-1032 in informational area 750B, depending on that user's role within the application. For example, an employee-user without hiring or firing authority may not have a hire area 1012 and fire area 1014. Similarly, a non-shift user may not have a punch-in area 1006 and punch-out area 1008. A user without any employees or management responsibilities, may not have a site area 1024 and staff area 1026. In this manner, only those areas available to a user, based on his or her user role, are visible and accessible to that user.

In an embodiment, the main screen may comprise other area or inputs, such as a map input. When selected, the map input may change at least a portion of the user interface (e.g., informational area 750B or a pop-up frame over the current user interface) to a user interface that shows a virtual map image with indications of each site, within the user's responsibility and/or current context, located on the virtual map image at a location corresponding to its physical address. The virtual map user interface may comprise typical navigation functions, such as providing directions from a current location of the user (e.g., determined using a GPS function of the user's mobile user system 130) to a site selected on the virtual map image.

In an embodiment, informational area 750 on the main or home screen for a user in the field management group, in the vendor-managed line of business may be different than in the self-performed line of business. For example, the informational area 750 for the vendor-managed line of business may only include leaderboard area 1002, tips and suggestions area 1004, punch-in area 1006, punch-out area 1008, cases area 1016, audits area 1018, and sites area 1024.

2.5. Leaderboard

In an embodiment, selection of leaderboard area 1002 changes at least a portion of the user interface of the application (e.g., informational area 750) to one dedicated to a leaderboard that ranks at least a subset of employees based on their performances over a given time period. The leaderboard can aid in building a sense of community within a company.

For example, the leaderboard user interface may list a performer of the week, month, quarter, and/or year for a given company or context. The list may comprise, for each listed performer, the performer's name, an image of the performer, and/or an indication of the performer's performance results. The listed performers may be broken down by region (e.g., national), user level (e.g., zone leader, zone manager, regional vice president), line of business (e.g., vendor-managed or self-performed), etc.

The list may be periodically updated (e.g., daily, weekly, monthly, etc.). The evaluation criteria used for ranking employees' performances may include total costs, labor costs, supply costs, repair costs, mileage, and/or any other parameters. The costs may be measured and compared relative to a relevant budgeted value (e.g., by the percentage of an employee's costs to his or her budgeted costs). Top-performing employees may be rewarded according to any known method (e.g., recognition, financial bonuses, gift cards, etc.).

2.6. Tips and Suggestions

In an embodiment, selection of tips and suggestions area 1010 changes at least a portion of the user interface of the application (e.g., informational area 750) to one dedicated to tips and suggestions. As with the leaderboard, the tips-and-suggestions user interface can aid in building a sense of community within a company.

In an embodiment, the tips-and-suggestions user interface provides a list of one or more tips and/or one or more inputs for accepting a tip from a user. The list of tips may include a most popular tip that is updated periodically (e.g., daily, weekly, monthly, etc.). The tip may be displayed with an indication of its originator (e.g., first and last name or username of the originating user). In addition, users may vote a tip up and/or down (e.g., by selecting a "like" input to vote the tip up), and the popularity of the tip may be determined based on the number of votes. Tips may include, for example, ways to reduce overtime, reduce repair costs, reduce supply costs, and/or other ways to improve the business.

In an embodiment, the tips-and-suggestions user interface provides one or more inputs for accepting suggestions from the user. For example, the suggestions may include suggestions on how to improve the application, systems, and/or overall processes. Users who submit a suggestion that is eventually implemented may be rewarded, for example, by recognition (e.g., within the tips-and-suggestions and/or leaderboard user interfaces) and/or financial bonuses (e.g., gift cards).

The application may automatically or semi-automatically filter out inappropriate tips and/or suggestions (e.g., via keyword matching, users flagging a tip or suggestion, etc.), as well as inform the user and/or the user's manager when a user has input an inappropriate tip or suggestion. The tips-and-suggestions user interface may also provide the ability to categorize tips and/or suggestions (e.g., labor control, overtime control, etc.) and/or search tips and/or suggestions (e.g., by topic, from a specific user, etc.).

2.7. Punch In

In an embodiment, selection of punch-in area 1006 changes at least a portion of the user interface of the application (e.g., informational area 750) to one dedicated to punching into a shift. It should be understood that a "punch in," as used herein, is an indication that an employee has begun his or her shift. FIG. 11A illustrates an example of informational area 750C after a user has selected punch-in area 1006, according to an embodiment.

As illustrated, informational area 750C may comprise an area 1110 which, for an employee-user, indicates the employee's next scheduled shift, including, for example, the shift location (e.g., site identifier, site name, address, etc.) and/or the start and/or end time of the employee's next scheduled shift. Informational area 750C may also comprise an area 1112, which indicates the employee's current location and/or the current time. In addition, informational area 750C may comprise a status message area 1116, which indicates a current status of the employee and/or the employee's shift (e.g., whether or not the employee is punched-in and/or for what shift or location the employee is punched-in).

In an embodiment, informational area 750C comprises a punch-in input 1114. When the employee-user selects punch-in input 1114, the employee may be "punched in" to his or her next shift. When the employee selects punch-in input 1114 in the user interface of client application 132, client application 132 may notify server application 114, via network(s) 120, that the employee has punched in for a particular shift. This punch-in notification may comprise one or more messages that include, for example, an employee identifier, a shift identifier, a location (e.g., GPS coordinates, site identifier, etc.), a timestamp (e.g., indicating date and time), and/or the like, and may be recorded by server application 112 (e.g., in database 114).

Figure 12A:
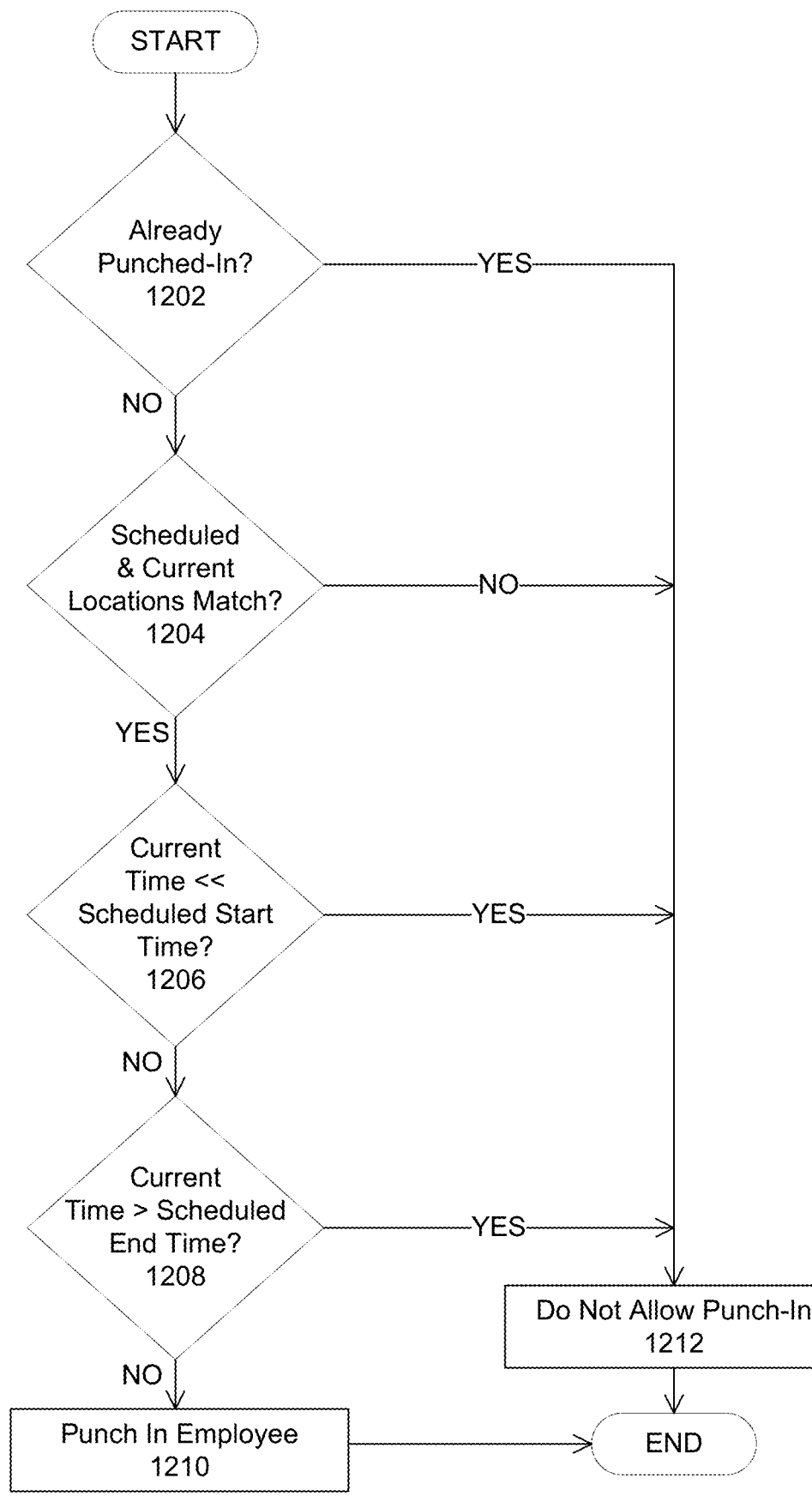
FIG. 12A illustrates an example of a process for determining whether or not an employee's punch-in is proper, according to an embodiment.

Selection of punch-in area 1006 or punch-in input 1114 may result in the execution of a process for determining whether or not the punch-in is proper. FIG. 12A illustrates an example of such a determination process, according to an embodiment. Process 1200 may be performed wholly by server application 112, wholly by client application 132, or with different steps performed by server application 112 and client application 132.

Process 1200 may begin in step 1202 with a determination of whether or not the employee-user has already punched-in. If the employee has already punched in (i.e., "YES" in step 1202), regardless of location, process 1200 proceeds to step 1212, in which the employee is not allowed to punch-in. Otherwise, if the employee has not already punched in (i.e., "NO" in step 1202), process 1200 proceeds to step 1204.

In step 1204, a determination is made as to whether or not the employee's current location matches the location of the employee's next scheduled shift. The employee's current location may be determined, for example, using a GPS receiver of user system 130 or other location determination method (e.g., triangulation, user input, etc.). The employee's current location may be determined to match the scheduled location if it is within a predetermined radius from the scheduled location (or the scheduled location is within a predetermined radius from the current location) or otherwise corresponds to the scheduled location (e.g., corresponds to the same address as the scheduled location). If the employee's current location does not match the scheduled location (i.e., "NO" in step 1204), process 1200 proceeds to step 1212, in which the employee is not allowed to punch in. Otherwise, if the employee's current location does match the scheduled location (i.e., "YES" in step 1204), process 1200 proceeds to step 1206. In instances in which the employee's current location does not match the scheduled location (i.e., "NO" in step 1204), the application (e.g., server application 112) may alert the employee's manager and optionally inform the employee that his or her manager has been alerted.

In step 1206, a determination is made as to whether the current time is more than a predetermined duration (e.g., 1 minute, 5 minutes, 15 minutes, etc.) prior to the time at which the employee is scheduled to start his or her shift. If the current time is more than the predetermined duration prior to the scheduled start time (i.e., "YES" in step 1206), process 1200 proceeds to step 1212, in which the employee is not allowed to punch in. Otherwise, if the current time is less than the predetermined duration prior to the scheduled start time or after the scheduled start time (i.e., "NO" in step 1206), process 1200 proceeds to step 1208. In instances in which the current time is more than a predetermined duration (e.g., 10 minutes, 15 minutes, etc.) after the scheduled start time (e.g., indicating that the employee is late to his or her shift), the application (e.g., server application 112) may alert the employee's manager and optionally inform the employee that his or her manager has been alerted.

In step 1208, a determination is made as to whether the current time is after the time at which the employee is scheduled to end his or her shift. If the current time is after the scheduled end time (i.e., "YES" in step 1208) or optionally within a predetermined duration (e.g., 5 minutes) prior to the scheduled end time, process 1200 proceeds to step 1212, in which the employee is not allowed to punch in. Otherwise, if the current time is not after the scheduled end time (i.e., "NO" in step 1208), process 1200 proceeds to step 1210. In instances in which the current time is after the scheduled end time (i.e., "YES" in step 1208) or optionally within a predetermined duration prior to the scheduled end time (e.g., 15 minutes, 30 minutes, etc.), the application (e.g., server application 112) may alert the employee's manager and optionally inform the employee that his or her manager has been alerted.

In step 1210, the employee-user is punched in to his or her scheduled shift. Specifically, client application 132 may notify server application 112 that the employee has begun his or her shift. Server application 112 may record the that the employee has punched in, for example, by recording an employee identifier, shift identifier, location, timestamp representing the date and time that the punch-in was accepted, and/or the like.

On the other hand, in step 1212, the employee-user may be notified that he or she is not allowed to punch in and/or the reason that he or she is not allowed to punch in. For example, in the case of "YES" in step 1202, the employee may be informed that "you are already punched in at <location> since <date/time>." In the case of "NO" in step 1204, the employee may be informed that "you are not scheduled to work at this location." In the case of "YES" in step 1206, the employee may be informed that "you are attempting to punch in before your shift; please try again at the scheduled time." In the case of "YES" in step 1208, the employee may be informed that "your shift has already ended."

It should be understood that steps 1202-1208 of process 1200 may be reordered in any manner without changing the result of process 1200.

2.8. Punch Out

In an embodiment, selection of punch-out area 1008 changes at least a portion of the user interface of the application (e.g., informational area 750) to one dedicated to punching out of a shift. It should be understood that a "punch out," as used herein, is an indication that an employee has ended his or her shift. FIG. 11B illustrates an example of informational area 750D after a user has selected punch-out area 1008, according to an embodiment.

As illustrated, information area 750D may comprise an area 1120 which, for an employee-user, indicates the shift into which the employee is currently punched, including, for example, the shift location (e.g., site identifier, site name, address, etc.) and/or the start and/or end time of the employee's current shift. As with informational area 750C, informational area 750D may also comprise area 1112, which indicates the employee's current location and/or the current time, and status message area 1116, which indicates a current status of the employee and/or the employee's shift.

In an embodiment, informational area 750D comprises a punch-out input 1124. When the employee-user selects punch-out input 1124, the employee may be "punched out" of his or her current shift. It should be understood that punch-out input 1124, and optionally informational area 750D in its entirety, may not be available unless the employee is currently punched in to a shift (e.g., punch-out area 1008 may be unselectable, hidden, grayed out, and/or otherwise unavailable), thereby preventing the employee from attempting to punch out when there is no shift from which the employee can punch out. When the employee selects punch-out input 1124 in the user interface of client application 132, client application 132 may notify server application 114, via network(s) 120, that the employee has punched out of the current shift. This punch-out notification may comprise one or more messages that include, for example, an employee identifier, a shift identifier, a location (e.g., GPS coordinates, site identifier, etc.), a timestamp (e.g., indicating date and time), and/or the like, and may be recorded by server application 112 (e.g., in database 114).

Figure 12B:
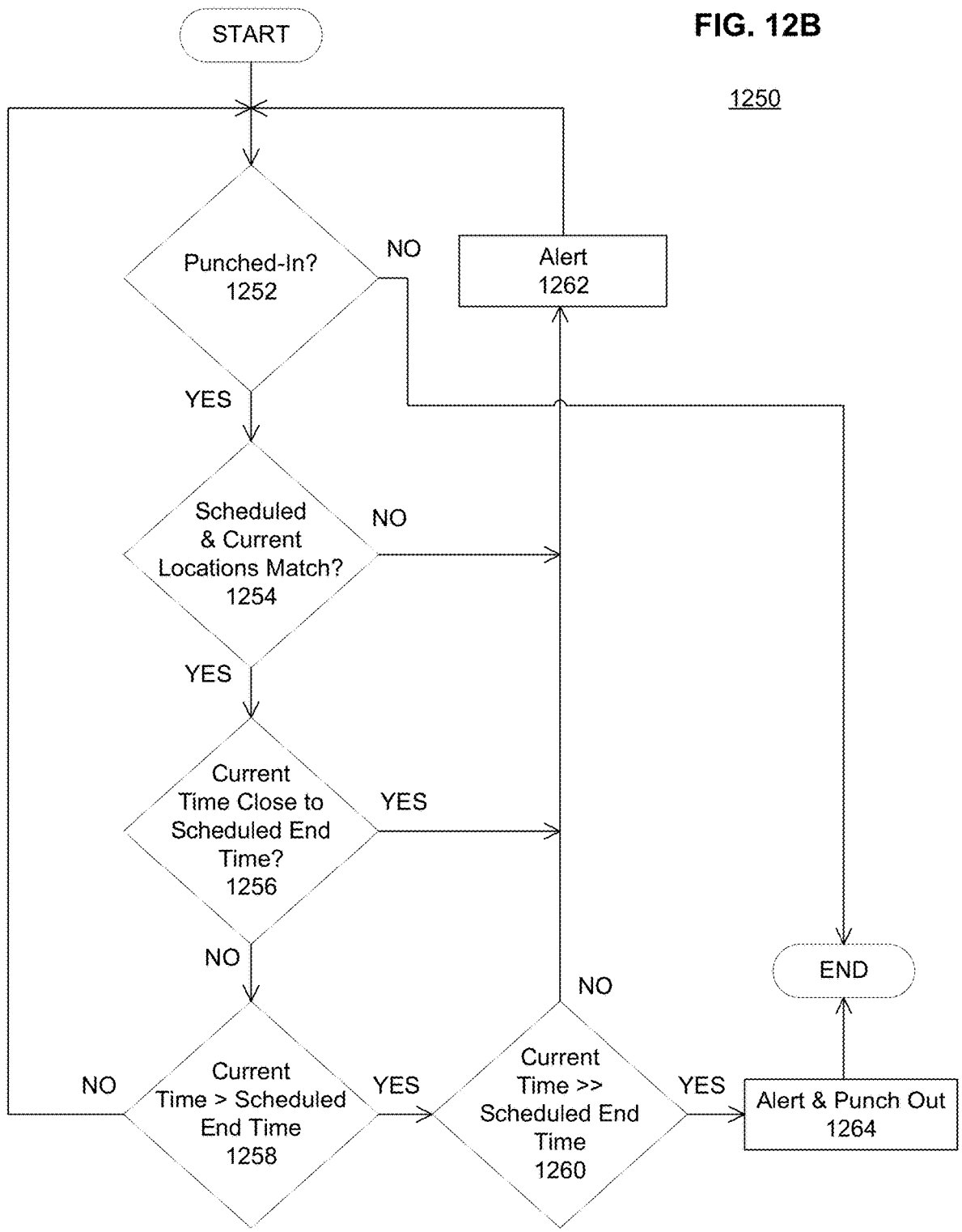
FIG. 12B illustrates an example of a process for determining an employee's shift or punch-out is proper, according to an embodiment.

After an employee-user has punched in to a shift, a process may be executed to determine whether the shift remains valid and/or whether the employee properly punches out of the shift. FIG. 12B illustrates an example of such a determination process, according to an embodiment. Process 1250 may be performed wholly by server application 112, wholly by client application 132, or with different steps performed by server application 112 and client application 132.

Process 1250 may begin as soon as an employee-user has punched in to a shift (e.g., via punch-in input 1114). In step 1252, a determination is made as to whether or not the employee is punched in to a shift. If the employee is not currently punched in to a shift (i.e., "NO" in step 1252), process 1250 may block (e.g., return to step 1252 after a predetermined interval) or, as illustrated, may end. Otherwise, if the employee is punched in (i.e., "YES" in step 1252), process 1250 proceeds to step 1254.

In step 1254, a determination is made as to whether or not the employee's current location matches the location scheduled for the employee's current shift. Step 1254 may be similar or identical to step 1204 in process 1200. Specifically, the employee's current location may be determined, for example, using a GPS receiver of user system 130 or other location determination method (e.g., triangulation, user input, etc.). The employee's current location may be determined to match the scheduled location if it is within a predetermined radius (e.g., 1 mile) from the scheduled location (or the scheduled location is within a predetermined radius of the current location) or otherwise corresponds to the scheduled location (e.g., corresponds to the same address as the scheduled location). If the employee's current location does not match the scheduled location (i.e., "NO" in step 1254), process 1250 proceeds to step 1262, in which an alert is issued. Otherwise, if the employee's current location does match the scheduled location (i.e., "YES" in step 1254), process 1250 proceeds to step 1256.

In instances in which the employee's current location does not match the scheduled location (i.e., "NO" in step 1254), in step 1262, the application (e.g., server application 112) may alert the employee and/or alert the employee's manager (e.g., by indicating that "<employee> is not at <employee's> scheduled shift location or another valid location") and optionally inform the employee that his or her manager has been alerted. In an embodiment, the alert may not be issued in step 1262 (or an alert may be issued to the employee but not the employer's manager, or vice versa), even if the employee's current location does not match the scheduled location, if the employee's current location matches the location of another site, office, or location of the employer. This determination of whether or not the employee's current location matches the location of another site, office, or location of the employer may be made in a similar or identical manner as the determination in step 1254.

In step 1256, a determination is made as to whether or not the current time is within a predetermined duration (e.g., 15 minutes) prior to the time at which the employee is scheduled to end his or her shift. If the current time is within the predetermined duration prior to the scheduled end time (i.e., "YES" in step 1256), process 1250 proceeds to step 1262, in which an alert is issued to the employee and/or the employee's manager (e.g., indicating that "<employee's> shift is scheduled to end in less than <predetermined duration>"). Otherwise, if the current time is not within the predetermined duration prior to the scheduled end time (i.e., "NO" in step 1256), process 1250 proceeds to step 1258.

In step 1258, a determination is made as to whether the current time is a first predetermined duration (e.g., 1 minute) after the scheduled end time of the employee's current shift. If the current time is not after the scheduled end time of the employee's current shift (i.e., "NO" in step 1258), process 1250 returns to step 1252 (e.g., after a predetermined interval). Otherwise, if the current time is after the scheduled end time of the employee's current shift (i.e., "YES" in step 1258), process 1250 proceeds to step 1260.

In step 1260, a determination is made as to whether the current time is a second predetermined duration (e.g., 15 minutes) after the scheduled end time of the employee's current shift. The second predetermined duration used in step 1260 is greater than the first predetermined duration used in step 1258. If the current time is after the first predetermined duration but not after the second predetermined duration from the scheduled end time (i.e., "NO" in step 1260), process 1250 proceeds to step 1262, in which an alert is issued to the employee and/or the employee's manager (e.g., indicating that "<employee> has exceeded <employee's> scheduled shift"). Otherwise, if the current time is after the second predetermined duration from the scheduled end time (i.e., "YES" in step 1260), process 1250 proceeds to step 1264.

In step 1264, the employee-user is automatically punched out of his or her current shift, the employee and/or the employee's manager is alerted (e.g., by an indication that "<employee> has exceeded <employee's> scheduled shift, and will be automatically punched out"). Specifically, server application 112 may record that the employee has punched out, for example, by recording an employee identifier, shift identifier, location (e.g., GPS coordinates, site identifier, etc.), timestamp representing the date and time that the punch-out was performed, and/or the like.

It should be understood that steps 1254-1260 of process 1250 may be reordered in any manner without changing the result of process 1250.

2.9. Staff

In an embodiment, selection of staff area 1026 changes at least a portion of the user interface (e.g., informational area 750 or a pop-up frame over the current user interface) to one dedicated to managing employees or vendors, depending on whether the line of business is self-performed or vendor-managed, respectively. Staff area 1026, as well as the user interface dedicated to managing employees, may only be available if the user is a supervisor of one or more employees (e.g., either a regional vice president, regional zone manager, zone lead, or crew lead) or vendors (e.g., either a regional vice president or regional zone manager).

Information available for each employee may include, without limitation, name, address, telephone number, email address, employment history (e.g., dates and/or other information for hirings, firings, promotions, demotions, and/or status changes, previous positions, salary history, etc.), current role, current job title, current pay rate, start date, assigned home site, shift information (e.g., per day with site identifier), current punch-in status (e.g., site identifier for site at which the employee is currently punched in), punch-in history (e.g., daily chronology of sites at which the employee punched in), expense history (e.g., by day, week, month, year, etc.), mileage reimbursement history (e.g., by day, week, month, year, etc.), overtime history (e.g., by day, each site at which the employee recorded overtime hours), no-show history (e.g., by day, each site at which the employee failed to show for a planned shift), missed punch history (e.g., by day, each site at which the employee failed to punch in for a shift), etc.

In an embodiment, when dedicated to managing employees in the self-performed line of business, informational area 750 may comprise a list of employees for which the current user is responsible in the set context. In the case that the user is responsible for multiple levels of employees (e.g., a regional zone manager or higher), the list of staff may take the form of a roll-up list, which can be expanded for each level (e.g., a regional vice president may see a list of regional zone managers, which can each be expanded into a list of zone leads under the regional zone manager, which can each be expanded into a list of crew leads under the zone lead, which can each be expanded into a list of crew under the crew lead).

The employees listed in the list of employees may have various attribute indicators associated with their respective entries. The attribute indicators may be red, yellow, or green backgrounds or icons, indicating, for example, a problematic attribute, a potentially problematic attribute, and a non-problematic attribute, respectively. Examples of such attributes include an expense history, mileage reimbursement history, overtime history, no-show history, missed punch history, hours that are below the employee's budgeted hours, a difference between budgeted hours and punched-in hours. In addition, each entry in the list of employees may comprise an indication of whether or not the employee is currently punched in to a site.

In addition, when dedicated to managing employees in the self-performed line of business, informational area 750 may comprise a search input (e.g., one or more textboxes), into which a user can input search criteria (e.g., search terms, such as a portion of an employee's name). In response to submission of search criteria (e.g., in real time as the user inputs search terms and/or after the user selects a search button), a list of employee(s), within the span of the searching user's role and/or the current context, who match the search criteria (e.g., whose names match an input search term) can be displayed. For each matching employee, the list may comprise an entry that includes information about the employee. This employee information may include, for example, name, title, home site, wage, wage range (e.g., minimum and maximum for the particular store, Zip code, etc.), budget status, hours status, punch-correction status, attendance status, headcount status, wage-cap-adherence status, address, phone number, email, tenure, and/or the like. In addition, the employee information may comprise a link to a list of all sites to which the employee has punched in, a link to an employee dashboard for the employee, a link to a phone application for calling the employee, a link to an email application for emailing the employee, and/or the like. A subset of the employee information may be displayed in the list entry, and an additional subset of the employee information may be displayed when the list entry is hovered over or clicked. Furthermore, the budget status can be indicated by colors (e.g., red, yellow, or green), the hours status can be indicated by colors (e.g., red, yellow, or green, indicating whether the employee has overtime hours, is over hours, is under hours, etc.), the punch-correction status can be indicated by colors (e.g., red, yellow, or green), the attendance status can be indicated by colors (e.g., red, yellow, or green, indicating a percentage of missed shifts, late punch-ins, no shows, etc.), the headcount status can be indicated by colors (e.g., red, yellow, or green), and/or the wage-cap-adherence status can be indicated by colors (e.g., red, yellow, or green). In addition, the budget status, the hours status, the punch-correction status, the attendance status, the headcount status, and/or the wage-cap-adherence status may be toggled by time period (e.g., week, month, etc.).

In an embodiment in which the employee dashboard is provided, the dashboard for each employee may comprise detailed information about the employee. This information may include base information, such as the employee's name, employee's identifier, employee's title, employee's pay, employee's tenure status, employee's address, employee's telephone number, employee's email address, employee's zone lead (if line of business is self-performed), employee's regional zone manager, employee's regional vice president, employee's site name, site address, site identifier, customer identifier, employee's scope of work (or link thereto), zone part (if line of business is self-performed, e.g., including zone identifier and/or site identifiers for other sites within the same zone), site identifiers of additional sites serviced by the employee (e.g., that the employee has punched in to within the time frame set by the current context), employment history (e.g., hire date, fire date, positions held, previous sites at which the employee has worked), workers compensation history (e.g., for each workers compensation claim, a date, resolution, etc.), weekly schedule (e.g., all shifts for the employee for the week or the time frame set by the current context), employee's pending project work, employee's work history (e.g., budgeted hours, actual hours, variance between actual hours and budgeted hours, overtime information indicating an overtime history, punch-in information indicating a punch-in history, no-show information indicating how often the employee has failed to show for a shift), and/or the like. In addition, if the employee is a zone leader, the information may further include zone information, such as the number of sites (e.g., stores) within the zone and/or a list of the sites in the zone (e.g., with information indicating the revenue generated by the site, the number of crew members at the site, a list of crew members at the site, an overtime history of the site, etc.).

In an embodiment, when dedicated to managing vendors in the vendor-managed line of business, informational area 750 may comprise a list of vendors for which the current user is responsible and/or within the current context. In the case that the user is responsible for multiple levels of vendors (e.g., a regional zone manager or higher), the list of vendors may take the form of a roll-up list, which can be expanded for each level (e.g., a line-of-business head may see a list of regional vice presidents, which can each be expanded into a list of regional zone managers under the regional vice president, which can each be expanded into a list of vendors under the regional vice manager).

For each vendor, the list of vendors may comprise an entry that includes information about the vendor. This vendor information may include, for example, vendor name, vendor contact (e.g., name, contact information, such as telephone number, email address, etc.), budget status, attendance status, address, phone number, email, and/or the like. In addition, the vendor information may comprise a link to a vendor dashboard for the vendor, a link to a phone application for calling the vendor contact, a link to an email application for emailing the vendor contact, and/or the like. A subset of the vendor information may be displayed in the list entry, and an additional subset of the vendor information may be displayed when the list entry is hovered over or clicked. Furthermore, the budget status can be indicated by colors (e.g., red, yellow, or green, indicating whether the vendor is over budget, at budget, or under budget, respectively), and/or the attendance status can be indicated by colors (e.g., red, yellow, or green, indicating a percentage of missed shifts, late punch-ins, no-shows, etc.). In addition, the budget status and/or attendance status may be toggled by time period (e.g., week, month, etc.).

2.10. Sites

In an embodiment, selection of sites area 1028 changes at least a portion of the user interface of the application (e.g., informational area 750 or a pop-up frame over the current user interface) to one dedicated to managing stores and/or other types of sites.

Regardless of the line of business (e.g., self-performed or vendor-managed), the user interface dedicated to managing the sites may include a list of all sites within the user's responsibility and/or current context. For each site, the list of sites may comprise an entry that includes information about the site. This site information may include, for example, a site identifier, customer identifier, site name, attendance status (e.g., number of employees currently punched in at the site), budget status, hours status, punch-correction status, site address, a list of employees for whom the site is their home site (if line of business is self-performed), a list of vendors associated with the site (if line of business is vendor-managed), coverage status (e.g., number of employees who have punched in to the site within the last week), a link to a site dashboard for the site, and/or the like. A subset of the site information may be displayed in the list entry, and an additional subset (e.g., address and list of employees or vendors) of the site information may be displayed when the list entry is hovered over or clicked. Furthermore, the budget status, hours status, and/or punch-correction status may be indicated by colors (e.g., red, yellow, or green), and may be toggled by time period (e.g., week, month, etc.).

For certain user levels, the list of sites may be in an expandable, roll-up format. For example, a user whose role includes the line-of-business level, may see a list of regions, each entry of which can be expanded into a list of regional zones, each entry of which can be expanded into a list of zones, each entry of which can be expanded into a list of sites. Each expandable entry may also indicate statistics regarding the sub-list into which it expands, such as the number of entries in the sub-list, the number of entries in one or more of the levels of the hierarchy below the entry (e.g., number of regions, regional zones, zones, and/or sites), average number of entries in one or more of the levels of the hierarchy below the entry, number of employees and average wage represented by the hierarchy below the entry, and/or the like.

The sites listed in the list of sites may have various attribute indicators associated with their respective entries. The attribute indicators may be red, yellow, or green backgrounds or icons, indicating, for example, a problematic attribute, a potentially problematic attribute, and a non-problematic attribute, respectively. Examples of such attributes include a ratio of actual revenue to budgeted revenue, a variance between actual and budgeted revenue, a ratio of actual labor costs to budgeted labor costs, a variance between actual and budgeted labor costs, a ratio of actual supply costs to budgeted supply costs, a variance between actual and budgeted supply costs, a ratio of actual hours to budgeted hours, a variance between actual and budgeted hours, overtime hours, a percentage of overtime hours to total hours, a count of employees who failed to show for a shift at the site, a percentage of employees who failed to show for a shift at the site to planned shifts, a count of employees who missed a planned punch-in, a percentage of employees who missed a planned punch-in to total punch-ins, and/or the like. In addition, each entry in the list of sites may comprise an indication of the number of employees currently punched in at the site.

In addition, when dedicated to managing sites, informational area 750 may comprise a search input (e.g., one or more textboxes), into which a user can input search criteria (e.g., search terms, such as a site identifier or name). In response to submission of search criteria (e.g., in real time as the user inputs search terms and/or after the user selects a search button), a list of site(s), within the span of the searching user's role and/or the current context, which match the search criteria (e.g., whose identifier or name match an input search term) can be displayed. For each matching site, the list may comprise an entry that includes at least a subset of the site information.

In an embodiment, a user may toggle between the list of sites, described above, and a map view of the sites. In the map view, the sites, instead or in addition to being listed, may be displayed at their respective locations over a virtual map image. The virtual map image may be retrieved from an external system 140 (e.g., Google Maps™) by passing addresses or GPS coordinates of the sites to the external system and responsively receiving the virtual map image from the external system. Each site in the virtual map image may be separately selectable. When a site is selected within the virtual map image, informational area 750 may be changed to a site dashboard for the selected site.

In an embodiment in which the site dashboard is provided, the dashboard for each site may comprise detailed information about the site. This information may include, for example, site name, site identifier, customer identifier, site's scope of work (or link thereto), site address and/or geolocation (e.g., GPS coordinates), site's zone lead (if line of business is self-performed), zone part (if line of business is self-performed, e.g., including zone identifier and/or site identifiers for other stores within the same zone), vendor name (if line of business is vendor-managed), vendor address (if line of business is vendor-managed), vendor contact information (if line of business is vendor-managed, and including, e.g., telephone number and email address), workers compensation history (e.g., number of workers compensation claims, for each workers compensation claim, the claimant's name, date, resolution, etc.), number of cases open, number of cases closed, link to open and/or closed cases, number of audits due, number of audits completed, link to due and/or completed audits, site's financial information (e.g., budgeted revenue, year-to-date revenue, budgeted earnings before interest, taxes, depreciation, and amortization (EBITDA), year-to-date EBITDA, variance between actual and budgeted revenue, budgeted, budgeted supply costs, actual supply costs, variance between actual and budgeted supply costs, budgeted repair costs, actual repair costs, variance between actual and budgeted repair costs, budgeted hours, actual hours, variance between actual and budgeted hours, overtime information indicating an overtime history, punch-in information indicating a punch-in history, no-show information indicating how often employees have failed to show for a shift), weekly schedule (e.g., shifts for the week, employees scheduled for shifts, etc.), planned project work, list of employees currently punched in at the site (e.g., including employee's name, employee identifier, title, punch-in time, etc.), and/or the like.

2.11. Hiring

In an embodiment, selection of hire area 1012 changes at least a portion of the user interface of the application (e.g., informational area 750) to one dedicated to a hiring process (also referred to herein as "on-boarding"). FIG. 13A illustrates an example of informational area 750E after a user has selected hire area 1012, according to an embodiment. As illustrated, informational area 750E comprises a to-do list 1312, a new confirmation area 1314, a new hire area 1316, a calculator area 1318, sites area 1024, and staff area 1026.

Calculator area 1318 may comprise an input (e.g., icon) that, when selected by a user, provides a calculator (e.g., in a pop-up frame). The calculator may be a general application-embedded calculator that provides a user with a convenient way to perform mathematical operations when desired.

To-do list 1312 may comprise a list of paperwork waiting to be completed and/or open positions for which a manager-user is responsible. New confirmation area 1314 and new hire area 1316 may both comprise inputs (e.g., icons).

In an embodiment, selection of new confirmation area 1314 changes at least a portion of the user interface of the application (e.g., informational area 750E) to one dedicated to an on-boarding confirmation process. FIG. 13B illustrates an informational area 750F after a user has selected new confirmation area 1314, according to an embodiment. As illustrated, informational area 750F comprises a Social Security number (SSN) area 1320, an ok-to-hire area 1322, an employment history area 1324, a name area 1326, an assigned site area 1328, a Zip code area 1330, a title area 1332, an offered wage area 1334, a wage range area 1336, a start date area 1338, an employee identifier area 1340, sites area 1024, and staff area 1026. However, it should be understood that different combinations and arrangements of components are possible.

SSN area 1320 may comprise one or more inputs (e.g., textbox(es)) for entering the SSN of a potential employee. Once an SSN has been input into SSN area 1320 and the user selects okay-to-hire area 1322, the application may check whether or not the inputted SSN is valid. Alternatively, the application may check whether or not the inputted SSN is valid in real time (e.g., as soon as the SSN is input into SSN area 1320), without the need for selection of okay-to-hire area 1322. Specifically, client application 132 may transmit the SSN to server application 112, and server application 112 may check whether or not the inputted SSN is valid by comparing it to a database of valid SSNs. This may involve transmitting the SSN to an external system 140, and receiving a response from the external system 140, which indicates whether or not the SSN is valid. As part of or in addition to this SSN validation process, server 112 application may retrieve additional information associated with the SSN, if available. This additional information may include, for example, a name and/or address associated with the SSN.

Furthermore, as part of the SSN validation process, server application 112 may check if the SSN, input into SSN area 1320, is associated with an employee or former employee who is already in the system (e.g., stored in database 114). If the inputted SSN is valid and not associated with any current or former employee, the application may notify the user that the SSN has been validated (e.g., by client application 132 changing the background color of ok-to-hire area 1322 to green, adding a checkmark to ok-to-hire area 1322, and/or the like). On the other hand, if the inputted SSN is associated with a current or former employee, server application 112 may return the employee identifier, employee name, and/or employment history information (e.g., date of previous hiring, date of previous firing, if any, last hourly pay, eligibility for rehiring, etc.) for the employee to client application 132. The returned employee identifier may be pre-populated into employee identifier area 1340, the returned employee name may be pre-populated into name area 1326, and the returned employment history information may be pre-populated into employment history area 1324. In addition, server application 112 may determine whether or not a current employee is eligible for hiring or whether or not a former employee is eligible for rehire. If the current or former employee is not eligible for hire or rehire, the application may notify the user (e.g., by client application 132 changing the background color of ok-to-hire area 1322 to red, adding an "x" to ok-to-hire area 1322, and/or indicating the current or former employee's eligibility for rehiring in employment history area 1324).

Initially, the background color of ok-to-hire area 1322 may be white (or the same color as the overall background color). If the SSN input into SSN area 1320 is successfully validated, the background color of ok-to-hire area 1322 may be changed to green and/or some other indication of the successful validation may be provided in ok-to-hire area 1322 (e.g., the word "yes", a checkmark, etc.). On the other hand, if the SSN input into SSN area 1320 is not successfully validated (e.g., because the SSN is invalid or belongs to a current or former employee who is not eligible to be hired), the background color of ok-to-hire area 1322 may be changed to red and/or some other indication of the failed validation may be provided in ok-to-hire area 1322 (e.g., the word "no", an "x" mark, etc.).

Name area 1324 may comprise an input (e.g., textbox) for inputting the potential employee's name. However, in instances in which an area, which comprises an input (e.g., a textbox), is pre-populated (e.g., based on the SSN, input in SSN area 1320), that area's input may be rendered unmodifiable, such that no data may be entered. Thus, for example, name area 1326 may comprise a textbox for entering the employee's name, and, if the employee's name is pre-populated into the textbox of name area 1326, the textbox may be switched or an attribute of the textbox may be set such that the pre-populated name cannot be modified.

Assigned site area 1328 may comprise an input for selecting a site (e.g., store) which will represent the potential employee's assigned or home site. For example, the input may comprise a pop-up scrollable list (e.g., drop-down menu), which has a selectable entry for all of the sites within the user's role and/or the current context and may be co-extensive with the list of sites available via sites area 1024. The user may only be permitted to select one site from the scrollable list. Alternatively, the user may be permitted to select multiple sites from the scrollable list. In an embodiment, once the user has selected a site, the Zip code for the selected site may be displayed in Zip code area 1330, which may not be modifiable by the user.

Title area 1332 may comprise an input for selecting a job title for the potential employee. For example, the input may comprise a pop-up scrollable list (e.g., drop-down menu), which has a selectable entry for all of the valid job titles. The user may only be permitted to select one job title from the scrollable list. In an embodiment, once the user has selected a job title and/or a Zip code has been retrieved for the site selected in assigned site area 1328, the wage range for the selected job title may be displayed in wage range area 1336. The wage range may comprise a minimum wage and/or a maximum wage (e.g., a wage cap).

Offered wage area 1334 may comprise an input (e.g., textbox) for inputting a wage (e.g., hourly wage) to be offered to the potential employee. Wage range area 1336, which displays the allowable wage range for the job title selected in title area 1332 and/or Zip code for the site selected in assigned site area 1328, can be used as a guide for inputting the wage in offered wage area 1334. In an embodiment, if the user inputs a wage into offered wage area 1334 that is outside the allowable wage range (e.g., displayed in wage range area 1336), the user may be required to confirm the input wage (e.g., via a pop-up) and/or otherwise be alerted (e.g., in alerts area 720). Additionally or alternatively, an approval request may be automatically provided to the manager-user's supervisor, and the application may need to receive approval from that supervisor before the confirmation or hiring process can be completed by the manager-user for the potential employee.

In an embodiment, when employee identifier area 1340 has not been pre-populated (e.g., as the result of the retrieval of a current or former employee based on an SSN input into SSN area 1320), the application may retrieve a new employee identifier for the potential employee and display the new employee identifier in employee identifier area 1340. Specifically, client application 132 may request a new employee identifier from server application 112, server application 112 may responsively generate and return a new unique employee identifier to client application 132, and client application 132 may display the new employee identifier in employee identifier area 1340. Retrieval of the new employee identifier may be in response to a user's manual selection of an input (e.g., selection of employee identifier area 1340 or another input that is not shown), or may be automatic in response to, for example, validation of the SSN input in SSN area 1320 and input of a set of information which is sufficient to create an employee record (e.g., SSN, name, assigned site, title, and an approved wage).

In an embodiment, when the potential employee is not already in the system as a current or former employee, employee identifier area 1340 may comprise an input (e.g., an icon labeled "Create Employee ID"). When a user selects the input, a new employee identifier may be retrieved and displayed in a pop-up frame or new user interface, along with one or more inputs for initiating the hiring process (i.e., on-boarding) of the potential employee (e.g., an icon labeled "Onboard now") and/or saving the hiring process for later (e.g., an icon labeled "Onboard later").

In an embodiment, once all the required information has been input (e.g., SSN, name, assigned site, title, and approved wage), the potential employee may be confirmed (e.g., via a confirmation pop-up window that prompts the manager-user to confirm the hire). If the user chooses to confirm the potential employee, the user may be directed to a user interface (e.g., informational area 750 may be changed from informational area 750F to informational area 750G) for completing the paperwork necessary to complete the hiring process. It should be understood that the term "paperwork" can include virtual paperwork (e.g., electronic documents and/or additional user interfaces for inputting electronic data), in addition or as an alternative to physical paperwork. On the other hand, if the user chooses not to confirm the potential employee, a to-do item for completing the paperwork (e.g., including a link to the user interface for completing the paperwork) may be added to to-do list 1312. In addition, a deadline for completing the paperwork (e.g., 24 hours, 48 hours, etc.) may be set and indicated in the to-do list entry.

One or more sets of data that are utilized in informational area 750F may be retrieved by client application 132 from server application 112 and/or an external system 140 (e.g., indirectly via server application 112). For example, as discussed above, the SSN input into SSN input area 1320 may be validated remotely and/or information associated with the SSN (e.g., employee identifier, name, employment history, etc.) may be retrieved from a remote system (e.g., platform 110 and/or external system 140). As further examples, the list of sites, the Zip code associated with a selected site, the list of job titles, the wage range associated with the selected job title and/or Zip code, and/or the like may also be retrieved from a remote system by client application 132.

Figure 13C:
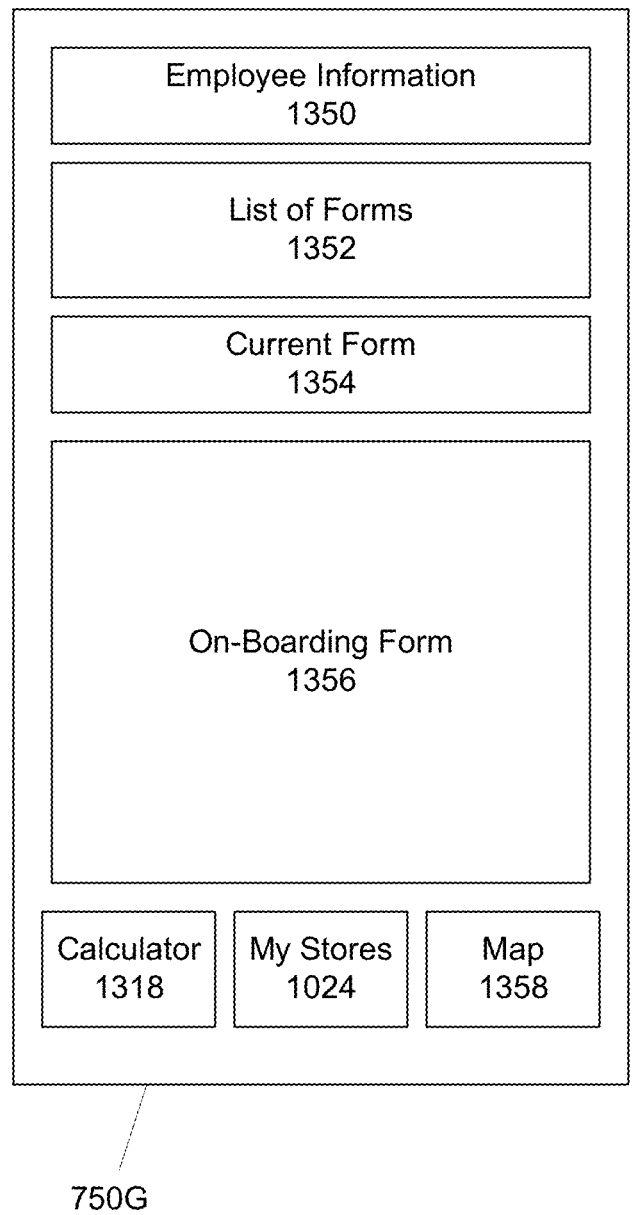
FIG. 13C illustrates an on-boarding user interface, according to an embodiment.

In an embodiment, selection of new hire area 1316 changes at least a portion of the user interface of the application (e.g., informational area 750E) to one dedicated to a hiring process. FIG. 13C illustrates an informational area 750G after a user has selected new hire area 1316 or has confirmed a potential employee in informational area 750F, according to an embodiment. As illustrated, informational area 750G comprises an employee information area 1350, a list of forms area 1352, a current form area 1354, an on-boarding form area 1356, calculator 1318, sites area 1024, and a map area 1358.

Employee information area 1350 may comprise information about the employee to be hired, such as his or her name, employee identifier, assigned site, job title, wage, and/or the like. This information may mirror the information previously input into informational area 750F.

List of forms area 1352 may comprise a list of forms (e.g., a scrollable list) that need to be completed in order to hire the potential employee. When a user selects a form from the list of forms, current form area 1354 may be updated to display information about the selected form (e.g., name, description, etc.), and on-boarding form 1356 may be updated to comprise inputs for filling out fields within the selected form. For each form, the list of forms may include an indication of the form's completion status (e.g., a red dot or background to indicate that the form has not been started, a yellow dot or background to indicate that the form has been started but is incomplete, and a green dot or background to indicate that the form has been completed).

In an embodiment, the forms listed in list of forms area 1352 and necessary for completion of the hiring process of each new employee may include, without limitation, a payroll maintenance form, an I-9 form, a pay options form, an employment screening inquiry, a drug free workplace policy acknowledgement, an employee arbitration agreement, a new employee checklist and acknowledgements form, an A-Line form, a W4 form, an employment application, a health insurance marketplace employer notice, a voluntary payroll deduction form, and/or an 8850 form.

Current form area 1354 may comprise information about the form most recently selected from the list of forms in area 1352. This form information may comprise a name or other identifier of the form, a description of the form, and/or the completion status of the form (e.g., the percentage of the form that has been completed).

On-boarding form area 1356 may comprise one or more inputs for inputting information into fields of the current form most recently selected from the list of forms in area 1352 and identified in current form area 1354. On-boarding form area 1356 may be scrollable or comprise paging inputs for navigating a form that cannot completely fit within the display space available to on-boarding form area 1356.

In an embodiment, each of the forms rendered in on-boarding form area 1356 may be automatically populated with information to the extent possible (e.g., from the information acquired via informational area 750F). Furthermore, this auto-populated information may not be directly modified by a user (e.g., the user may instead be required to modify the information which was used to auto-populate the form). In addition, as information is input into each form (e.g., via on-boarding form area 1356), the input information may be continuously pushed from client application 132 to server application 112 for storage. This can serve as a back-up in case client application 132 encounters a problem. One or more of the forms (e.g., the I-9 form and/or W4 form) may be integrated with third-party providers with data captured and stored at the third-party provider (e.g., an external system 140) or on platform 110 (e.g., in database 114). The input information may also be validated in real time or near real time (e.g., as the information is input) to prevent faulty data from being pushed to server application 112 or to a third-party provider.

In an embodiment, if any form in a particular hiring process remains incomplete after a user navigates away from the form (e.g., by leaving informational area 750G or selecting a new form from list of forms area 1352), client application 132 may display a warning message (e.g., via a pop-up message), update the status of the form (e.g., in list of forms area 1352), post an alert about the form (e.g., in alerts area 720), and/or add the form as a to-do entry in to-do list 1312.

When a form is completed or when the entire list of forms is completed, an electronic document (e.g., a Portable Document Format (PDF) file) comprising all of the forms may be generated and made available to the manager-user for review and error-checking. At this time, the manager-user may be allowed to go back and correct any errors in the forms. Once the forms are reviewed, the user interface of client application 132 may provide an input (e.g., icon) for submitting the package of forms to a human resources system or department. In response to a user's selection of that input, the electronic document, comprising the completed forms, may be sent to the human resources system or department (e.g., to acquire any electronic or physical signatures required from the new employee, supervisors, and/or other individuals), and the manager-user may be notified that or when the hiring process has been completed for the new employee. In embodiments, in which data entry is continuously pushed to platform 110, all of the data from the forms is already stored at platform 110 (e.g., in database 114). The application may keep track of whether or not the human resources system or department has completed the hiring process, and send additional notifications or reminders to the human resources system or department when needed.

In an embodiment, the confirmation and on-boarding processes may be tied to open positions posted on a company or job-recruiting website. For example, an open position may be closed on the website once the hiring process for that position has been completed.

Figure 14:
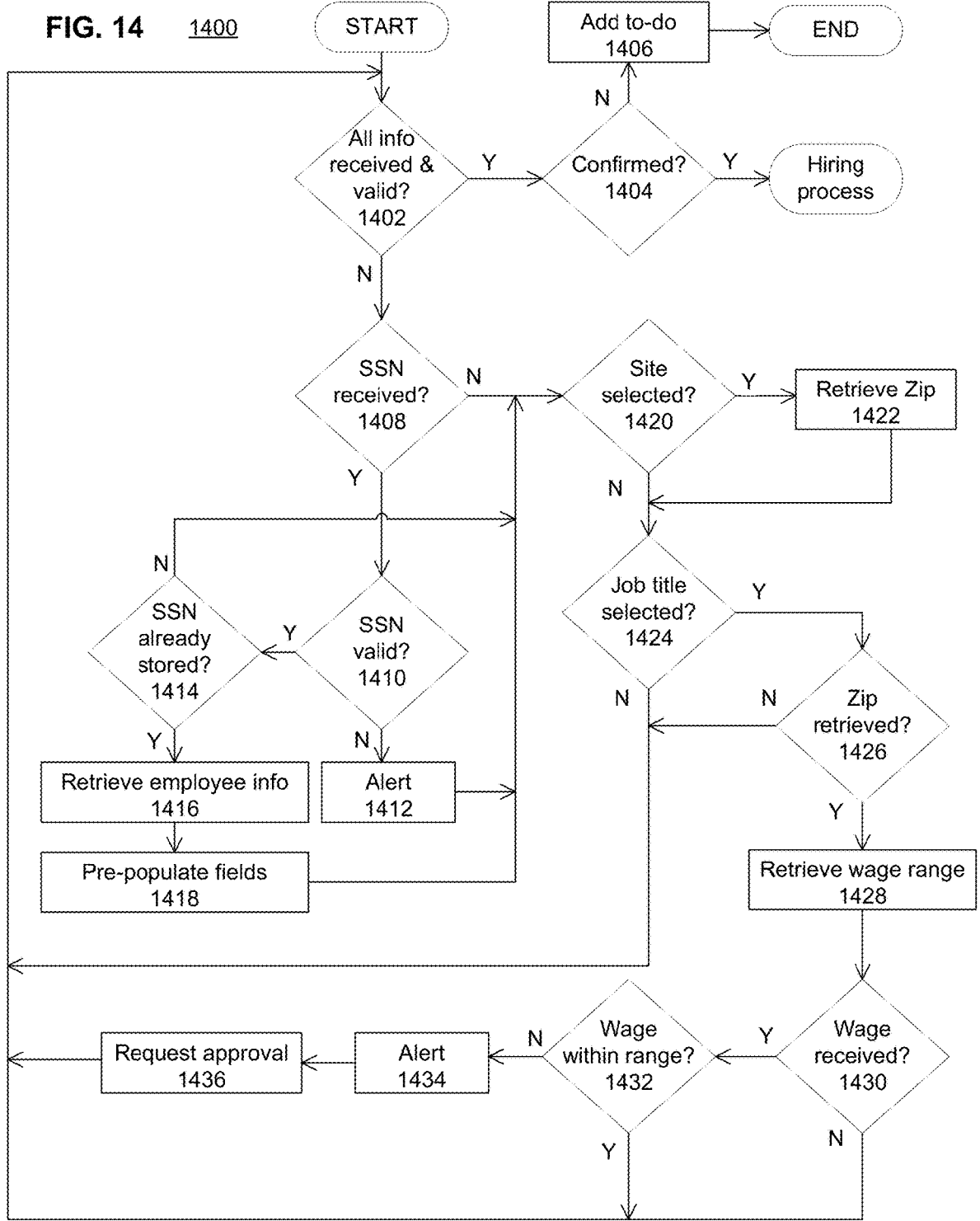
FIG. 14 illustrates a confirmation process, according to an embodiment.

FIG. 14 illustrates a confirmation process 1400 for a potential employee, according to an embodiment. Although a specific arrangement of steps is illustrated, it should be understood that one or more of the steps may be reordered, rearranged, omitted, and/or combined with additional steps to achieve the same overall effect and function. Process 1400 may be performed wholly by server application 112, wholly by client application 132, or with different steps performed by server application 112 and client application 132. Process 1400 may be performed in conjunction with user interactions with informational area 750F.

Process 1400 may begin in step 1402 with a determination of whether or not all information needed for a given potential employee has been received and/or validated. In addition, the determination in step 1402 may also include a determination of whether or not the potential employee's wage has been approved (e.g., if requested in step 1436, as a result of the input wage being outside of a wage range, as described elsewhere herein). If all information has been received and/or validated and all requests, if any, have been approved (i.e., "YES" in step 1402), process 1400 proceeds to step 1404. Otherwise, if information remains to be received and/or validated and at least one request, if any, remains outstanding (i.e., "NO" in step 1402), process 1400 proceeds to step 1408.

In step 1404, a determination is made as to whether or not the potential employee has been confirmed for hiring. This determination may comprise receiving an input from a manager-user, for example, in response to a prompt for confirmation, after all information has been input into informational area 750F. If the potential employee has been confirmed (i.e., "YES" in step 1404), process 1400 proceeds to a hiring process (e.g., hiring process 1500 described with reference to FIG. 15) and/or process 1400 ends. Otherwise, if the potential employee has not been confirmed (i.e., "NO" in step 1404), process 1400 proceeds to step 1406.

In step 1406, the hiring process (e.g., hiring process 1500) is added to the manager-user's to-do list (e.g., to-do list 1312). The hiring process may also be added to alerts area 720 and/or reminders area 740, when appropriate (e.g., after remaining incomplete for a predetermined period of time, as a due date approaches, etc.). After step 1406, process 1400 may end.

In step 1408, a determination is made as to whether or not an SSN for the potential employee has been received (e.g., input into SSN area 1320). When an SSN has been received (i.e., "YES" in step 1408), process 1400 proceeds to step 1410. Otherwise, if no SSN has been received (i.e., "NO" in step 1408), process 1400 proceeds to step 1420.

In step 1410, a determination is made as to whether or not the SSN, received in step 1408, is valid. This determination may comprise client application 132 transmitting the SSN to a remote system (e.g., platform 110 or an external system 140), and responsively receiving an indication of whether or not the SSN is valid. It should be understood that the remote system may check the transmitted SSN against a database of valid SSNs, and, if the SSN is included in the database of valid SSNs, return an indication that the SSN is valid, but otherwise return an indication that the SSN is invalid. If the SSN is determined to not be valid (i.e., "NO" in step 1410), process 1400 proceeds to step 1412. Otherwise, if the SSN is determined to be valid (i.e., "YES" in step 1410), process proceeds to step 1414.

In step 1412, an alert is provided to indicate that the SSN, received in step 1408, is invalid. The alert may comprise, for example, an indication in informational area 750F (e.g., a change in the background color of ok-to-hire area 1322 to red). After step 1412, process 1400 proceeds to step 1420.

In step 1414, a determination is made as to whether or not the SSN, received in step 1408, is already in the system. This determination may comprise client application 132 transmitting the SSN to a remote system (e.g., platform 110 or an external system 140), and responsively receiving an indication of whether or not the SSN belongs to a current or former employee and/or, if the SSN belongs to a current or former employee, employee information for the current or former employee associated with the SSN. It should be understood that the remote system may check the transmitted SSN against a database of current and/or former employees, and, if the SSN is included in the database of current and/or former employees, return the indication and/or employee information, but otherwise return an indication that the SSN does not belong to a current and/or former employee. If the SSN is determined to belong to a current and/or former employee (i.e., "YES" in step 1414), process 1400 proceeds to step 1416. Otherwise, if the SSN is determined to not belong to any current and/or former employee (i.e., "NO" in step 1414), process 1400 proceeds to step 1420.

In step 1416, the employee information is retrieved. As discussed above, the employee information may be received from a remote system (e.g., server application 112) in response to transmitting the SSN, received in step 1408, to the remote system. In addition, in step 1418, the employee information may be used to pre-populate fields, for example, in informational area 750F. For instance, the employee information may comprise an employment history that is used to pre-populate employment history area 1324, a name that is used to pre-populate name area 1326, an employee identifier that is used to pre-populate employee identifier area 1340, and/or the like. After step 1418, process 1400 proceeds to step 1420.

In step 1420, a determination is made as to whether or not a job site has been selected for the potential employee (e.g., selected in assigned site area 1328). When a job site has been selected (i.e., "YES" in step 1420), process 1400 proceeds to step 1422. Otherwise, if no job site has been selected (i.e., "NO" in step 1420), process 1400 proceeds to step 1424.

In step 1422, the Zip code associated with the job site, selected in step 1420, is retrieved. The Zip code may be retrieved from a remote system (e.g., platform 110 or an external system 140), and pre-populated into a field (e.g., Zip code area 1330). After step 1422, process 1400 proceeds to step 1424.

In step 1424, a determination is made as to whether or not a job title has been selected for the potential employee (e.g., selected in title area 1332). When a job title has been selected (i.e., "YES" in step 1424), process 1400 proceeds to step 1426. Otherwise, if no job title has been selected (i.e., "NO" in step 1424), process 1400 returns to step 1402.

In step 1426, a determination is made as to whether or not the Zip code for the site, selected in step 1420, has been retrieved (e.g., in step 1422). If the Zip code has been retrieved (i.e., "YES" in step 1426), process 1400 proceeds to step 1428. Otherwise, if the Zip code has not yet been retrieved (i.e., "NO" in step 1426), process 1400 returns to step 1402.

In step 1428, the wage range is retrieved. The wage range may be retrieved from a remote system (e.g., platform 110 or an external system 140), and pre-populated into a field (e.g., wage range area 1336). The wage range may be specific to the Zip code retrieved in step 1422 and/or the job title selected in step 1424. For instance, server application may associate each of a plurality of pairs of Zip codes and job titles with a wage range (e.g., in database 114). Thus, each wage range may comprise a minimum wage and/or a maximum wage available for the job title at the Zip code, and may be retrieved by client application 132 from server application 112 (or from data previously downloaded from server application 112) using the job title and Zip code acquired in steps 1424 and 1422, respectively.

In step 1430, after the wage range is retrieved in step 1428, a determination is made as to whether or not a wage for the potential employee has been received (e.g., input into offered wage area 1334). If a wage has been received (i.e., "YES" in step 1430), process 1400 proceeds to step 1432. Otherwise, if a wage has not yet been received (i.e., "NO" in step 1430), process 1400 returns to step 1402.

In step 1432 (or at any time after both a wage range is retrieved in step 1428 and a wage is received), a determination is made as to whether or not the received wage is within the retrieved wage range, i.e., whether or not the wage, received, for example, in step 1430, is greater than or equal to the minimum available wage and/or less than or equal to the maximum available wage. If the wage is not within the wage range (i.e., "NO" in step 1432), process 1400 proceeds to step 1434. Otherwise, if the wage is within the wage range (i.e., "YES" in step 1432), process 1400 returns to step 1402.

In step 1434, an alert is provided to indicate that the wage, input for the potential employee, is outside the available wage range. This alert may comprise, for example, an indication in informational area 750F (e.g., a change in the background color of wage range area 1336 to red, a pop-up requiring confirmation of the wage input into offered wage area 1334, etc.). In addition, in step 1436, an approval request may be issued, for example, by transmitting a request from client application 132 to server application 112 to seek approval from a supervisor of the manager-user. After step 1436, process 1400 returns to step 1402.

Figure 15:
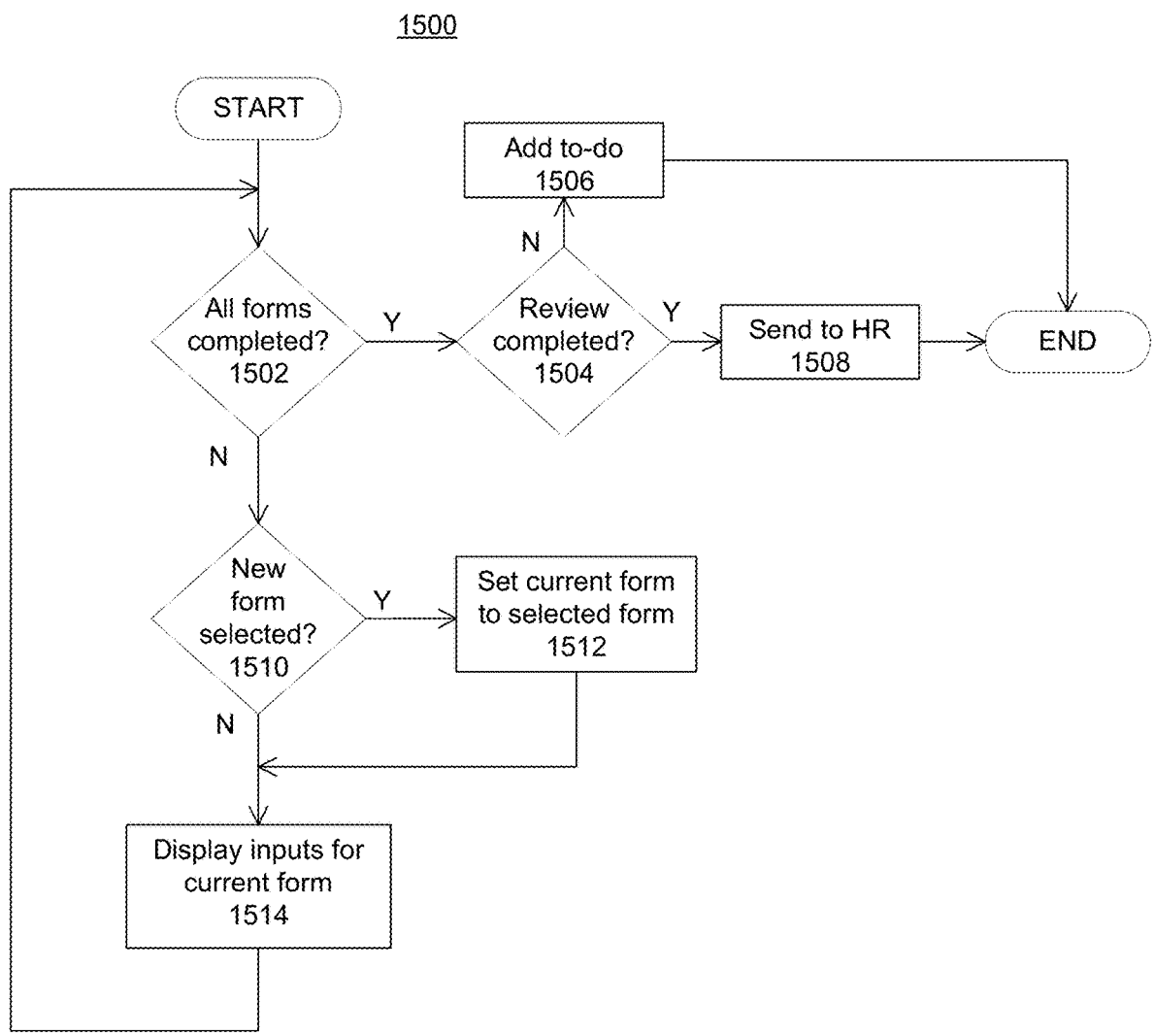
FIG. 15 illustrates a hiring process, according to an embodiment.

FIG. 15 illustrates a hiring process 1500 for a new employee, according to an embodiment. Although a specific arrangement of steps is illustrated, it should be understood that one or more of the steps may be reordered, rearranged, omitted, and/or combined with additional steps to achieve the same overall effect and function. Process 1500 may be performed wholly by server application 112, wholly by client application 132, or with different steps performed by server application 112 and client application 132. Process 1500 may be performed in conjunction with user interactions with informational area 750G.

Process 1500 may begin in step 1502 with a determination of whether or not all forms (e.g., in the list of forms 1352) have been completed (i.e., all necessary information has been entered into each form). If all the forms have been completed (i.e., "YES" in step 1502), process 1500 proceeds to step 1504. Otherwise, if at least one of the forms has not been completed (i.e., "NO" in step 1502), process 1500 proceeds to step 1510.

In step 1504, a determination is made as to whether or not a final review of the completed forms has been completed (e.g., via an input confirming that the manager-user, the manager-user's supervisor, and/or another responsible individual has completed a final review of the forms). If the final review of the completed forms has not been completed (i.e., "NO" in step 1504), process 1500 proceeds to step 1506. Otherwise, if the final review of the completed forms has been completed (i.e., "YES" in step 1504), process 1500 proceeds to step 1508.

In step 1506, the form review process is added to the manager-user's and/or other responsible users' to-do list (e.g., to-do list 1312). The form review process may also be added to alerts area 720 and/or reminders area 740, when appropriate (e.g., after remaining incomplete for a predetermined period of time, as a due date approaches, etc.). After step 1506, process 1500 may end.

In step 1508, the completed forms may be sent or notified to a human resources system or department (e.g., to obtain signatures from the employee to be hired). After step 1508, process 1500 may end.

In step 1510, a determination is made as to whether or not a new form has been selected (e.g., by the manager-user selecting a form from the list of forms 1352). If a new form has been selected (i.e., "YES" in step 1510), process 1500 proceeds to step 1512. Otherwise, if a new form has not been selected, process 1500 proceeds to step 1514.

In step 1512, the form selected in step 1510 is set as the current form. In this case, the form information in current form area 1354 may be updated to reflect information about the selected form. After step 1512, process 1500 proceeds to step 1514.

In step 1514, inputs are displayed for entering information into fields of the current form (e.g., either the selected form set as the current form in step 1512 or the most-recently selected or default form). In the case that the current form was changed in step 1512, the form represented in on-boarding form area 1356 may be changed to the current form. Otherwise, on-boarding form area will continue to display inputs for whatever form with which the manager-user has been working. In either case, the manager-user can input information into the inputs of the current form via on-boarding form area 1356. After step 1514, process 1500 returns to step 1502.

2.12. Firing

Figure 16A:
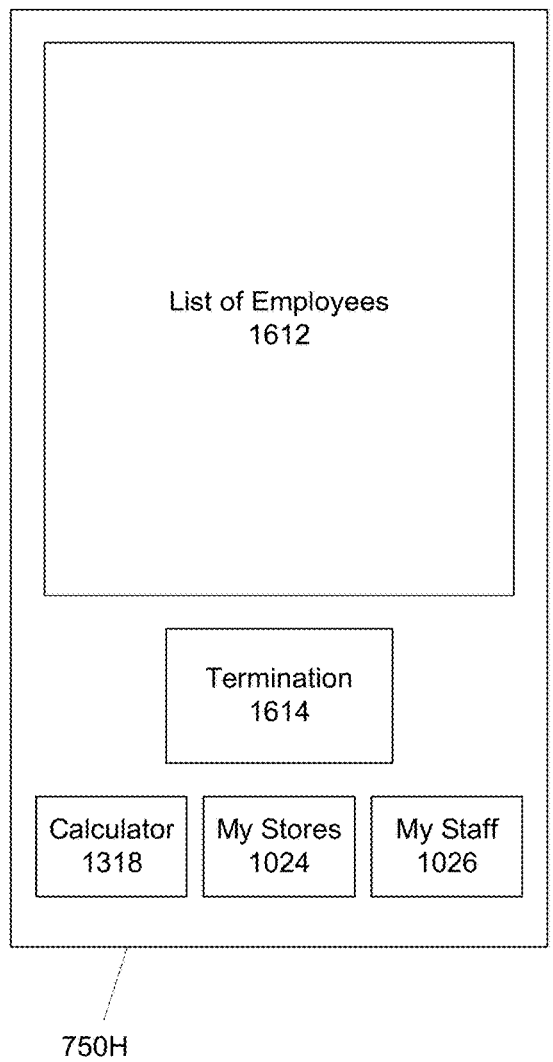
FIG. 16A illustrates a off-boarding user interface, according to an embodiment.

In an embodiment, selection of fire area 1014 changes at least a portion of the user interface of the application (e.g., informational area 750) to one dedicated to a firing process. FIG. 16A illustrates an example of informational area 750H after a user has selected fire area 1014, according to an embodiment. As illustrated, informational area 750H comprises a list of employees 1612, a termination input 1614, calculator 1318, sites area 1024, and staff area 1026.

List of employees 1612 may be similar or identical to the list of employees described with respect to the staff user interface that is dedicated to managing employees. Specifically, list of employees 1612 may comprise a selectable entry for every employee for which the manager-user is responsible and/or within the current context, and may be a scrollable, expandable, roll-up list, as described elsewhere herein. It should be understood that each entry in the list of employees may comprise information for a particular employee (e.g., employee's name, employee identifier, etc.).

When a manager-user selects an employee from list of employees 1612, termination input 1614 may be highlighted (e.g., with a red background) and/or become active (i.e., selectable). Prior to selection of an employee in list of employees 1612, termination input 1614 may be un-highlighted (e.g., grayed-out) and/or inactive (i.e., unselectable). In an embodiment, the manager-user may be able to select only a single employee, from list of employees 1612, at a time. Alternatively, the manager-user may be permitted to select multiple employees from list of employees 1612.

Figure 16B:
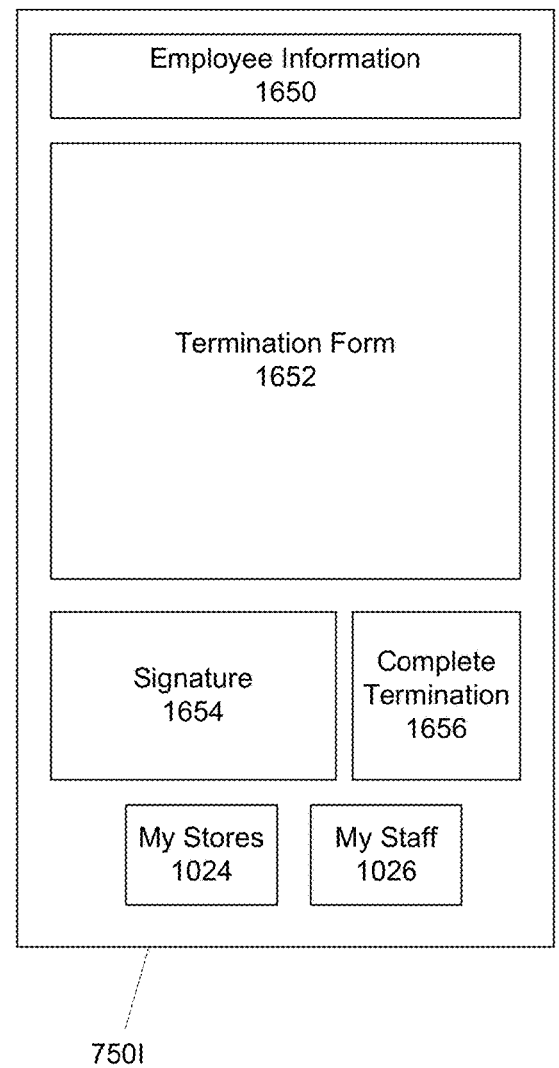
FIG. 16B illustrates a termination completion user interface, according to an embodiment.

In an embodiment, selection of termination input 1614 changes at least a portion of the user interface of the application (e.g., informational area 750H) to one dedicated to a termination process. FIG. 16B illustrates an informational area 750I after a user has selected termination input 1614, according to an embodiment. As illustrated, informational area 750I comprises an employee information area 1650, a termination form area 1652, a signature area 1654, a complete termination input 1656 (e.g., an icon), sites area 1024, and staff area 1026.

Employee information area 1650 may comprise information about the employee to be terminated (e.g., selected from list of employees 1612), such as his or her name, employee identifier, hire date, job title, wage, assigned store, and/or the like. Employee information area 1650 may be similar or identical to employee information area 1350, and may be automatically populated and not modifiable by the manager-user.

Termination form area 1652 may be similar or identical to on-boarding form area 1356, except that it represents a termination form, rather than hiring forms. Specifically, termination form area 1652 may comprise one or more inputs for inputting information into fields of the termination form. Termination form area 1652 may be scrollable or comprise paging inputs for navigating the termination form, if it cannot completely fit within the display space available to termination form area 1652.

In an embodiment, the termination form rendered in termination form area 1652 may be automatically populated with information to the extent possible (e.g., from information stored, for example, in database 114, that is associated with the employee to be terminated). In addition, as information is input into the termination form, via termination form area 1652, the input information may be continuously pushed from client application 132 to server application 112 for storage. This can serve as a back-up in case client application 132 encounters a problem. The input information may also be validated in real time or near real time (e.g., as the information is input) to prevent faulty data from being pushed to server application 112.

Signature area 1654 may comprise one or more inputs that accept an electronic signature from the manager-user. For example, signature area 1654 may comprise a textbox for inputting the manager's name and/or a free-form area which allows the manager to draw his or her signature (e.g., using a finger or stylus in cases in which user system 130 comprises a touch panel).

In an embodiment, complete termination input 1656 may initially be un-highlighted (e.g., uncolored or white background, grayed out, etc.) and/or inactive (i.e., unselectable). Once the termination form, represented in termination form area 1652, has been completely and properly filled in (e.g., validated), complete termination input 1656 may be highlighted (e.g., background color changed to red) and activated (i.e., selectable). When the manager-user selects complete termination input 1656, the completed termination form may be sent to a human resources system or department to complete termination of the employee.

Once termination has been completed, the human resources system or department may notify server application 112, or alternatively, server application 112 may comprise a human resources system. In addition, a request to open a position corresponding to the terminated employee's position may be automatically or semi-automatically (e.g., after user input or confirmation) sent to the human resources system or department, such that a new job opening may be posted by the company (e.g., on an internal or external job website). The newly opened position may also show up in the list of employees available via selection of staff area 1026, as a position to be hired against (e.g., via confirmation process 1400 and hiring process 1500).

2.13. Cases

In an embodiment, selection of cases area 1016 changes at least a portion of the user interface of the application (e.g., informational area 750) to one dedicated to case management. The dedicated case management user interface may comprise a list of cases for all areas and/or sites within the user's role and/or current context. Initially, the list of cases may only consist of open cases. Alternatively, the initial list of cases may comprise all cases, regardless of status. The list of cases may be scrollable, sortable (e.g., by date, site, etc.), and comprise a selectable entry for each case. Each entry represents a case and may comprise information about the case, such as the date the case was opened, the site (e.g., store) associated with the case, a description of the case, a case status, a priority (e.g., low, medium, high), and/or the like.

In an embodiment, the list of cases may comprise two lists of cases: one list for open cases; and one list for closed cases. In addition, the case management user interface may comprise case statistics, such as the number of open cases, the number of closed cases (e.g., over a specified time period, e.g., as set in the context), one or more charts (line chart, bar chart, etc.) that illustrate, for example, the number of cases opened during each week of the current month, and/or the like.

When the user selects an entry within the list of cases, details may be provided regarding the case. The details may be provided in a pop-up frame or by changing at least a portion of the user interface (e.g., informational area 750) to a user interface dedicated to details about the selected case. These details may comprise notes and comments regarding the selected case, a subject of the case (e.g., "carpet cleaning"), an incident date, a case number, a case type ("corrective action"), a priority (e.g., low, medium, high), a status (e.g., "follow up," "in progress," "reopened," etc.), a service type (e.g., "janitorial"), the type of person who reported the case (e.g., "customer," "employee," etc.), the name of the person who reported the case, the title of the person who reported the case, follow-up notes, a list of communications (e.g., emails) related to the case (or a link thereto), and/or the like. In addition, the user interface dedicated to case details may comprise one or more inputs for adding and saving information (e.g., adding a new note or comment). Newly added information, once saved or in real time, can be transmitted from client application 132 to server application 112 for storage.

In an embodiment, the case management user interface may comprise sites area 1024. The user may select sites area 1024 to obtain a list of sites within the user's role and/or current context, and select one or more of the sites from the list of sites. When the user selects one or more sites from the list of sites, the user interface may be changed back to the case management user interface, and only those cases associated with the selected site(s) may be listed in the list of cases. The list of cases for the selected site(s) may comprise both open and closed cases, in which case, the status (i.e., open or closed) of the cases may be indicated in the entry for each case.

In an embodiment, the case management user interface may comprise staff area 1026. The user may select staff area 1026 to obtain a list of employees within the user's role and/or current context, and select one or more of the employees from the list of employees. When the user selects one or more employees from the list of employees, the user interface may be changed back to the case management user interface, and only those cases associated with the selected employees may be listed in the list of cases. The list of cases for the selected employees may comprise both open and closed cases, in which case, the status (i.e., open or closed) of the cases may be indicated in the entry for each case.

2.14. Audits

In an embodiment, selection of audits area 1018 changes at least a portion of the user interface of the application (e.g., informational area 750) to one dedicated to audit management. The dedicated audit management user interface may comprise a list of audits for all areas and/or sites within the user's role and/or current context. The list of audits may be scrollable, sortable (e.g., by date, site, etc.), and comprise a selectable entry for each audit. Each entry represents an audit and may comprise information about the audit, such as the date the audit is due, the date the audit was submitted, the site (e.g., store) associated with the audit, an audit status (e.g., "submitted" or "due"), the overall score for the audit once it has been submitted, and/or the like.

In an embodiment, the audit management user interface may comprise audit statistics, such as audit compliance, number of remaining un-submitted audits, number of submitted audits, ratio of due audits to submitted audits for the current month, one or more charts (e.g., pie chart) illustrating, for example, the number of due audits and submitted audits, and/or the like.

In an embodiment, the audit management user interface may comprise sites area 1024. The user may select sites area 1024 to obtain a list of sites within the user's role and/or current context, and select one or more of the sites from the list of sites. When the user selects one or more sites from the list of sites, the user interface may be changed back to the audit management user interface, and only those audits associated with the selected site(s) may be listed in the list of audits. The list of audits for the selected site(s) may comprise both due and submitted cases, in which case, the status (i.e., due or submitted) of the audits may be indicated in the entry for each audit.

In an embodiment, the audit management user interface may comprise staff area 1026. The user may select staff area 1026 to obtain a list of employees within the user's role and/or current context, and select one or more of the employees from the list of employees. When the user selects one or more employees from the list of employees, the user interface may be changed back to the audit management user interface, and only those audits associated with the selected employees may be listed in the list of audits. The list of audits for the selected employees may comprise both due and submitted audits, in which case, the status (i.e., due or submitted) of the audits may be indicated in the entry for each audit.

When the user selects an entry within the list of audits, details may be provided regarding the audit. The details may be provided in a pop-up frame or by changing at least a portion of the user interface of the application (e.g., informational area 750) to a user interface dedicated to details about the selected audit. If a submitted audit is selected, these audit details may comprise an audit form with questions, answers, and scores. If an un-submitted audit that is due is selected, the audit details may comprise one or more inputs for adding and saving information, such as inputting an answer to a question in the audit form. Newly added information, once saved or in real time, can be transmitted from client application 132 to server application 112 for storage. For un-submitted audits, the detailed audit user interface may also comprise one or more inputs for completing and submitting the audit.

2.15. Schedule Management

In an embodiment, selection of schedule area 1022 changes at least a portion of the user interface of the application (e.g., informational area 750) to one dedicated to schedule management. Schedules may include regular schedules (e.g., daily, porter, and holiday schedules) and/or project schedules.

In an embodiment, schedule management may only be available to certain user roles (e.g., zone manager, zone lead, crew lead, and/or site manager). In addition, the scope of schedule management may be limited by the user role. For example, a zone manager may be able to update a schedule for any period of time for all of his or her managed sites, whereas a zone lead and crew lead may only be able to update a schedule for the current week for all of his or her managed sites.

In an embodiment, the application does not allow any user to change a past schedule. Furthermore, the application may not allow a user with certain lower user levels to schedule an employee for overtime without approval from a user with a user level that is at least one level higher. For example, a crew lead may need approval from a zone lead before scheduling an employee for overtime. In such a case, the application may facilitate approval, for example, by sending a request (e.g., by adding it to alerts area 720) for approval to the user with approval authority, and receiving the approval in response to the request (e.g., via one or more inputs of an overtime approval user interface). The approval request may be sent automatically whenever a user without overtime approval authority schedules an employee for overtime, or in response to an operation performed by the user (e.g., selection of one or more inputs within an overtime request user interface).

With respect to regular schedules, a manager-user (e.g., a crew lead or zone lead) may have the option to create a schedule for a new site (e.g., store) or customer, or manage a previously-created schedule for a site or customer (e.g., for the week). When creating a schedule, the user may fill in the schedule for a full week. The schedule may be created by starting with a base schedule for the site or customer, and allowing the user to change the times and employees for shifts, as needed. When managing a previously-created schedule, the user may update a schedule for the current week (e.g., changing times and employees for shifts, as needed) or add a schedule for the subsequent week (e.g., by pre-populating the schedule with the current week's schedule and changing time and employees for shifts, as needed).

In an embodiment, the user interface dedicated to schedule management may initially comprise a list of all sites within the current context. This list may be similar or identical to the list of sites that is presented in the user interface dedicated to managing sites (e.g., available via selection of sites area 1028). However, when a user selects an entry for a site within the list of sites, informational area 750 may be changed to schedule information for the selected site or the schedule information for the selected site may be displayed in a pop-up frame that is overlaid on the list of sites.

The schedule information may initially comprise a list of weeks (e.g., within the current month). For each week, the list of weeks may comprise an entry that includes information about the week. This week information may include, for example, dates defining the week (e.g., beginning and/or end date), a status of the week (e.g., "locked" for a past week indicating that the schedule for that week cannot be changed, "current" for the current week, "base" for a future week for which the schedule has not yet been set, etc.), number of hours budgeted for the week, actual hours punched in for the week, overtime hours accrued during the week, budgeted revenue for the week, actual revenue for the week, overtime costs for the week, and/or the like. The schedule information may comprise scrolling or paging inputs so that a user may navigate back to previous weeks and forward to future weeks. In addition, the schedule information may comprise other information or inputs for viewing other information about the selected site (e.g., monthly budget for the site, monthly hours for the site, monthly overtime hours for the site, etc.).

Figure 17A:
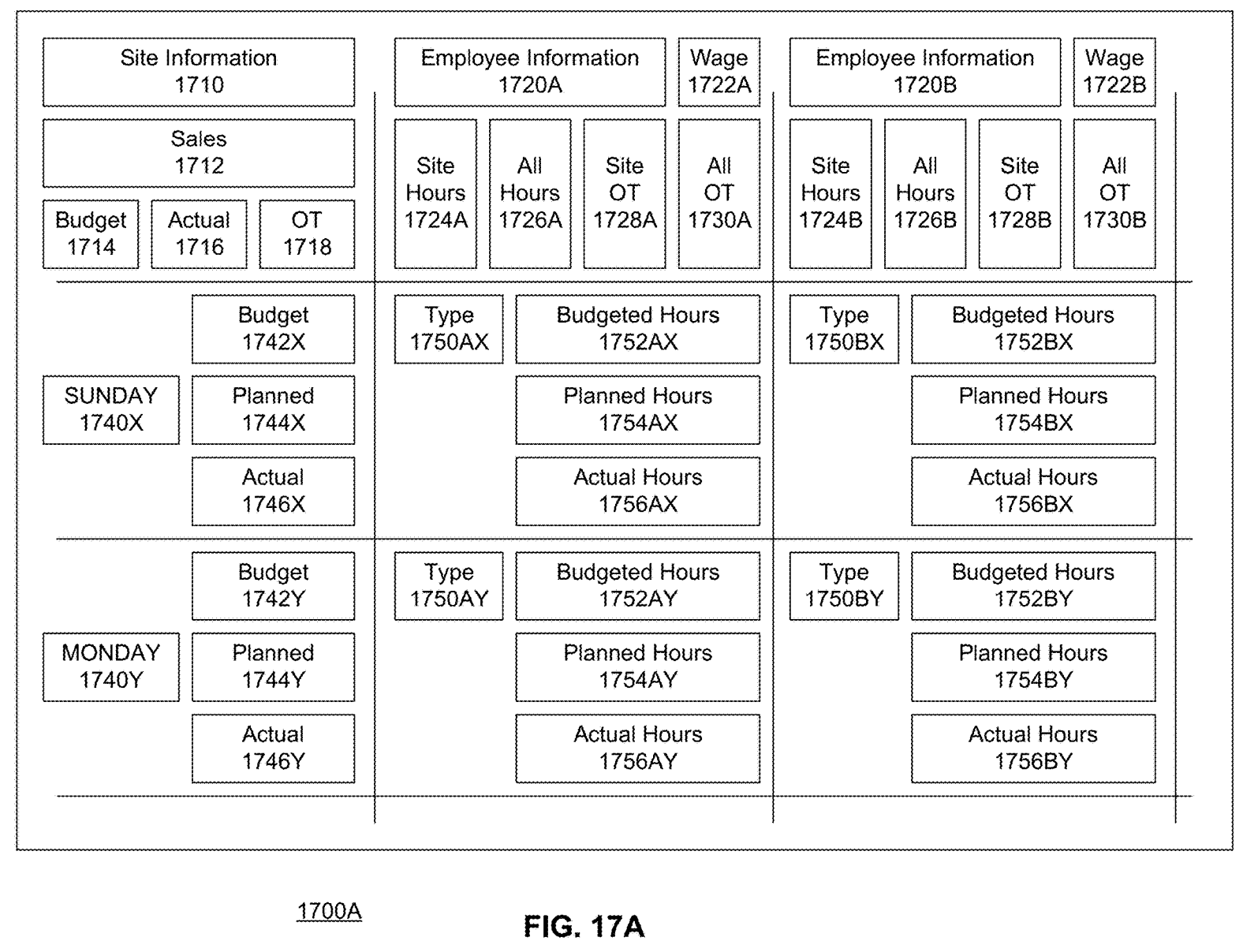
Figure 17B:
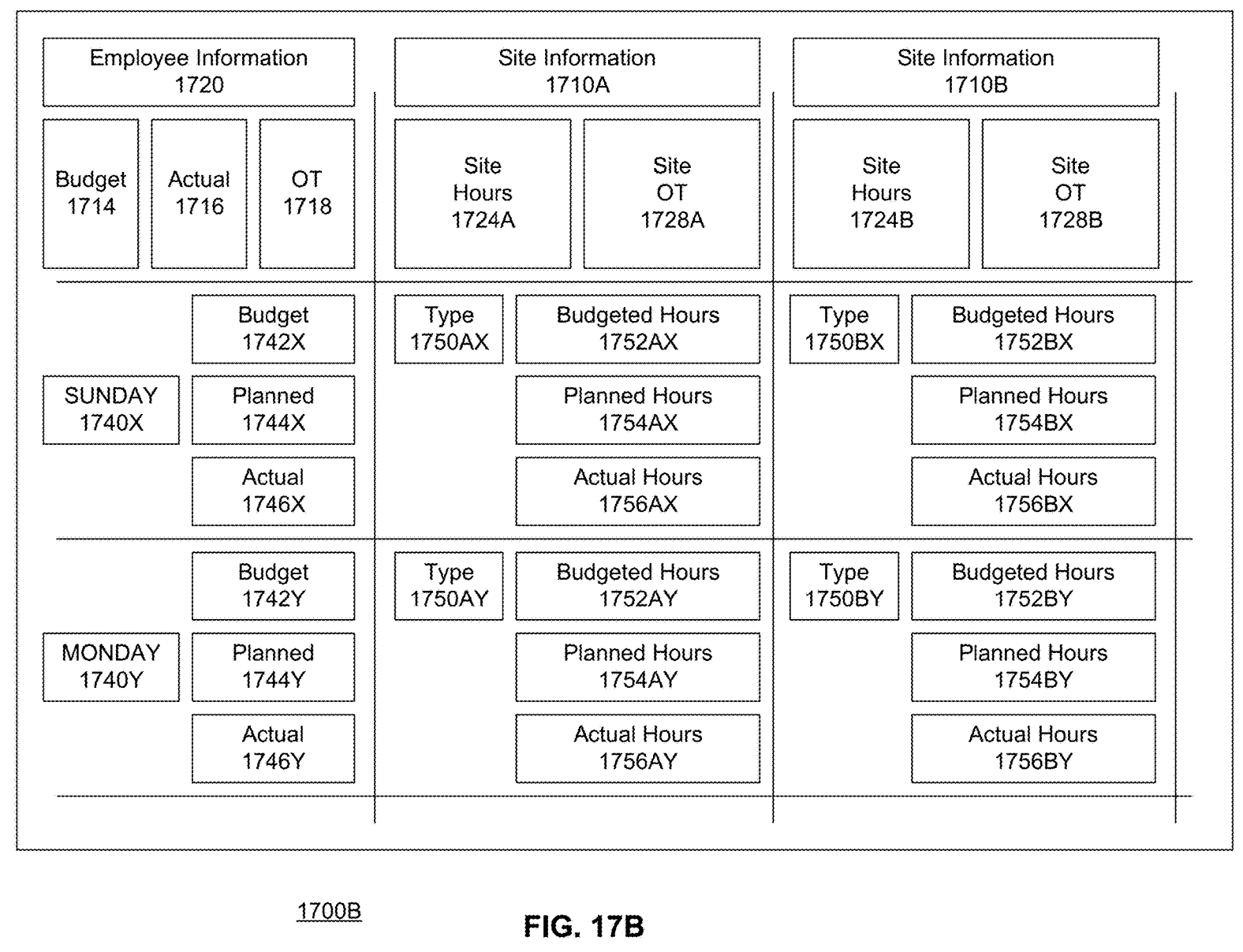

In an embodiment, when a user selects a week in the list of weeks, detailed information for the selected week is displayed (e.g., by changing informational area 750 or a pop-up overlaid on the list of weeks), such that the user can view each week individually. FIGS. 17A and 17B illustrate example user interfaces that display the detailed information for a selected week, according to embodiments.

FIG. 17A illustrates an example user interface 1700A with detailed information for a selected week and a selected site. User interface 1700A has a grid format that has each day of the week listed along the vertical axis and each employee assigned to the selected site listed along the horizontal axis. It should be understood that the axes may be switched, such that the employees are listed along the vertical axis and the days of the week are listed along the horizontal axis. In addition, although a specific arrangement of the various components of user interface 1700A is shown, it should be understood that other arrangements are possible, including with fewer or more components. Also, user interface 1700A may be scrollable in both the vertical and horizontal direction to reveal information for additional days and/or employees.

As illustrated, user interface 1700A comprises a site-specific area comprising site information area 1710, sales area 1712, budget area 1714, actual area 1716, and overtime area 1718. Each area may comprise one or more sets of information, inputs, and/or the like.

Site information area 1710 may comprise information about the selected site, such as site name, site identifier, site address, and/or the like. In addition, site information area 1710 may comprise one or more inputs. For example, the site address may link to a map interface, such that selection of the site address in site information area 1710 causes a map pop-up frame or other user interface, which comprises a virtual map image with the location of the site indicated on the virtual map image, to be displayed. In addition, the site name and/or site identifier may link to a list of employees assigned to the site. This list of employees may be similar or identical to other lists of employees described herein, with an entry for each employee (e.g., including the employee's name and title). When a user selects an entry in the list of employees, user interface 1700A may be switched to user interface 1700B, using the selected entry as the selected employee for user interface 1700B.

Sales area 1712 may comprise sales statistics for the selected site represented in user interface 1700A, such as the value of sales at the site for the month encompassing the selected week, the daily labor expense as a percentage of daily sales for the site, the monthly labor expense as a percentage of monthly sales for the site, and/or the like. A status of the sales may also be indicated, for example, using a background color of sales area 1712. For instance, if the labor expense as a percentage of sales for the site is greater than a threshold value (e.g., 56%), the background color of at least a portion of sales area 1712 may be red. Otherwise, the background color may be green or uncolored (or yellow if the percentage is less than one threshold value but greater than a second threshold value).

Budget area 1714 may comprise budget statistics, such as weekly budget hours for the site and/or weekly budget value (e.g., in dollars) for the site. Similarly, actual area 1716 may comprise actual statistics, such as actual hours punched in for the site and/or actual value (e.g., in dollars) for the punched-in hours for the site. Overtime area 1718 may comprise overtime statistics, such as weekly overtime hours punched in for the site and/or weekly overtime expense (e.g., in dollars) for the site.

The employee axis of the grid in user interface 1700A may comprise an employee-specific area for each employee assigned to the site. Each employee-specific area may comprise employee information area 1720, a wage area 1722, a site hours area 1724, an all hours area 1726, a site overtime area 1728, and an all overtime area 1730. Each area may comprise one or more sets of information, inputs, and/or the like. A manager-user may be permitted (e.g., via an input) to add additional columns on the employee axis for additional employees when necessary (e.g., if another employee will be taking over an employee's shift).

Employee information area 1720 may comprise information about the respective employee represented by the particular column, such as the employee's name, employee identifier, employee's contact information (e.g., telephone number and/or email address), and/or the like. In addition, employee information area 1720 may comprise one or more inputs. For example, employee information area 1720 may link to user interface 1700B for the respective employee, such that selection of employee information area 1720 causes user interface 1700A to be switched to user interface 1700B, using the respective employee as the selected employee for user interface 1700B. Wage area 1722 may display the respective employee's wage (e.g., hourly wage) for the week.

Site hours area 1724 may comprise weekly hours statistics for the respective employee at the site. Similarly, all hours area 1726 may comprise weekly hours statistics for the respective employee across all sites at which the employee has worked. The weekly hours statistics may comprise, for example, the number of hours punched in by the employee during the week and/or the value (e.g., in dollars) of the hours punched in by the employee during the week.

Site overtime area 1728 may comprise weekly overtime statistics for the respective employee at the site. Similarly, all overtime area 1730 may comprise weekly overtime statistics for the respective employee across all sites at which the employee has worked. The weekly overtime statistics may comprise, for example, the number of overtime hours punched in by the employee during the week and/or the expense (e.g., in dollars) of the overtime hours punched in by the employee during the week.

The day axis of the grid in user interface 1700A may comprise a day-specific area for each day in the week (i.e., Sunday through Saturday). Each day-specific area may comprise an identification of the day 1740, a daily budget area 1742, a daily planned area 1744, and a daily actual area 1746. Days on which paychecks are issued may be indicated (e.g., by a mark or highlighting). Daily budget area 1742 may comprise budget statistics for the respective day, such as daily budget hours for the site and/or daily budget value (e.g., in dollars) for the site. Similarly, daily planned area 1744 may comprise planned statistics for the respective day, such as daily planned hours for the site and/or daily planned value (e.g., in dollars) for the site. Daily actual area 1746 may comprise actual statistics for the respective day, such as daily actual hours punched in for the site and/or daily actual value (e.g., in dollars) of the punched-in hours for the site.

Each cell of the grid, formed by the employee axis and day axis, may comprise a day-and-employee-specific area for the selected site. Each day-and-employee-specific area may comprise a type area 1750, a budgeted hours area 1752, a planned hours area 1754, and an actual hours area 1756. Type area 1750 may indicate the type of hours indicated in the day-and-employee-specific area (e.g., regular, porter, holiday, etc.).

Budgeted hours area 1752 may indicate the hours budgeted for the respective employee on the respective day, for example, by indicating a budgeted start and end time for the respective employee's shift. In an embodiment, budgeted hours area 1752 cannot be modified by a user (at least not within user interface 1700A and not without an appropriate user role).

Planned hours area 1754 may indicate the hours planned for the respective employee on the respective day, for example, by indicating a budgeted start and end time for the respective employee's shift. Planned hours area 1754, for a current or future week, may be modified by a user with the appropriate user role or authorization. Modification of planned hours area 1754 may comprise setting a new start time and/or setting a new end time. For example, the start and/or end times may be changed using respective drop-down menus and/or textboxes. Planned hours area 1754, for a past week, may not be modified.

If the planned hours, set by a user, would include overtime hours, approval may be required and sought (e.g., by automatically sending an approval request and/or alert to a supervisor of the user). Furthermore, when the planned hours are modified, an alert and/or email message may be automatically sent to the affected employee. Also, in an embodiment, if an employee's shift is removed, an alert and/or email message may be automatically sent to all other available employees (e.g., all other employees assigned to the site), and a process may be initiated so that each of the other available employees may bid on the shift or a portion of the shift (e.g., via user interfaces of their respective client applications 132). Employees for whom the shift would result in the accrual of overtime hours may be excluded from or restricted in the bidding process.

Actual hours area 1756 may indicate the actual hours punched in by the respective employee (if available for the day), for example, by indicating the time at which the employee punched in and the time at which the employee punched out. In an embodiment, actual hours area 1756 cannot be modified by a user (at least not within user interface 1700A and not without an appropriate user role). The actual hours indicated in actual hours area 1756 may be pulled from a payroll system, or, if they cannot be pulled from the payroll system, from punch data (e.g., acquired using the punch-in and punch-out user interfaces of client application 132 on the respective employee's device). If punch data is missing, actual hours area 1756 may become modifiable, such that a user may enter the punch data manually (e.g., by inputting start and end times using drop-down menus and/or textboxes). Any change to punch data may be logged. Furthermore, if an employee was planned for a shift, but did not show (i.e., did not punch in), but another employee punched in for the shift, actual hours area 1756 for the employee who did not show may be blocked out (e.g., grayed out), and a new column for the employee who punched in for the shift may be added with the actual hours area 1756 for that employee filled in, and, optionally, with the planned area 1754 for that employee blocked out.

In an embodiment in which one employee may be scheduled to work multiple shifts at the same site on the same day, an additional employee column may be added for the employee on the employee axis for each additional shift. Alternatively, type area 1750, budgeted hours area 1752, planned hours area 1754, and/or actual hours area 1756 may be duplicated, in either the vertical or horizontal direction, for each additional shift.

FIG. 17B illustrates an example user interface 1700B with detailed information for a selected week and a selected employee. User interface 1700B has a grid format that has each day of the week listed along the vertical axis and each site, at which the selected employee has a shift during the selected week, listed along the horizontal axis. It should be understood that the axes may be switched, such that the sites are listed along the vertical axis and the days of the week are listed along the horizontal axis. In addition, although a specific arrangement of the various components of user interface 1700B is shown, it should be understood that other arrangements are possible, including with fewer or more components. Also, user interface 1700B may be scrollable in both the vertical and horizontal direction to reveal information for additional days and/or sites.

As illustrated, user interface 1700B comprises an employee-specific area comprising employee information area 1720, budget area 1714, actual area 1716, and overtime area 1718. Each area may comprise one or more sets of information, inputs, and/or the like.

Employee information area 1720 may comprise information about the respective employee, such as the employee's name, employee identifier, employee's contact information (e.g., telephone number and/or email address), and/or the like. In addition, employee information area 1720 may comprise one or more inputs. For example, the employee's displayed telephone number may link to an interface for initiating a telephone call or sending a text message to the displayed telephone number of the employee. Similarly, the employee's displayed email address may link to an interface for composing and transmitting an email message to the email address of the employee.

In an embodiment, selection of the employee's name or other area in employee information area 1720 may cause a pop-up frame or other user interface to be displayed. This additional user interface may comprise a scrollable or pageable list of weeks for the employee represented in employee information area 1720. The list of weeks may consist of any entry for each of the weeks in a given month (e.g., starting with the current month), and the user may be able to scroll or page to additional months. Each entry for a week may identify the week (e.g., by date(s)), a status of the week's schedule (e.g., locked, current, base schedule only), the number of budgeted hours for the employee for that week, the number of actual hours punched in by the selected employee for that week, and the number of overtime hours punched in by the selected employee for that week. In addition, the user interface may comprise statistics for the month represented by the displayed list of weeks, such as the monthly hours budgeted for the selected employee, the total actual hours punched in by the selected employee for the month, and/or the total overtime hours punched in by the selected employee for the month.

Budget area 1714 may comprise budget statistics, such as weekly budget hours for the selected employee and/or weekly budget value (e.g., in dollars) for the selected employee. Similarly, actual area 1716 may comprise actual statistics, such as actual hours punched in by the selected employee and/or actual value (e.g., in dollars) for the hours punched in by the selected employee. Overtime area 1718 may comprise overtime statistics, such as weekly overtime hours punched in by the selected employee and/or weekly overtime expense (e.g., in dollars) for the selected employee's punched-in overtime hours.

The site axis of the grid in user interface 1700B may comprise a site-specific area for each site at which the selected employee worked or is planned to work during the selected week. Each site-specific area may comprise site information area 1710, a site hours area 1724, and a site overtime area 1728. Each area may comprise one or more sets of information, inputs, and/or the like. Site information area 1710 in user interface 1700B may be similar or identical to site information area 1710 in user interface 1700A. Site hours area 1724 may comprise weekly hours statistics for the site (either for all employees or just the selected employee), such as the number of hours punched in during the week and/or the value (e.g., in dollars) of the hours punched in during the week. Similarly, site overtime area 1728 may comprise weekly overtime statistics for the site (either for all employees or just the selected employee), such as the number of overtime hours punched in during the week and/or the expense (e.g., in dollars) of the overtime hours punched in during the week.

The day axis of the grid in user interface 1700B may comprise a day-specific area for each day in the week (i.e., Sunday through Saturday). The day-specific area in user interface 1700B may be similar or identical to the day-specific area described with respect to user interface 1700A.

Each cell of the grid, formed by the site axis and day axis, may comprise a day-and-site-specific area for the selected employee. The day-and-site-specific area in user interface 1700B may be similar or identical to the day-and-employee-specific area in user interface 1700A.

In an embodiment in which one employee may be scheduled to work multiple shifts at the same site on the same day, an additional site column may be added for the employee on the site axis for each additional shift. Alternatively, the type area 1750, budgeted hours area 1752, planned hours area 1754, and/or actual hours area 1756 may be duplicated, in either the vertical or horizontal direction, for each additional shift.

In the embodiments illustrated by user interfaces 1700A and 1700B, users are able to view each week, one at a time, for a given site or a given employee. All organization levels may see the same view and/or have the same privileges. In addition, any overtime area (e.g., overtime area 1718, site overtime area 1728, and/or overtime area 1730) with a positive value may be highlighted (e.g., with a red background color).

FIGS. 17C and 17D illustrate example user interface that display detailed information for a selected week, according to embodiments that may include, or represent an alternative, to the user interfaces illustrated in FIGS. 17A and 17B.

FIG. 17C illustrates an example user interface 1700C with detailed information for a selected week and selected site. As illustrated, user interface 1700C comprises site information area 1710, which may comprise information about the selected site (e.g., name and address), week input 1760, edit schedule input 1762, weekly budget area 1764, weekly actual area 1766, weekly overtime area 1768, and a weekly statistics grid 1780A.

In an embodiment, week input 1760 identifies the currently-selected week and comprises one or more inputs for selecting other weeks (e.g., via a drop-down menu, forward and back buttons, etc.). Whenever a new week is selected via week input 1760, the newly selected week may be identified (e.g., by beginning and ending date), and weekly statistics grid 1780A may be updated to reflect statistics for the selected week.

Figure 17E:
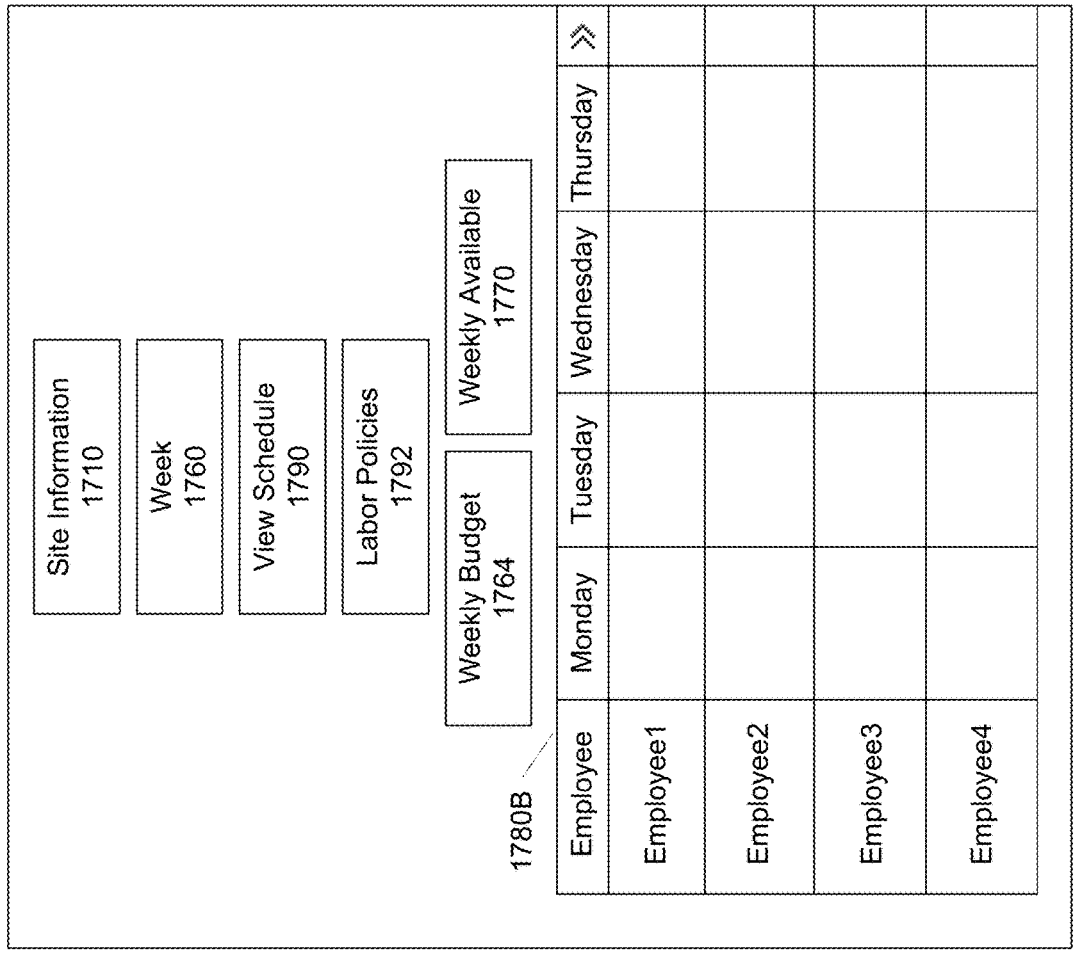

In an embodiment, selection of edit schedule input 1762 changes at least a portion of user interface 1700C to one dedicated to editing scheduled shifts for the selected site and selected week, such as user interface 1700D, illustrated in FIG. 17E. Weekly budget area 1764, weekly actual area 1766, and weekly overtime area 1768 may indicate a budgeted number of hours for the selected site and selected week, an actual number of hours punched in week-to-date for the selected site and selected week, and a number of overtime hours punched in week-to-date for the selected site and selected week, respectively.

Weekly statistics grid 1780A provides statistics for each day of the selected week and the selected site. Each day of the week is listed along the vertical axis, and each statistic is listed along the horizontal axis, such that each row represents a set of statistics for a given day during the selected week at the selected site (e.g., budgeted hours, scheduled hours, actual hours punched in, overtime hours punched in, etc.). It should be understood that the axes may be switched, such that the statistics are listed along the vertical axis and the days of the week are listed along the horizontal axis. In addition, although a specific arrangement of the various components of weekly statistics grid 1780A is shown, it should be understood that other arrangements are possible, including with fewer or more components. Also, weekly statistics grid 1780A may be scrollable in both the vertical and horizontal direction to reveal additional days and/or statistics.

In an embodiment, each day of the selected week may be expanded, as illustrated in FIG. 17D, and collapsed, as illustrated in FIG. 17C. Specifically, the entry for Sunday has been expanded to show a sub-list for Sunday. The sub-list comprises a list of employees scheduled for Sunday, along the vertical axis, with statistics for each employee along the horizontal axis. Each employee may be identified in the first column by name, employee identifier, telephone number, and/or the like. The statistics may include the actual start and end times of a shift (e.g., hh:mm [am/pm]-hh:mm [am/pm]), actual hours punched in for the shift, planned start and end times for the shift, planned hours for shift, and/or the like. It should be understood that each of the other days in the week can be expanded and collapsed in the same manner.

FIG. 17E illustrates an example user interface 1700D for editing scheduled shifts for the selected site and selected week, according to an embodiment. As illustrated, user interface 1700D comprises the same site information area 1710, week input 1760, and weekly budget area 1764, as in user interface 1700C. User interface 1700D may also comprise a view schedule input 1790, which, when selected, changes user interface 1700D back to user interface 1700C.

In addition, user interface 1700D may comprise a labor policies input 1792 for viewing applicable labor policies for the selected site, and a weekly available area 1770 which shows the number of available hours for the selected week and selected site. User interface may also comprise one or more inputs (not shown) for printing the schedule and/or copying the schedule (e.g., to a future week).

User interface 1700D may comprise a weekly statistics grid 1780B which provides statistics for each employee for each day of the selected week. Each employee within the user's responsibility and/or current context is listed along the vertical axis, and each day is listed along the horizontal axis, such that each row represents a schedule for an employee during the selected week at the selected site. It should be understood that the axes may be switched, such that the days of the week are listed along the vertical axis and the employees are listed along the horizontal axis. In addition, although a specific arrangement of the various components of weekly statistics grid 1780B is shown, it should be understood that other arrangements are possible, including with fewer or more components. Also, weekly statistics grid 1780B may be scrollable in both the vertical and horizontal direction to reveal additional days and/or employees.

Employees may be identified by name, unique employee identifier, telephone number, and/or the like. As illustrated, each cell in weekly statistics grid 1780B represents a particular day for a particular employee. Each cell may represent that employee's scheduled shift (if the day is in the future) or past shift (if the day is in the past), and may include the start and end times for the shift (e.g., hh:mm [am/pm]-hh:mm [am/pm]), and the number of hours represented by the shift. An example cell may include the text "07:00 a-10:00 a 3.0", indicating a shift from 7:00 am to 10:00 am, representing 3.0 hours, for the day and employee represented by the cell. In the event that an employee has no scheduled or past shift for a given day, the corresponding cell may be empty or indicate that the employee had no shift that day at the selected site (e.g., "off").

In an embodiment, a user may select which employees to be listed in weekly statistics grid 1780B, for example, by selecting an input (e.g., an "edit" icon in the column header for the employee column), which results in a pop-up frame or other user interface comprising a selectable list of all employees within the user's responsibility and/or current context. The user may select as many or as few of the employees, as he or she desires, from the list, and close the pop-up frame or save the selections, in which case only the selected employees will be represented in weekly statistics grid 1780B.

In an embodiment, a user may select a particular employee listed in weekly statistics grid 1780B, for example, by selecting an input (e.g., an "edit" icon in a given cell representing a day of the week for the employee), which results in a pop-up frame or other user interface comprising information for the selected employee. This information may include the employee's name, the selected date (e.g., "Wednesday, Jan. 25, 2017"), and an input for editing a shift for the employee (e.g., if a shift already exists) and/or adding a shift for the employee (e.g., if no shift yet exists) on the given day. When a user selects an input for editing or adding a shift for the employee, the input may be updated to reflect one or more inputs for selecting a start time for the shift, an end time for the shift, saving the shift, deleting the shift, and/or other options. In addition, the information may indicate whether or not the set shift includes a meal period and/or the length of the meal period. The user may then save the shift, in which case the user interface may revert to user interface 1700D with weekly statistics grid 1780B updated to reflect the new or modified shift.

2.16. Business Intelligence

In an embodiment, selection of business intelligence area 1020 changes at least a portion of the user interface of the application (e.g., informational area 750) to a business intelligence dashboard. The business intelligence dashboard may comprise one or more inputs for selecting a time period, a dimension, and/or a category for business intelligence information displayed in the dashboard. What time periods, dimensions, and/or categories a user can select may depend on that user's role.

The time period input may permit a user to select from a plurality of time intervals (e.g., by selecting an entry in a list of time intervals), such as daily, weekly, monthly, quarterly, yearly, month-over-month, and/or quarter-over-quarter. In addition, for each time interval, the user may be permitted to select from a plurality of time ranges, such as between 30-90 days for the daily time interval, between 4-52 weeks for the weekly time interval, between 3-24 months for the monthly time interval, between 3-16 quarters for the quarterly interval, etc.

The dimension input may permit a user to select from a plurality of business-intelligence dimensions (e.g., by selecting an entry in a list of dimensions), such as employee, site, zone, Zip code, city, state, and/or customer dimensions. When a user selects one of the dimensions, a list of selectable entities within the selected dimension may be displayed (e.g., in a pop-up frame or separate user interface). The list of selectable entities may be displayed with a search input (e.g., textbox), which allows the user to search the list of selectable entities (e.g., by paring down the list of entities to only those entities which match the inputted search criteria). The user may select one or more entities from the list of entities. For example, if the employee dimension is selected, the list of entities may consist of a list of employees. If the site dimension is selected, the list of entities may consist of a list of sites, and so on. A user may be permitted to select only a single business-intelligence dimension or, alternatively, multiple business-intelligence dimensions.

The category input may permit a user to select from a plurality of business-intelligence categories (e.g., by selecting an entry in a list of business-intelligence categories). Examples of business-intelligence categories include, without limitation, actual hours v. budgeted hours, overtime hours, project hours, revenue, revenue v. costs, labor costs, overtime costs, project costs, supply costs, repair costs, inspection compliance, inspection results, punch control, turnover, workers compensation claims, wages, and/or the like. In an embodiment, the categories are grouped, such that a user can only select one group but any number of categories within the group.

Whenever a new time period, dimension, and/or category is selected, the business intelligence dashboard may be updated to reflect the new time period, dimension, and/or category. The business intelligence dashboard may comprise one or more charts (e.g., bar or line chart), graphs, or statistics representing the selected category(ies) for the selected time period and the selected dimension(s). As an example, the business intelligence dashboard may comprise a chart that shows actual hours, dollars, or costs relative to budgeted hours, dollars, or costs, a chart that shows employee wages against the minimum wage and/or the market wage, and/or the like.

2.17. Tactical Command Center

Figure 18A:
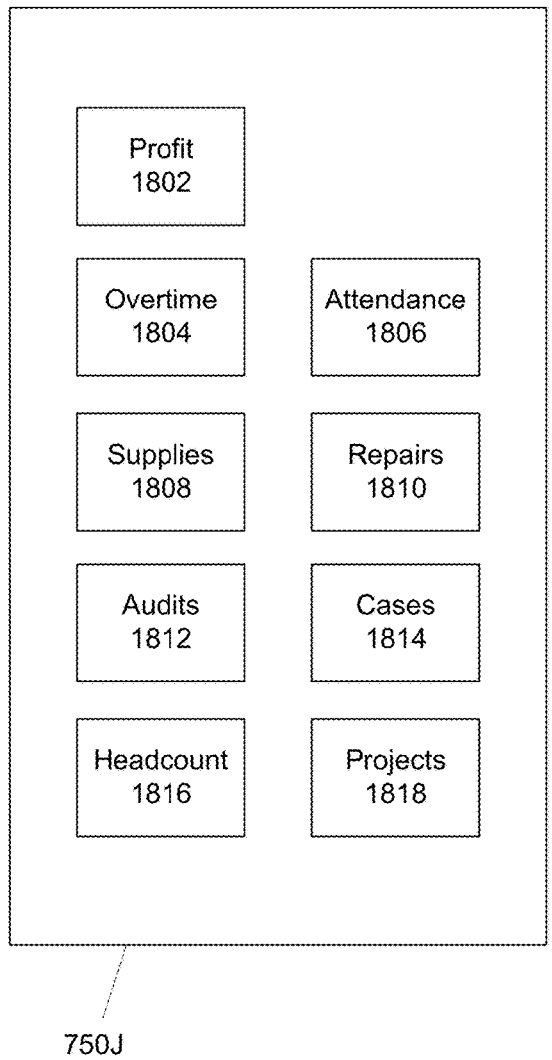

In an embodiment, selection of tactical command center area 1010 changes at least a portion of the user interface of the application (e.g., informational area 750) to one dedicated to a tactical command center. FIG. 18A illustrates an example of informational area 750J, representing the tactical command center, after a user has selected tactical command center area 1010, according to an embodiment. As illustrated, informational area 750J comprises a profit area 1802, an overtime area 1804, an attendance area 1806, a supplies area 1808, a repairs area 1810, an audits area 1812, a cases area 1814, a headcount area 1816, and a projects area 1818. Each of these areas may comprise one or more inputs (e.g., icons) and/or one or more sets of information. Although a specific arrangement of the various components is shown, it should be understood that other arrangements are possible, including fewer or more components.

In an embodiment, each of areas 1802-1818 comprises a selectable icon or other input. Areas 1802-1818 which need attention may be highlighted (e.g., using a red background or red icon). In addition, if any of areas 1802-1818 need attention, tactical command center area 1010 may also be highlighted in a similar manner (e.g., using a red background or red icon).

Figure 18B:
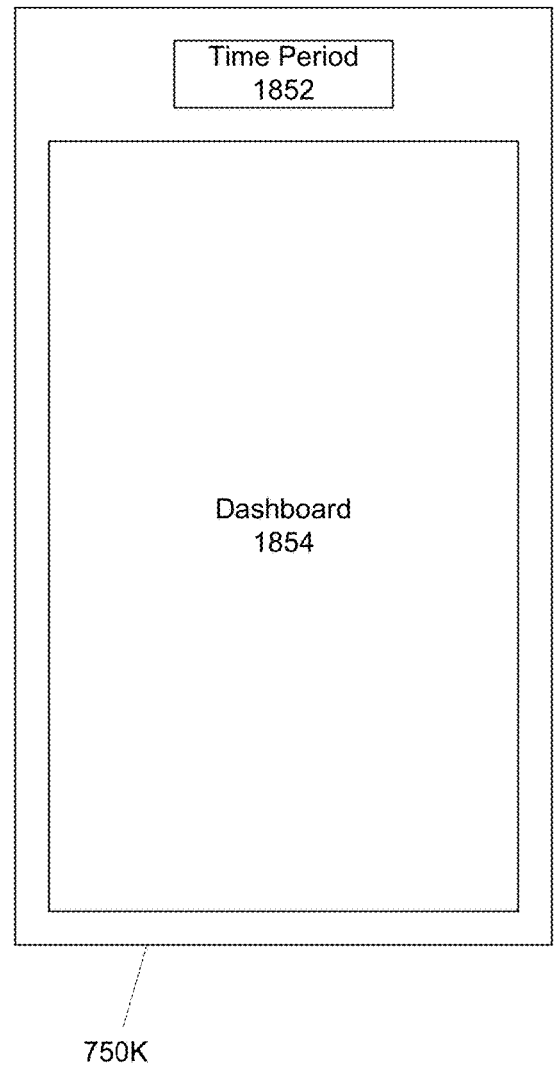

When any one of the areas 1802-1818 is selected, informational area 750J may be changed to a dashboard for visualizing various information. FIG. 18B illustrates an example of such a dashboard 750K, according to an embodiment. As illustrated, informational area 750K comprises a time period input 1852 and a dashboard area 1854.

Time period input 1852 may allow a user to select a time period (e.g., week or month). Data displayed in dashboard area 1854 may be updated to reflect the time period selected via time period input 1852.

Dashboard area 1854 may provide statistics and/or other data related to the area selected from areas 1802-1818. For example, the data in dashboard area 1854 may concern profits if profit area 1802 is selected, overtime if overtime area 1804 is selected, employee attendance if attendance area 1806 is selected, supply costs if supplies area 1808 is selected, repair costs if repairs area 1810 is selected, audit completion and/or compliance if audits area 1812 is selected, cases if cases area 1814 is selected, employee headcount if headcount area 1816 is selected, and projects if projects area 1818 is selected. The data may comprise both numerical and graphical data. For example, dashboard area 1854 may comprise one or more inputs for toggling between a numerical view (e.g., numbers and text) of the data and a graphical view (e.g., charts and graphs) of the data. Dashboard area 1854 may be similar or identical in format to the business intelligence dashboard described elsewhere herein.

In an embodiment, the tactical command center provides operational intelligence. This operational intelligence can be provided in real time, by user level, by shift, day, week, month, etc., and for all employees (e.g., with exceptions highlighted) or only employees with exceptions (e.g., no-shows, high variances between actual and scheduled punch-ins, etc.). The operational intelligence may allow users to navigate through operational details such as overtime hours, early shift blocks, shift end violations, actual hours over or under scheduled hours, incidents of no-shows, missing shifts, employee counts (e.g., number of employees budgeted and/or scheduled v. actual punch-ins by shift, site, day, etc.), wage statuses and/or exceptions (e.g., employees punching in as crew outside of the crew wage range by Zip code), and/or the like.

The tactical command center may aid in fraud detection and prevention. For example, the statistics presented in dashboard area 1854 can highlight an employee, site, zone, or region with unusually high hours (e.g., indicating fraud) and/or unusually low hours (e.g., indicating underserved sites, for which customer complaints may be expected). This can be highlighted in a graph that plots daily punched-in hours against the number of expected hours (e.g., based on historical hours data for the employee, site, zone, or region). The statistics may also highlight unusual punches based on punch-in and punch-out data, such as unusual shift durations (e.g., the same employee at the same site, the same employee at different sites, different employees at the same site, and/or different employees at different sites), an employee punching in to only overnight shifts, an employee punching in at too many sites (e.g., in a day, week, and/or month), and too many punches that had to be corrected (e.g., for the same employee, by the same manager, and/or for the same week, month, or other duration).

In an embodiment, dashboard area 1854 can provide statistics in a roll-up format, with the depth of the roll-up determined by the user's level. For example, a user, whose user level is the line-of-business level, may see aggregate statistics (e.g., number of regions, number of regional zones, number of zones, number of sites, number of employees, average regional zones per region, average zones per regional zone, average sites per zone, number of open cases, average regional vice president pay, average regional zone manager pay, average zone lead pay, audit compliance percentage, etc.) for all regions under his or her control and/or a list of regions with statistics for each region entry (e.g., name of regional vice president and statistics representing revenue, EBITDA, labor costs, supply costs, hours, overtime, punch corrections, no-shows, audits, cases, etc.). Each region entry in the list of regions can be selected, and, in response, dashboard area 1854 is updated to show aggregate statistics (e.g., name of regional vice president, name of region, number of regional zones, number of zones, number of sites, number of employees, average zones per regional zone, average sites per zone, average regional zone manager pay, average zone lead pay, budgeted revenue, actual year-to-date revenue, budgeted EBITDA, actual year-to-date EBITDA, number of open cases, audit compliance percentage, budgeted statistics, actual statistics, and variance between budgeted and actual statistics for revenue, labor costs, supply costs, hours, overtime, punch corrections, no-shows, etc.) for all regional zones within the selected region and/or a list of regional zones with statistics for each regional zone entry (e.g., name of regional zone manager and statistics representing revenue, EBITDA, labor costs, supply costs, hours, overtime, punch corrections, no-shows, audits, cases, etc.). Each regional zone entry in the list of regional zones can be selected, and, in response, dashboard area 1854 is updated to show aggregate statistics (e.g., name of regional zone manager, name of regional zone, number of zone leads, number of zones, number of sites, number of employees, average sites per zone, average zone lead pay, average wage, budgeted revenue, actual year-to-date revenue, budgeted EBITDA, actual year-to-date EBITDA, budgeted statistics, actual statistics, and variance between budgeted and actual statistics for revenue, labor costs, supply costs, hours, overtime, punch corrections, no-shows, etc.) for all zones within the selected regional zone and/or a list of zones with statistics for each zone entry (e.g., name of zone lead and statistics representing revenue, EBITDA, labor costs, supply costs, hours, overtime, punch corrections, no-shows, audits, cases, etc.). Each zone entry in the list of zones can be selected, and, in response, dashboard area 1854 is updated to show aggregate statistics (e.g., name of zone lead, name of zone, number of zones, number of sites, number of employees, average wage, budgeted revenue, actual year-to-date revenue, budgeted EBITDA, actual year-to-date EBITDA, budgeted statistics, actual statistics, and variance between budgeted and actual statistics for revenue, labor costs, supply costs, hours, overtime, punch corrections, no-shows, etc.) for all sites within the selected zone and/or a list of sites with statistics for each site entry (e.g., name of site and statistics representing revenue, EBITDA, labor costs, supply costs, hours, overtime, punch corrections, no-shows, audits, cases, etc.).

It should be understood that a user, whose user level is the regional vice president level, may not have access to the aggregate statistics for all regions and list of regions, but rather, would start with dashboard area 1854 having aggregate statistics for his or her particular region and/or a list of regional zones within the particular region. Similarly, the highest level for the roll-up for a user, whose user level is regional zone manager, would include aggregate statistics for his or her particular regional zone and/or a list of zones within that particular regional zone. For a user, whose user level is zone lead, the highest level for the roll-up would include aggregate statistics for his or her particular zone and/or a list of sites within that particular zone.

Figure 18C:
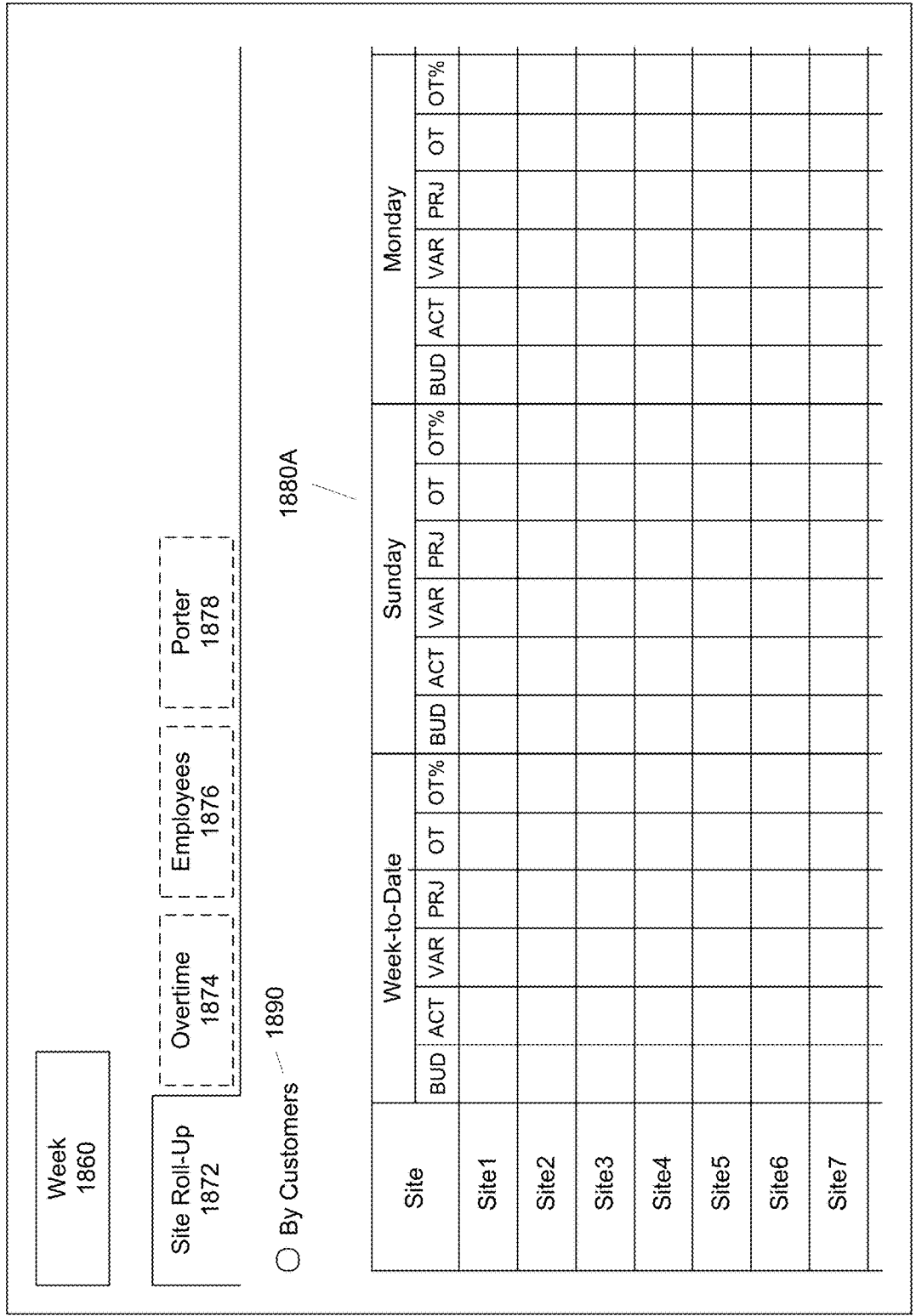

FIG. 18C illustrates a user interface 1800A, representing the tactical command center, after a user has selected tactical command center area 1010, according to an alternative embodiment. As illustrated, user interface 1800A comprises a week input 1860, a site roll-up tab 1872, an overtime tab 1874, an employee tab 1876, a porter tab 1878, a by-customer input 1890, and a weekly statistics grid 1880A.

In an embodiment, week input 1860 identifies the currently-selected week and comprises an input for selecting other weeks (e.g., via a drop-down menu, forward and back button icons, etc.). Whenever a new week is selected via week input 1860, the newly selected week may be identified within week input 1860 (e.g., by beginning and ending date), and weekly statistics grid 1880A may be updated to reflect statistics for the selected week.

Tabs 1872-1878 allow a user to navigate between various weekly statistics grids 1880. In FIG. 18C, site roll-up tab 1872 is selected, and therefore, weekly statistics grid 1880A reflects site-related statistics. In the illustrated example, weekly statistics grid 1880A comprises a list of sites along the vertical axis, and statistics for each day in the week, as well as week-to-date statistics, along the horizontal axis. However, it should be understood that the axes may be switched, that other arrangements of the grid elements may be used, and/or that other statistics than those shown may be used.

The site column in weekly statistics grid 1880A comprises a list of sites within the user's responsibility and/or current context. The site column is followed by a week-to-date group comprising one or more columns of week-to-date statistics. As illustrated, these statistics may include budgeted hours, actual hours, a variance between budgeted and actual hours, project hours, overtime hours, and overtime percentage. The week-to-date group is followed by a Sunday group which comprises the same set of statistics as the week-to-date group, but for only Sunday of the selected week. The Sunday group is followed by a Monday group with the same set of statistics for Monday of the selected week, which is followed by a Tuesday group with the same set of statistics for Tuesday of the selected week, and so on through Saturday of the selected week. User interface 1800A may be scrolled in the horizontal and vertical directions to view additional days and/or sites than those shown. A total for each statistic across all of the listed sites may be displayed in a final row of weekly statistics grid 1880A.

In the illustrated embodiment, by-customers input 1890 allows a user to switch to a view of sites by customer name, rather than by site name. When the user selects by-customers input 1890, the site column will change to a roll-up customer column, as illustrated in FIG. 18D, according to an embodiment. Each customer entry in the roll-up customer column can be expanded (e.g., by toggling an input, such as an icon, in the customer entry) to add a row in weekly statistics grid 1880B, for each of the expanded customer's sites, under the expanded entry for the customer. Similarly, after being expanded, the rows of sites under the expanded customer entry can be hidden again by collapsing the customer entry (e.g., by toggling the input back to its original state).

FIG. 18E illustrates a user interface 1800C, representing the tactical command center, after a user has selected overtime tab 1874. Thus, weekly statistics grid 1880 has been changed to weekly statistics grid 1800C, which reflects overtime-related statistics. In the illustrated example, weekly statistics grid 1880C comprises a list of employees along the vertical axis, and overtime statistics for each day in the week, as well as the employee's home site, regional vice president, regional zone manager, and zone lead, along the horizontal axis. However, it should be understood that the axes may be switched, that other arrangements of the grid elements may be used, and/or that other statistics than those shown may be used.

The employee column in weekly statistics grid 1880C comprises a list of employees within the user's responsibility and/or current context. Each entry in the list of employees may comprise the employee's name and/or unique employee identifier. The employees column is followed by a home site column, which indicates the assigned site for the employee represented by the row (i.e., identified in the employee column for that row). The home site column is followed by columns that identify the regional vice president (e.g., by name) who is responsible for the employee's region, the regional zone manager who is responsible for the employee's regional zone, and the zone lead who is responsible for the employee's zone. These columns are followed by a column for each day of the week (i.e., Sunday through Saturday), which identifies the date and the number of overtime hours punched in by the employee represented by the row on that day. A total for each statistic across all of the listed employees may be displayed in a final row of weekly statistics grid 1880C.

FIG. 18F illustrates a user interface 1800D, representing the tactical command center, after a user has selected employee tab 1876. Thus, weekly statistics grid 1880 has been changed to weekly statistics grid 1800D, which reflects employee-related statistics. In the illustrated example, weekly statistics grid 1880D comprises a list of employees along the vertical axis, and hours statistics for each day in the week along the horizontal axis. However, it should be understood that the axes may be switched, that other arrangements of the grid elements may be used, and/or that other statistics than those shown may be used.

The employee column in weekly statistics grid 1880D comprises a list of employees within the user's responsibility and/or current context. Each entry in the list of employees may comprise the employee's name and/or unique employee identifier. The employee column is followed by a set of columns for each day of the week (i.e., Sunday through Saturday). For each day of the week, the set of columns may identify the date, and regular, project, and overtime hours punched in the by the employee represented by the row (i.e., identified in the employee column for that row) on that day. A total for each statistic across all of the listed employees may be displayed in a final row of weekly statistics grid 1880D.

Rows that represent employees with overtime hours during the selected week (e.g., indicated by a positive value in an overtime column for at least one day during the week) may be highlighted (e.g., in red). In addition, user interface 1800D may comprise an only-employees-with-overtime input 1892, which allows a user to toggle to a view that only shows those employees with overtime hours during the selected week. In other words, when only-employees-with-overtime input 1892 is selected, the employee column in weekly statistics grid 1880D is pared down to only list those employees with a positive value in an overtime column for at least one day during the week. After toggling only-employees-with-overtime input 1892 on, a user may toggle it off again to return to a weekly statistics grid 1880D that shows employee statistics for every employee within the user's responsibility and/or current context.

Although not shown, after a user has selected porter tab 1878, weekly statistics grid 1880 would change weekly statistics grid to reflect porter-related statistics.

Figure 19:
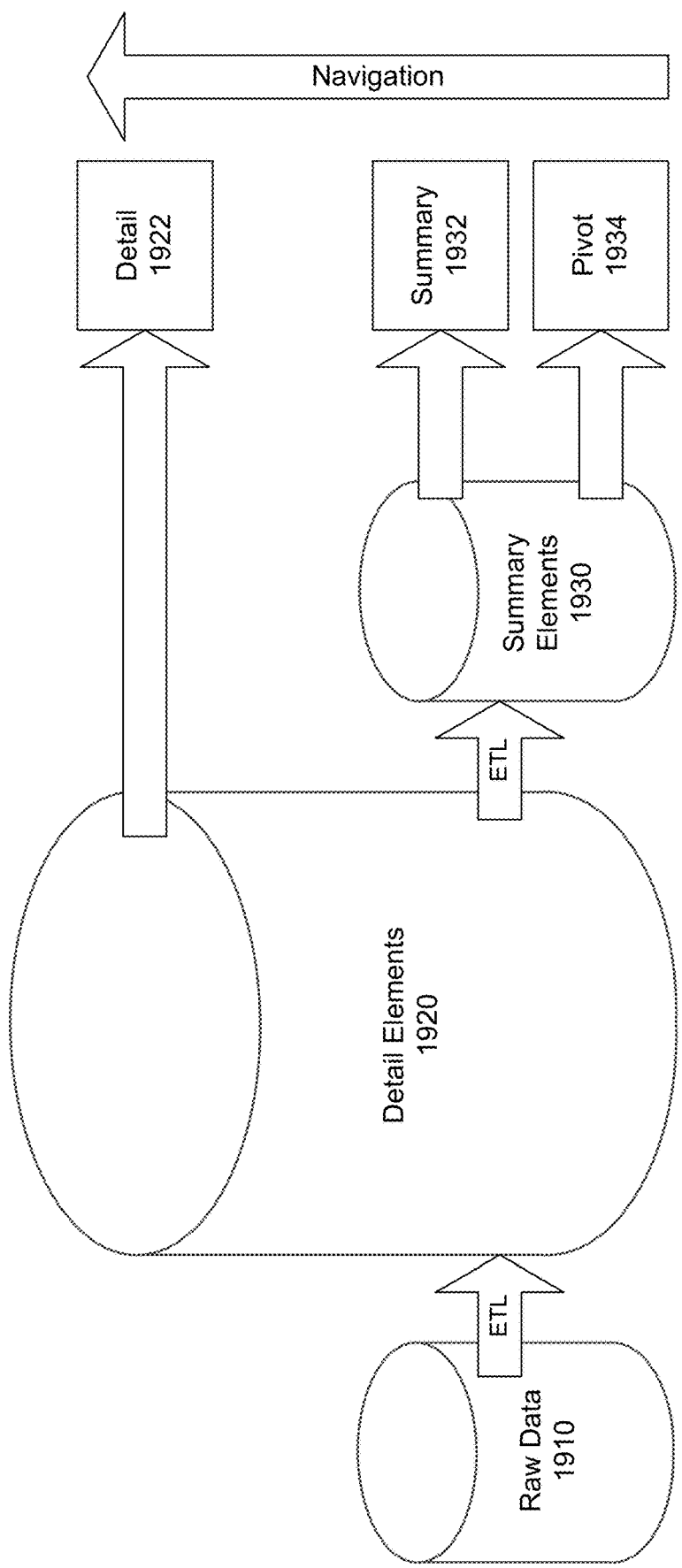
FIG. 19 illustrates a backend process of the tactical command center, according to an embodiment.

FIG. 19 illustrates a back-end process of the tactical command center, according to an embodiment. Raw data 1910 is collected (e.g., in database 114) by platform 110 from, for example, the various client applications 132 executing on all users' user systems 130. Raw data 1910 may comprise, for example, punch-in records (e.g., comprising a site identifier, employee identifier, and timestamp), punch-out records (e.g., comprising a site identifier, employee identifier, and timestamp), etc.

Raw data 1910 is compiled into detail elements 1920. Detail elements 1920 may comprise detailed statistics (e.g., actual hours, budgeted hours, ratio or variance of actual to budgeted hours, overtime hours, etc.) per entity (e.g., an entity defined as a given site and employee). For example, detail elements 1920 may comprise bunches of data representing the actual hours at a given site for a given employee, as computed from punch-in and punch-out records in raw data 1910.

Detail elements 1920 can be summarized into summary elements 1930. For example, summary elements may comprise summarized statistics (e.g., actual hours, budgeted hours, ratio or variance of actual to budgeted hours, overtime hours, etc.) for the detailed statistics in detail elements 1920. This may include detailed statistics per entity (e.g., per site and employee) aggregated for a given context. As discussed elsewhere herein, this context may include a time period (e.g., a particular day, week, month, or year), subset of employees, subset of sites, subset of customers, subset of geographical regions (e.g., state, Zip code, etc.), and/or the like. For example, if the context is a particular day, summary elements 1930 may include statistics for each site and employee for that particular day. If the context is a particular week and a subset of sites, the summary elements may include statistics for all employees who worked at that subset of sites for that particular week.

Visualizations of detail elements 1920 and summary elements 1930 may be provided in one or more user interfaces, such as dashboard 1854 and/or user interfaces 1800A-1800D. A user may navigate across or drill down within these user interface(s) between a pivot level 1934, a summary level 1932, and a detail level 1922. Pivot level 1934 represents the highest level (i.e., most general), and may include statistics (e.g., actual hours, budgeted hours, ratio or variance of actual to budgeted hours, overtime hours, costs, etc.) representing values aggregated for each regional zone and/or zone within the user's span of control. Summary level 1932 represents an intermediate level (i.e., less general than pivot level 1934, but more general than detail level 1922), and may include statistics (e.g., actual hours, budgeted hours, ratio or variance of actual to budgeted hours, overtime hours, costs, etc.) representing values aggregated for each site within the user's span of control or selected regional zone(s) or zone(s). Detail level 1922 represents the lowest level (i.e., least general), and may include statistics (e.g., actual hours, budgeted hours, ratio or variance of actual to budgeted hours, overtime hours, costs, etc.) for each employee within the user's span of control or selected site(s). It should be understood that not all users will have access to all levels 1922, 1932, and 1934, and that the levels 1922, 1932, and 1934 to which a user will have access depends on that user's level. Furthermore, the navigation or drill-down between levels (e.g., from pivot level 1934 to summary level 1932 to detail level 1922) may be implemented using the expandable and collapsible roll-up technique described elsewhere herein.

As described above, various embodiments of the disclosed processes may be implemented primarily in software. Alternatively, various embodiments of the disclosed processes may be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

In other words, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method comprising using at least one hardware processor to execute a server application to:
    collect a plurality of punch-in data and a plurality of punch-out data from a plurality of client applications over at least one network, wherein each of the plurality of punch-in data comprises an identifier of a site, an identifier of an employee, and a timestamp representing a time at which that identified employee punched in to a shift at that identified site, and wherein each of the plurality of punch-out data comprises an identifier of a site, an identifier of an employee, and a timestamp representing a time at which that identified employee punched out of a shift at that identified site;
    for at least one of the plurality of client applications, after the punch-in data for the user is generated for a shift and during that shift,
        monitoring whether or not a current time is a predetermined time period after an end time of that shift, and,
        when the current time is determined to be a predetermined time period after the end time of that shift, generating an alert, and automatically generating punch-out data for that shift;
    compute hours data for each of a plurality of employees at one or more of a plurality of sites from the collected plurality of punch-in data and plurality of punch-out data; and provide the hours data at one or more summary levels and a detailed level by
    calculating summarized data for each of the plurality of sites from the hours data,
    presenting a visual representation of the summarized data for each of the plurality of sites as a first summary level with one or more inputs for selecting each of the plurality of sites, and,
    in response to a selection, at the first summary level, of at least one of the plurality of sites, presenting a visual representation of the hours data for the selected at least one site as the detailed level.

2. The method of claim 1, wherein providing the hours data at one or more summary levels further comprises:
    calculating summarized data for each of a plurality of zones, wherein each of the plurality of zones comprises one or more sites; and
    presenting a visual representation of the summarized data for each of the plurality of zones as a second summary level with one or more inputs for selecting each of the plurality of zones; and,
    in response to a selection, at the second summary level, of one of the plurality of zones that comprises the plurality of sites, presenting the visual representation of the summarized data for each of the plurality of sites as the first summary level.

3. The method of claim 1, wherein the hours data comprises, for each of the plurality of employees and each of the plurality of sites, a number of hours budgeted for the employee at the site for a time period, a number of regular hours worked by the employee at the site for the time period, and a number of overtime hours worked by the employee at the site for the time period.

4. The method of claim 3, wherein the summarized data for each of the plurality of zones comprises, for each of the plurality of sites, an aggregate number of hours budgeted for all of the plurality of employees at the site for the time period, an aggregate number of regular hours worked by all of the plurality of employees at the site for the time period, and an aggregate number of overtime hours worked by all of the plurality of employees at the site for the time period.

5. The method of claim 4, wherein the summarized data for each of the plurality of zones further comprises, for each of the plurality of sites, an indication of a variance between the aggregate number of hours budgeted for all of the plurality of employees at the site for the time period and the aggregate number of regular hours worked by all of the plurality of employees at the site for the time period.

6. The method of claim 1, further comprising:
    by each of the plurality of client applications, providing a user interface on a display of a mobile user device, wherein the user interface comprises a first input for punching in to a shift and a second input for punching out of a shift;
    when the first input is selected at one of the plurality of client applications, validating that a user of the mobile user device, executing that client application, is allowed to punch in, and, when the validation to punch in is successful, generating punch-in data for the user; and,
    when the second input is selected at one of the plurality of client applications, validating that the user of the mobile user device, executing that client application, is allowed to punch out, and, when the validation to punch out is successful, generating punch-out data for the user.

7. The method of claim 6, wherein validating that the user of the mobile user device is allowed to punch in comprises:
    determining that the user is not already punched in to a shift;
    determining that a current location of that mobile user device matches a location of a site of a scheduled shift for the user; and
    determining that a current time is within a predetermined time range of a start time of the scheduled shift for the user.

8. The method of claim 6, wherein validating that the user of the mobile user device is allowed to punch out comprises:
    determining that the user is currently punched in to a shift;
    determining that a current location of that mobile user device matches a location of a site of the shift to which the user is currently punched in; and
    determining that a current time is within a predetermined time range of an end time of the shift to which the user is currently punched in.

9. The method of claim 6, further comprising, for at least one of the plurality of client applications, after the punch-in data for the user is generated for a shift and before the second input is selected at the at least one client application during the shift,
    monitoring whether or not a current location of a mobile user device, executing the at least one client application, exceeds a predetermined distance from a location of a site of the shift; and,
    when the current location exceeds the predetermined distance from the location of the site of the shift, generating an alert.

10. The method of claim 1, further comprising:
    by one or more of the plurality of client applications, providing a confirmation user interface, for confirming whether or not a potential employee is able to be hired for a job, on a display of a mobile user device, wherein the user interface comprises a unique-identifier input, an assigned-site input, and an offered-wage input;
    when an identifier is input into the unique-identifier input,
        determining whether or not the identifier is valid,
        determining whether or not the identifier is associated with a former or current employee,
        when the identifier is determined to be associated with a former or current employee, determining whether or not the former or current employee is eligible for the job,
        when the identifier is determined to be valid and the identifier is determined to be either not associated with a former or current employee or associated with a former or current employee who is determined to be eligible for the job, displaying, within the confirmation user interface, an indication that the identifier, input into the unique-identifier input, has been validated, and,
        when the identifier is determined to not be valid or the identifier is determined to be associated with a former or current employee who is determined to not be eligible for the job, displaying, within the confirmation user interface, an indication that the identifier, input into the unique-identifier input, has not been validated; and,
    when one of the plurality of sites has been selected via the assigned-site input and a wage value has been input into the offered-wage input,
        determining a wage range associated with the selected site, determining whether or not the wage value is within the determined wage range, when the wage value is determined to not be within the determined wage range, displaying, within the confirmation user interface, an indication that the wage value is not within the determined wage range, and requesting approval of the wage value.

11. The method of claim 10, wherein, after an identifier is input into the unique-identifier input, the identifier is determined to be valid, and the identifier is determined to be either not associated with a former or current employee or associated with a former or current employee who is determined to be eligible for the job, and after one of the plurality of sites has been selected via the assigned-site input and a wage value has been input into the offered-wage input that is either within the determined wage range or approved, associating the potential employee with a unique employee identifier to be used in the punch-in data and the punch-out data for the potential employee.

12. The method of claim 10, wherein requesting approval of the wage value comprises, by the server application, sending an approval request to an authorized user.

13. The method of claim 10, wherein the identifier to be input into the unique-identifier input is a Social Security number (SSN), and wherein determining whether or not the identifier is valid comprises determining whether or not the identifier, input into the unique-identifier input, is a valid SSN.

14. The method of claim 10, wherein determining a wage range associated with the selected site comprises:
determining a Zip code associated with the selected site; and
determining a wage range that is associated with both the determined Zip code and a job title for the job.

15. The method of claim 1, further comprising, by one or more of the plurality of client applications, displaying a scheduling user interface, for scheduling a shift for at least one of the plurality of employees, wherein the scheduling user interface comprises inputs for selecting one of the plurality of employees, one of the plurality of sites, and a start time and end time of a shift for the selected employee at the selected site.

16. The method of claim 15, further comprising, for each shift scheduled by a user:
determining a duration of the shift based on the start time and end time selected for the shift; and,
when a duration of the shift would result in overtime, requesting approval for the overtime from an authorized user.

17. The method of claim 16, wherein requesting approval for the overtime from an authorized user comprises, by the server application:
determining a user with authority to approve the overtime; and
transmitting an alert, over the at least one network, to a client application executing on a user device of the determined user.

18. A system comprising:
at least one hardware processor; and
one or more software modules that, when executed by the at least one hardware processor,
collect a plurality of punch-in data and a plurality of punch-out data from a plurality of client applications over at least one network, wherein each of the plurality of punch-in data comprises an identifier of a site, an identifier of an employee, and a timestamp representing a time at which that identified employee punched in to a shift at that identified site, and wherein each of the plurality of punch-out data comprises an identifier of a site, an identifier of an employee, and a timestamp representing a time at which that identified employee punched out of a shift at that identified site, for at least one of the plurality of client applications, after the punch-in data for the user is generated for a shift and during that shift,
monitor whether or not a current time is a predetermined time period after an end time of that shift, and,
when the current time is determined to be a predetermined time period after the end time of that shift, generate an alert, and automatically generate punch-out data for that shift, compute hours data for each of a plurality of employees at one or more of a plurality of sites from the collected plurality of punch-in data and plurality of punch-out data, and provide the hours data at one or more summary levels and a detailed level by
calculating summarized data for each of the plurality of sites from the hours data,
presenting a visual representation of the summarized data for each of the plurality of sites as a first summary level with one or more inputs for selecting each of the plurality of sites, and,
in response to a selection, at the first summary level, of at least one of the plurality of sites, presenting a visual representation of the hours data for the selected at least one site as the detailed level.

19. A non-transitory computer-readable medium having instructions stored therein, wherein the instructions, when executed by a processor, cause the processor to:
collect a plurality of punch-in data and a plurality of punch-out data from a plurality of client applications over at least one network, wherein each of the plurality of punch-in data comprises an identifier of a site, an identifier of an employee, and a timestamp representing a time at which that identified employee punched in to a shift at that identified site, and wherein each of the plurality of punch-out data comprises an identifier of a site, an identifier of an employee, and a timestamp representing a time at which that identified employee punched out of a shift at that identified site;

for at least one of the plurality of client applications, after the punch-in data for the user is generated for a shift and during that shift,
monitor whether or not a current time is a predetermined time period after an end time of that shift, and,
when the current time is determined to be a predetermined time period after the end time of that shift, generate an alert, and automatically generate punch-out data for that shift;

compute hours data for each of a plurality of employees at one or more of a plurality of sites from the collected plurality of punch-in data and plurality of punch-out data; and provide the hours data at one or more summary levels and a detailed level by
calculating summarized data for each of the plurality of sites from the hours data,
presenting a visual representation of the summarized data for each of the plurality of sites as a first summary level with one or more inputs for selecting each of the plurality of sites, and, in response to a selection, at the first summary level, of at least one of the plurality of sites, presenting a visual representation of the hours data for the selected at least one site as the detailed level.

* * * * *